United States Patent [19]
Hirai et al.

[11] Patent Number: 5,940,502
[45] Date of Patent: Aug. 17, 1999

[54] PHONE HOLDER

[75] Inventors: Hiroki Hirai; Masashi Sugimoto; Shigeki Sakai; Yoshito Sakai; Nori Inoue; Tetsuji Tanaka; Yuichiro Tsutsumi, all of Nagoya, Japan

[73] Assignees: Harness System Technologies Research, Ltd., Nagoya; Sumitomo Wiring Systems, Ltd., Yokkaichi; Sumitomo Electric Industries Ltd., Osaka, all of Japan

[21] Appl. No.: 08/986,786

[22] Filed: Dec. 8, 1997

[30] Foreign Application Priority Data

| Dec. 11, 1996 | [JP] | Japan | 8-331040 |
| Jan. 14, 1997 | [JP] | Japan | 9-004929 |
| Jan. 14, 1997 | [JP] | Japan | 9-004930 |
| Apr. 2, 1997 | [JP] | Japan | 9-084081 |
| May 12, 1997 | [JP] | Japan | 9-121033 |
| Jun. 24, 1997 | [JP] | Japan | 9-167566 |

[51] Int. Cl.⁶ .................................................. H04M 1/00
[52] U.S. Cl. .................................... 379/446; 379/455
[58] Field of Search .................................. 379/446, 455, 379/454, 426, 449; 455/90, 575

[56] References Cited

U.S. PATENT DOCUMENTS 4,965,824 10/1990 Hollowed et al. ............... 379/428
5,230,016 7/1993 Yasuda .

FOREIGN PATENT DOCUMENTS

| A 0 722 858 | 7/1996 | European Pat. Off. |
| A 2 698 594 | 6/1994 | France |
| 3-20187 | 1/1991 | Japan |
| A 4-010319 | 1/1992 | Japan |
| A 4-037237 | 2/1992 | Japan |
| A-5-95394 | 4/1993 | Japan |
| A-5-294190 | 11/1993 | Japan |
| A-6-6299 | 1/1994 | Japan |
| A-7-74809 | 3/1995 | Japan |
| A 7-135521 | 5/1995 | Japan |
| 3020187 U | 10/1995 | Japan |

*Primary Examiner*—Jack Chiang
*Attorney, Agent, or Firm*—Oliff & Berridge, PLC

[57] ABSTRACT

A phone holder for detachably holding a mobile phone in an automotive vehicle is provided with a holder main body including an inner casing having a phone accommodating portion, a phone urging device having a phone actuating roller and the like for urging the mobile phone being inserted into the phone accommodating portion in a direction opposite from an inserting direction of the mobile phone, and a phone locking device which can be switched between a locking state where the mobile phone is locked in a specified accommodation position in the phone accommodating portion against an urging force of the phone urger and an unlocking state where the locking is released. The phone locking device is switched to the locking state as the mobile phone is inserted into the phone accommodating portion. The above locking is releasable by moving the mobile phone in its locked state in the inserting direction.

31 Claims, 45 Drawing Sheets

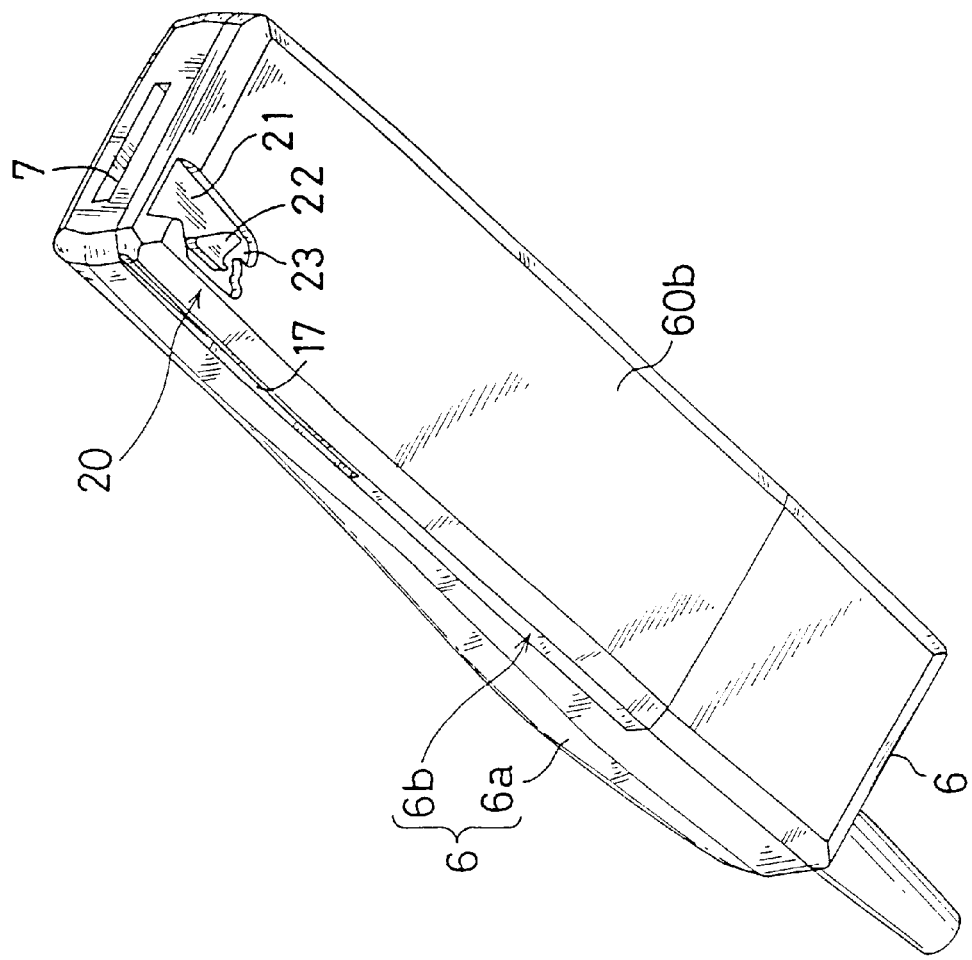

2

PHONE HOLDER

BACKGROUND OF THE INVENTION

This invention relates to a phone holder which enables use and keeping of a mobile phone in an automotive vehicle.

With the spread of portable phones, phone holders which enable mobile phones to be used and held in automotive vehicles have been developed in recent years. Further, it is considered to provide the phone holder with a holder connector which enables a handsfree conversion to be conducted without picking up a mobile phone using a microphone and a loudspeaker equipped in an automotive vehicle and also enables an electrical connection with the mobile phone for the connection with an automotive antenna, the charging, or other purposes.

A generally known phone holder as such is provided with a holder main body in the form of a frame or the like for fixing a mobile phone and a holder connector mounted on the holder main body or a vehicle body via a curl cord or the like. In this phone holder, the mobile phone is connected with the holder connector; is positioned on the holder main body; and is held in this state by a lock device or the like.

Further, Japanese Unexamined Patent Publication No. 6-6299 discloses a phone holder in which a phone setting portion in which a mobile phone is set from above is provided on the upper surface of a holder main body; a holder connector mount portion including a circular rotary hook, pin or button for fixing and releasing a holder connector is provided before the phone setting portion; and the mobile phone is connected with the connector by setting the mobile phone in the phone setting portion from above after the holder connector is fixed to the holder connector mount portion and by moving the mobile phone forward along the phone setting portion.

Other known phone holders to be installed in an automotive vehicle are disclosed in Japanese Unexamined Patent Publications Nos. 5-95394, 5-294190, 7-74809 and Japanese Utility Model Registration No. 3020187.

With the conventional phone holders as above, it is not easy to set the mobile phone in the holder main body while positioning it with respect thereto and to take the mobile phone out after the setting. It is difficult for a driver to do such operations while driving.

SUMMARY OF THE INVENTION

It is an object of the present invention to provide a phone holder which has overcome the problems residing in the prior art.

According to an aspect of the present invention, a phone holder comprising a holder main body having a phone accommodating portion into which a mobile phone is insertable, a phone urger which urges the mobile phone being inserted into the phone accommodating portion in a direction opposite from an inserting direction of the mobile phone, and a phone lock device which is switchable between a locking state where the mobile phone is locked in a specified accommodation position in the phone accommodating portion against a urging force of the phone urger and an unlocking state where the locking is released. The phone lock device is switched to the locking state as the mobile phone is inserted into the phone accommodating portion and the locking is released by operating the mobile phone in its locked state in the inserting direction.

With the phone holder thus constructed, by inserting the mobile phone into the phone accommodating portion of the holder main body against the urging force of the phone urger to the specified accommodation position, the mobile phone is locked in this position and held accommodated therein. Thereafter, by pressing the mobile phone in the inserting direction again, the phone lock device is switched to the unlocking state.

Accordingly, the mobile phone is automatically fed in the direction opposite from the inserting direction by the urging force of the phone urger, making it easy to take the mobile phone out. Therefore, with this phone holder, the mobile phone can be locked and unlocked only by moving it in the inserting direction.

These and other objects, features and advantages of the present invention will become more apparent upon a reading of the following detailed description and accompanying drawings.

BRIEF DESCRIPTION OF THE DRAWINGS

FIG. 6 is a perspective view of the mobile phone when viewed from below;

FIGS. 7A and 7B are diagrams showing the action of a phone lock device of the phone holder, wherein FIG. 7A shows the phone lock device effecting locking as the mobile phone is accommodated and FIG. 7B shows the phone lock device effecting unlocking;

DETAILED DESCRIPTION OF THE PREFERRED EMBODIMENTS OF THE INVENTION

A first embodiment of the present invention will be described with reference to FIGS. 1 to 15.

Figure 1:
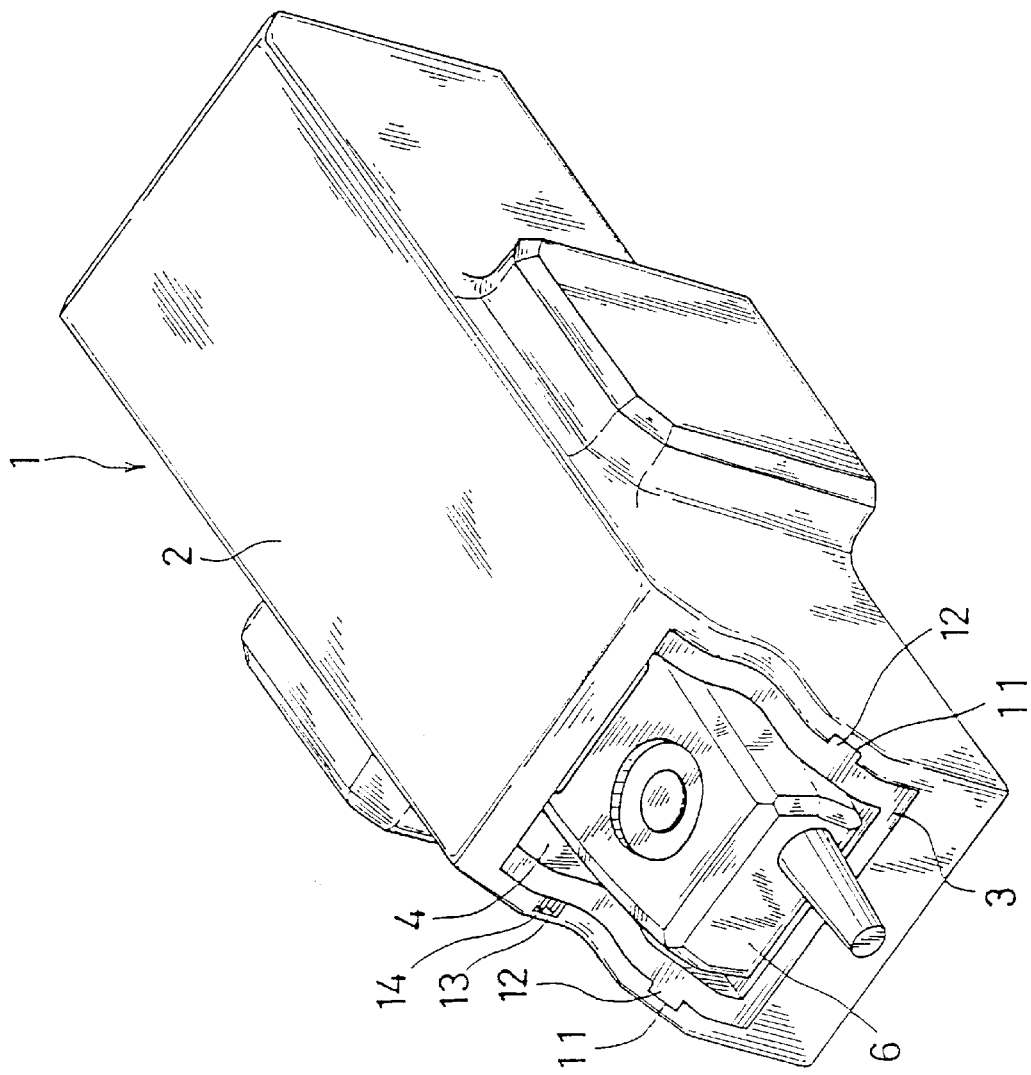
FIG. 1 is a perspective view of a phone holder according to a first embodiment of the invention, accommodating a mobile phone.
Figure 2:
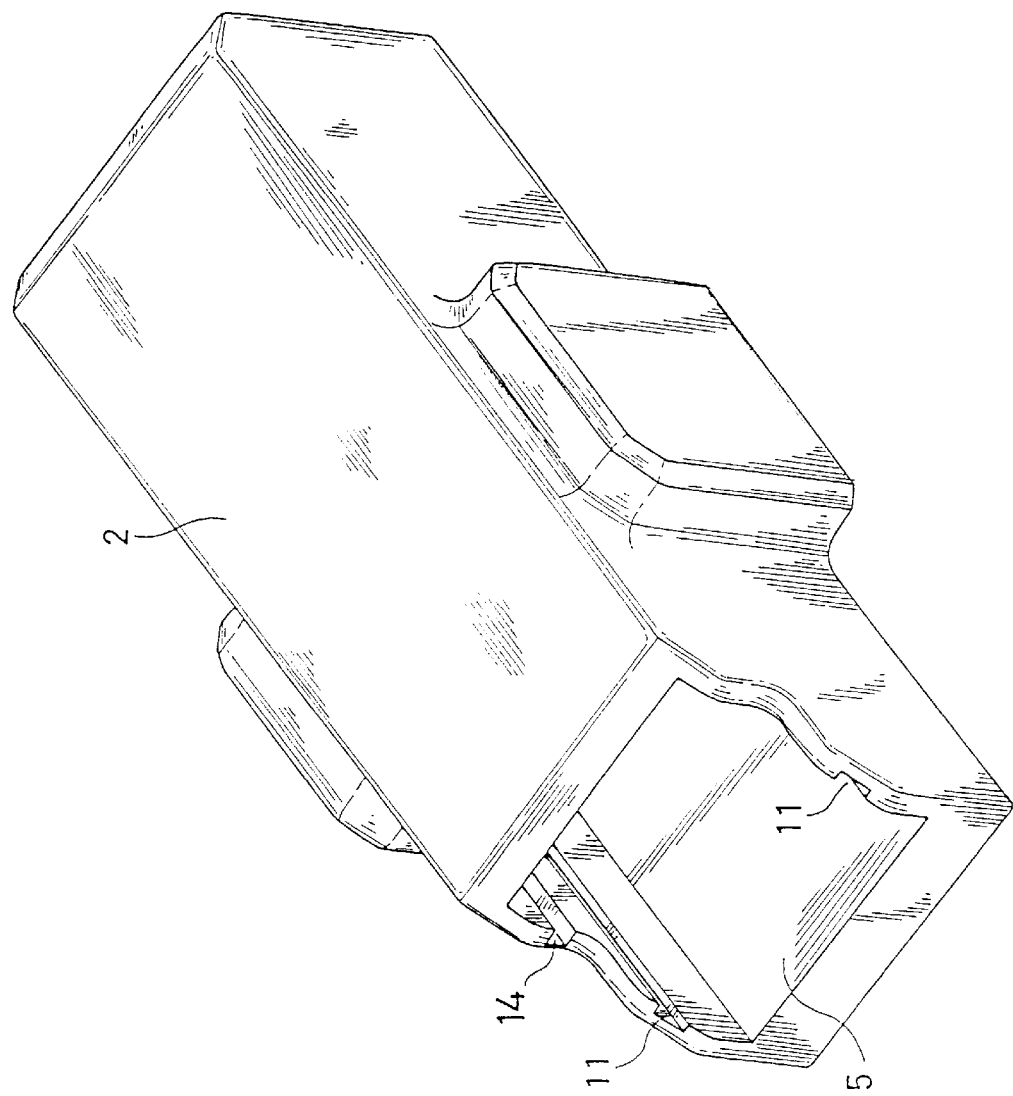
FIG. 2 is a perspective view of an outer casing of the phone holder.
Figure 3:
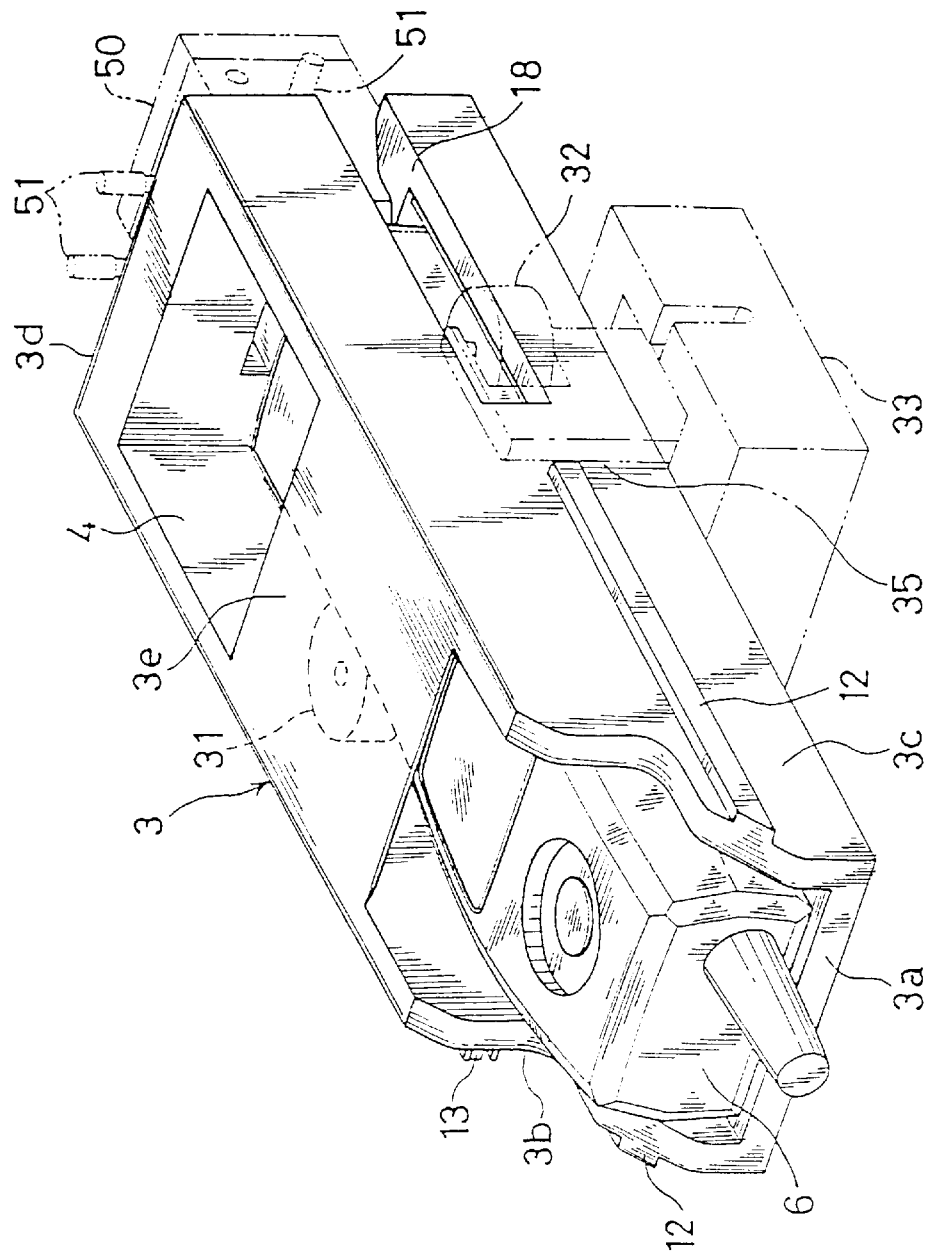
FIG. 3 is a perspective view of an inner casing of the phone holder accommodating the mobile phone.
Figure 4:
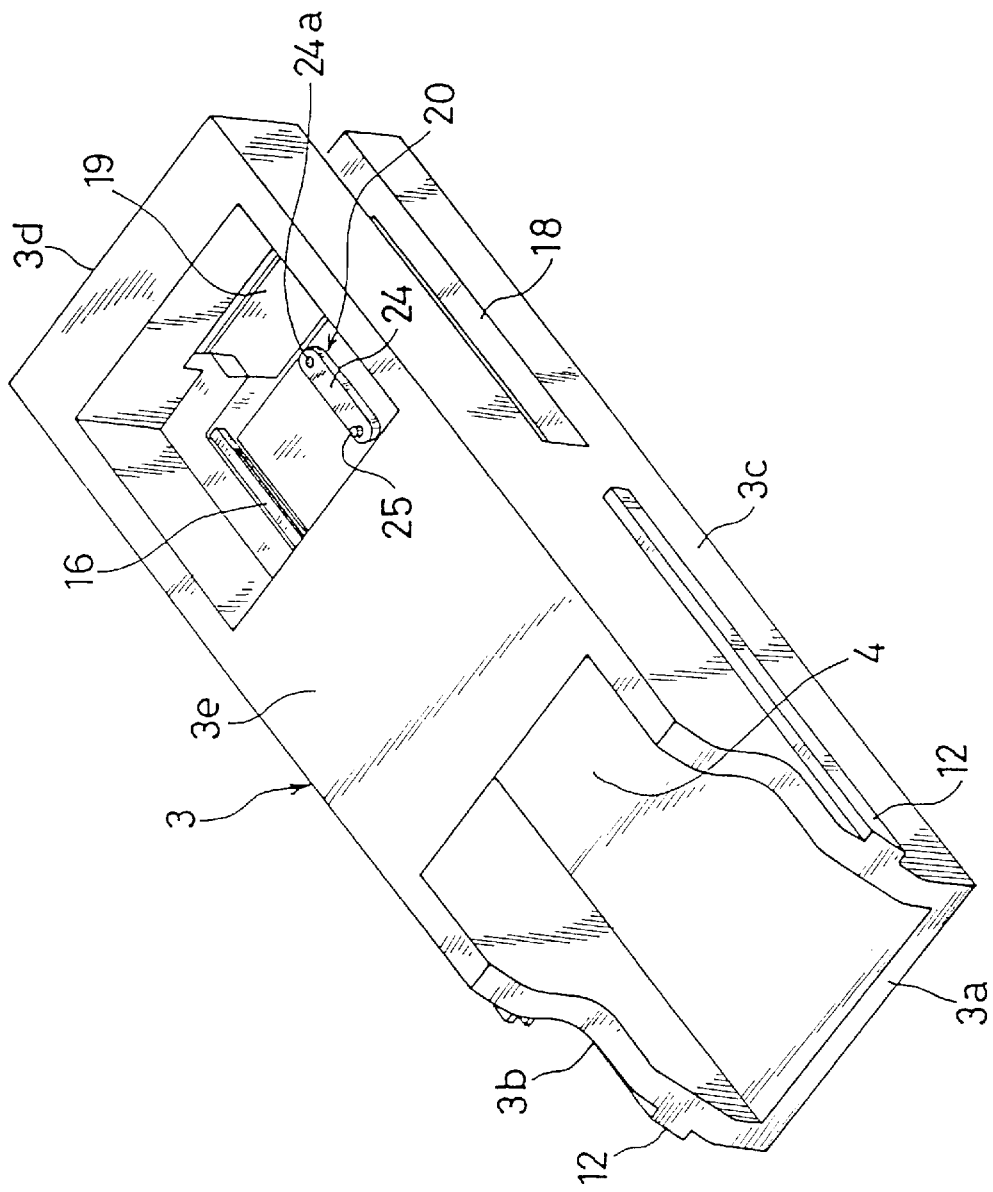
FIG. 4 is a perspective view of the inner casing.

FIGS. 1 to 4 are perspective views, wherein FIG. 1 shows a state where a mobile phone fitted into an inner casing is accommodated in the phone holder, FIG. 2 shows only an outer casing with the inner casing detached therefrom, FIG. 3 shows the mobile phone accommodated in the inner casing, FIG. 4 shows only the inner casing with the mobile phone detached therefrom.

As shown in FIG. 1, the phone holder includes a holder main body 1 comprised of an outer casing 2 and an inner casing 3. This holder main body 1 has a hollow phone accommodating portion 4 which is open in one end. A mobile phone 6 can be detachably accommodated in the phone accommodating portion 4. The holder main body 1 can be used for a variety of types of mobile phones 6 having, for example, different sizes by exchanging the inner casing 3 according to the type of the mobile phone 106 to be accommodated.

As shown in FIG. 2, the outer casing 2 has a long box shape and a hollow portion 5 which is open in one end. This hollow portion 5 is formed larger than a variety of mobile phones 6 in view of their solid configurations. Accordingly, even if the solid configuration of the phone 6 is changed due to a model change, this phone holder can be used for such a phone 6 by using the inner casing 3 in conformity with the new solid configuration (see FIG. 3). The outer casing 2 is fixed near a driver's seat in an automotive vehicle. For example, the outer casing may be secured to a lid of a console box with the opening facing the driver or may be integrally formed therewith. By forming the outer casing 2 in this manner, the driver can easily insert and detach the mobile phone 6 into and from the outer casing 2.

Figure 5:
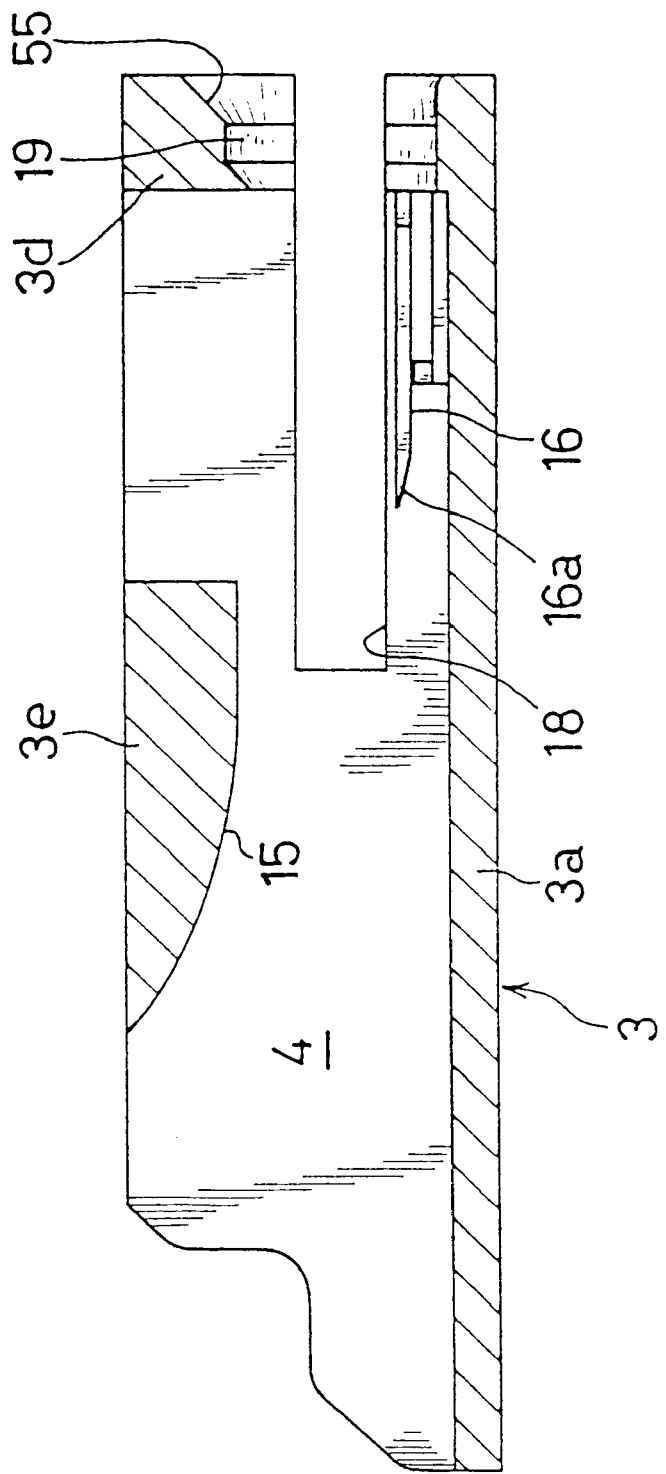
FIG. 5 is a sectional view of the inner casing.

FIG. 5 is a side view in section of the inner casing 3 of FIG. 4. As shown in FIGS. 3 to 5, the inner casing 3 is comprised of a bottom plate 3a, a left side wall 3b, a right side wall 3c and a back wall 3d. An upper plate 3e is provided at a part of the upper surface of the inner casing 3 to define the phone accommodating portion 4. A plurality of types of inner casings 3 having phone accommodating portions 4 of different configurations are prepared in advance in order to conform to the solid configurations of different types of mobile phones 6. By selecting one inner casing 3 corresponding to the mobile phone 6 to be accommodated, the mobile phone 6 can be accommodated in the hollow portion 5 of the outer casing 2 regardless of a model change.

A pair of guide grooves 211 extending in forward and backward directions are formed in the inner surfaces of the opposite side walls of the outer casing 2, whereas a pair of elongated projections 212 are formed on the outer surface of front portions of the opposite side walls 3b, 3c of the inner casing 3 in positions corresponding to the respective guide grooves 211. The inner casing 3 is fitted in the outer casing 2 movably in forward and backward directions while being positioned with respect to vertical direction by the elongated projections 212 being slidably fitted in the corresponding guide grooves 211. Further, an elastic lock portion 13 (see FIG. 3) is provided on the outer surface of the left side wall 3b of the inner casing 3. With the inner casing 3 fitted in the outer casing 2, the elastic lock portion 13 comes into engagement with an oblong hole 214 extending in forward and backward directions which is formed in the outer casing 2.

Upper corner portions of the opposite side walls 3b, 3c at the front end near the opening of the outer casing 2 are cut away to have a stepwise shape when viewed sideways (see FIGS. 1 and 2), so that the mobile phone 6 can be easily inserted obliquely from above. A portion of the inner casing 3 near the front end opening has a corresponding shape so as not to degrade the appearance of the phone holder when the inner casing 3 is accommodated in the outer casing 2.

As shown in FIG. 5, the inner casing 3 has a curved surface 15 at a front end portion of the upper plate 3e. The curved surface 15 has an arcuate shape so that a distance to the bottom plate 3a is longer toward the front end open ing. A distance between the upper plate 3e and the bottom plate 3a behind the curved surface 15 is set slightly larger than the thickness of the mobile phone 6. Thus, the mobile phone 6 can be more easily accommodated into the inner casing 3.

The inner casing 3 is provided with rails 16 at the bottoms of rear portions of the inn er surfaces of the opposite side walls 3b, 3c. The rails 16 extend in forward and backward directions and is adapted to position the mobile phone 6. A front end 16a of each rail 16 is thinned to facilitate the engagement with an engaging groove 17 to be described later.

The inner casing 3 is also provided with guide grooves 18 formed in the rear portions of the opposite side walls 3b, 3c for allowing the passage of rollers 31, 32 to be described later. The guide grooves 18 extend from a substantially middle position of the side walls 3b, 3c to the rear end thereof. In the back wall 3d is formed an opening 19 for introducing a connector.

Figure 26:
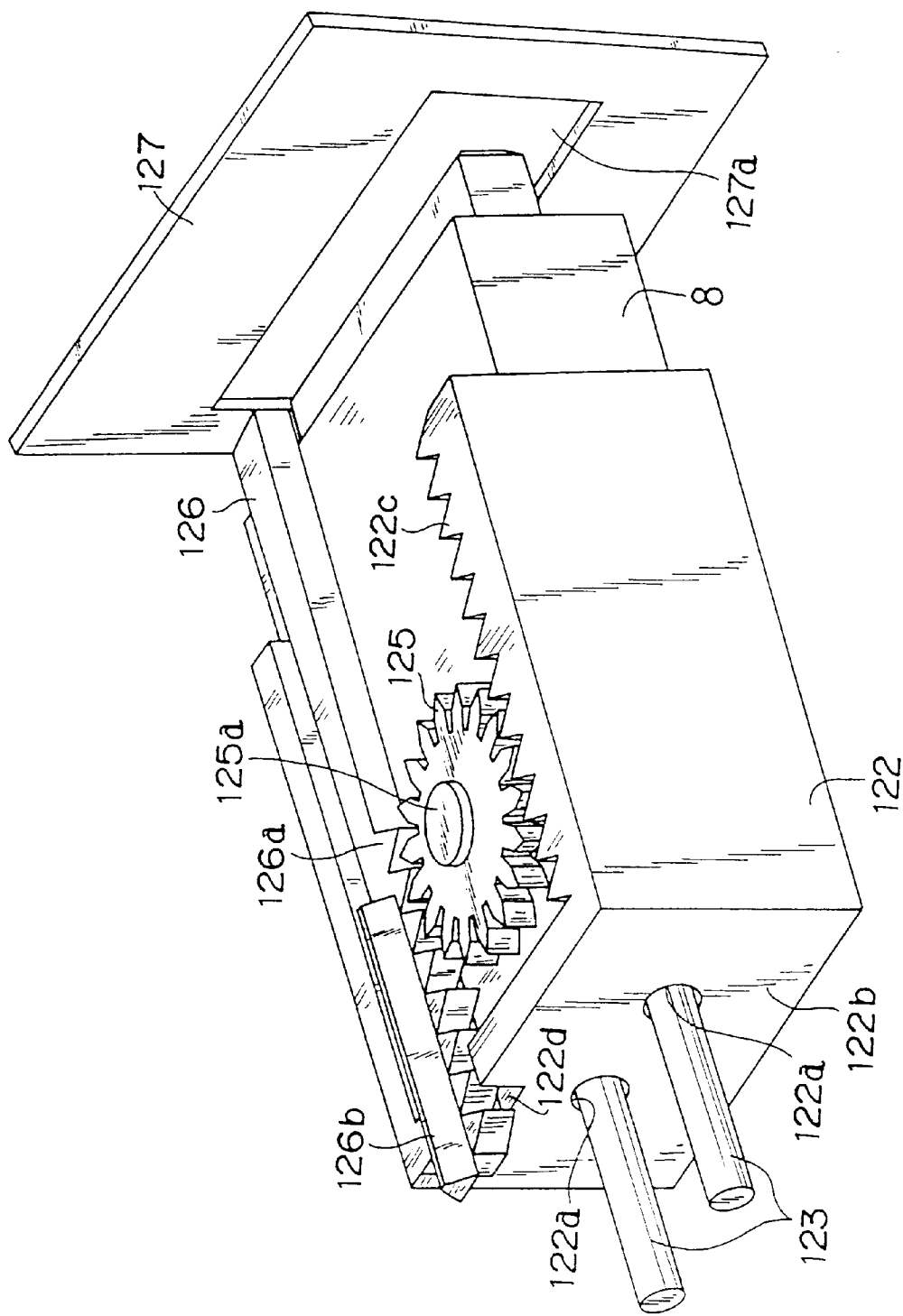
FIG. 26 is a perspective view of the connector module with an outer housing removed.

As shown in FIG. 6, the mobile phone 6 to be accommodated in the phone accommodating portion 4 includes a phone main body 6a and a charging unit 6b detachably mounted on the bottom surface of the phone main body 6a. The engaging grooves 217 corresponding to the rails 216 are formed in the opposite side portions of the charging unit 6a. A phone side connector 7 is provided at the rear end of the phone main body 6a. A bolder connector 8 (see FIG. 26) corresponding to the phone side connector 7 is arranged at the back of the holder main body 1 (see FIG. 12). In the respective connectors 7, 8 are arranged terminals for the handsfree conversation, the connection with a vehicle antenna, the charging, etc. The holder connector 8 is connected with an unillustrated controller via an electric wiring provided in a console box or the like, so that a driver can use the mobile phone 6 via the controller by operating an operable portion provided on a steering wheel or the like in a specified manner.

Specifically, a base member 33 is arranged in the outer casing 2. The base member 33 is positioned below the inner casing 3 and extends more outward than the opposite sides of the inner casing 3. The phone actuating roller 31 is held on one side (left side in FIGS. 8 and 9) of the base member 33 via a mount member 34, and the idle roller 32 is held on the other side (right side in FIGS. 8 and 9) of the base member 33 via a mount member 35. The rollers 31, 32 face the phone accommodating portion 4 via notches formed in the opposite side walls of the inner casing 3.

The mount member 34 includes a base portion 34a and a projection wall 34b projecting upward from a side end thereof. At the upper end of the projection wall 34b is rotatably mounted the phone actuating roller 31 about a vertical axis 36. On the other hand, the mount member 35 includes a lower wall 35a and a projection wall 35b projecting upward. At the upper end of the projection wall 35b is rotatably mounted the idle roller 32 about a vertical axis.

The respective mount members 34, 35 are movably held in mount member accommodating portions 37, 38 along the widthwise direction of the holder main body 1, respectively. Coil springs 39, 40 as urger for adjusting the positions of the respective mount members 34, 35 are provided in the base member 33 by being mounted on spring mount shafts 34c, 35c provided on the mount members 34, 35. The mount members 34, 35 are urged inwardly (in directions in which the rollers 31, 32 approach each other) by the coil springs 39, 40.

Figure 10A:
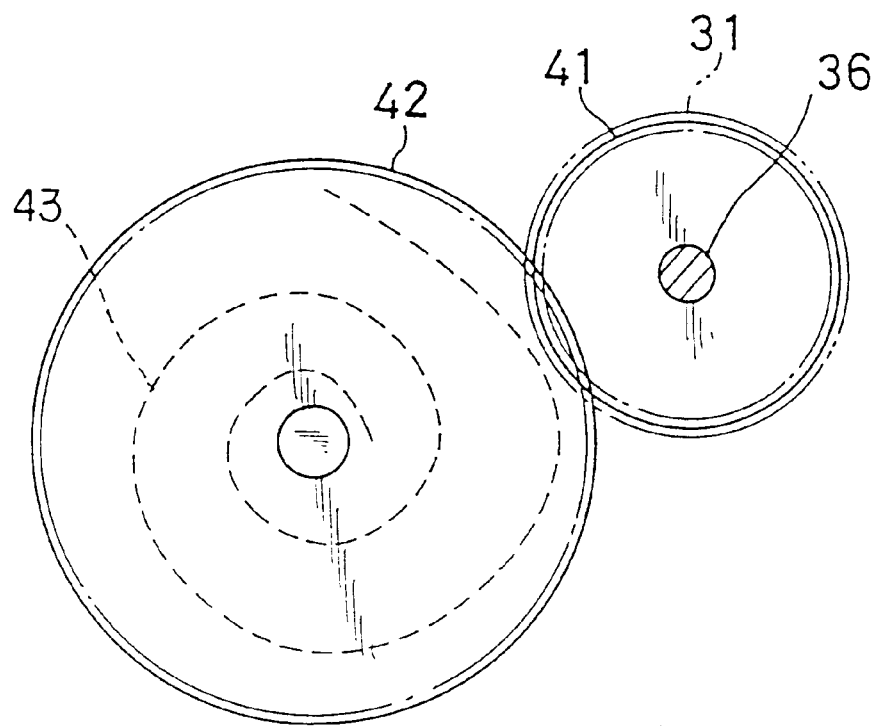
FIGS. 10A and 10B are a schematic plan view and a schematic side view of an urger and a damper for the phone actuating roller, respectively.
Figure 10B:
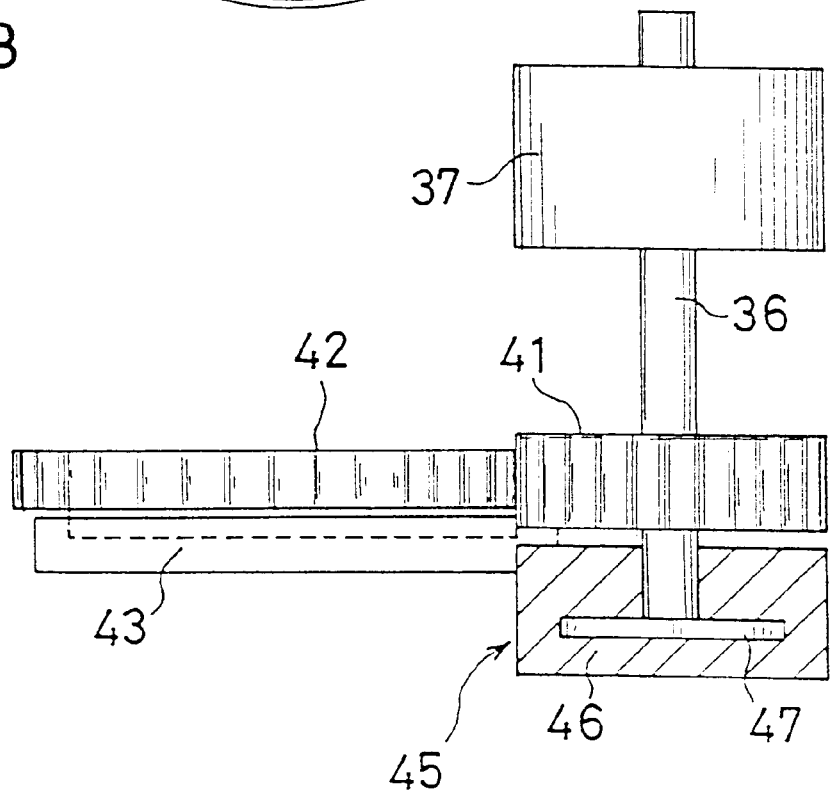
Figure 11:
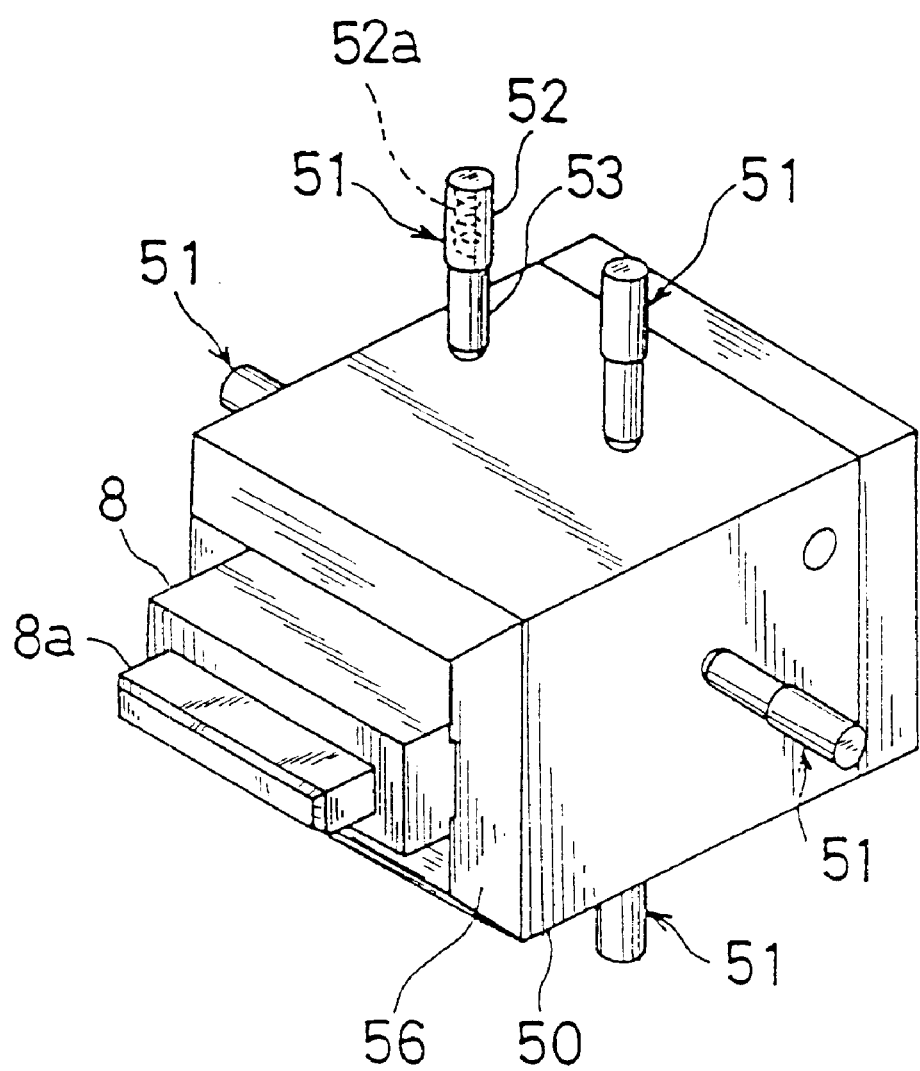
FIG. 11 is a perspective view of a holder connector, a connector casing, and the like of the phone holder.
Figure 12:
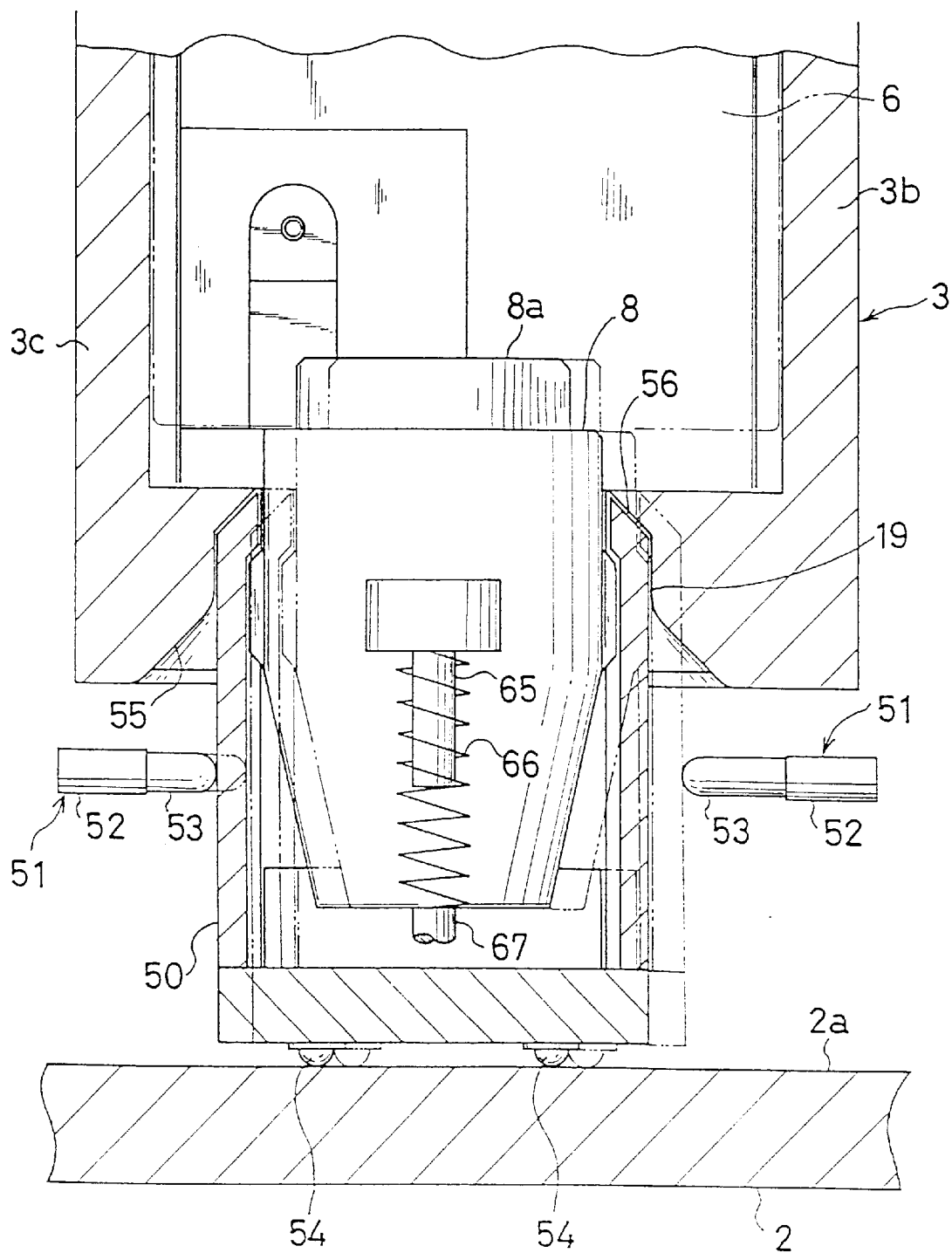
FIG. 12 is a horizontally sectional view of a portion of the phone holder at the back of the holder main body when the holder connector and the connector casing are assembled.
Figure 13:
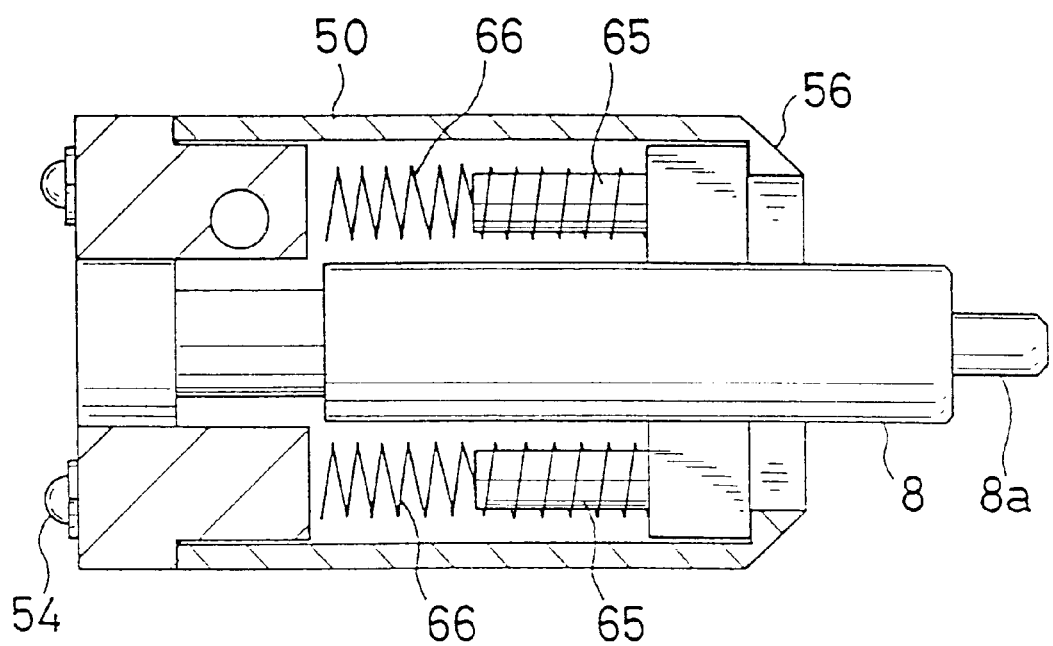
FIG. 13 is a vertically sectional view of the holder connector and the connector casing.

The axis 36 of the phone actuating roller 31 extends to a position below the base portion 34a of the mount member 34. As shown in FIGS. 10A and 10B, a gear 41 is mounted at a lower part of the shaft 36. A urging gear 42 is in mesh with the gear 41, and a windup spring 43 is mounted on the gear 42, thereby constructing an urger for urging the phone actuating roller 31 in a specified direction.

On the lower part of the shaft 36 of the phone actuating roller 31 is provided a fluid damper 45 as shown in FIG. 10B as a decelerator. This fluid damper 45 is filled with fluid 46 having a specified viscosity such as a silicone oil and gives the resistance of the fluid 46 to the shaft 36 by positioning a plate piece 47 of, e.g., rectangular shape provided at the bottom end of the shaft 36 in the fluid 46.

As shown in FIGS. 11 to 15, the holder connector 8 is placed at the back of the outer casing 2 of the holder main body 1 while being held in a connector casing 50, and projects into the phone accommodating portion 4 through a rectangular opening 19 formed in the back wall of the inner casing 3. In the shown embodiment, in order to adjust the position of the connector of the holder main body 1 according to the position of the phone side connector 7 at the rear end surface of the mobile phone 6 which differs depending on the type of the mobile phone, the connector casing 50 holding the holder connector 8 is constructed such that the position thereof can be changed in a two-dimensional manner in directions normal to the length of the holder main body 1 (phone inserting/withdrawing directions) and can be adjusted as the inner casing 3 is inserted into the outer casing 2.

Specifically, the connector casing 50 has a box-like shape having an open front surface, and is elastically movably supported from four sides: upper, lower, left and right sides by a multitude of elastic support members 51 provided on the outer casing 2. Each elastic support member 51 includes a tube 52 provided on the outer casing 2 and a pin 53 which elastically projects by being supported by a spring member (not shown) provided in the tube 52. The elastic support members 51 are arranged at the upper, lower, left and right sides of the connector casing 50 to bring the respective pins 53 into contact with the connector casing 50, thereby holding the connector casing 50 in a specified neutral position when no external force is acting.

The rear end of the connector casing 50 is in slidable contact with the back wall of the outer casing 2, and semispherical protuberances 54 are provided at this slidable contact portion to reduce a frictional resistance.

The opening 19 in the back wall 3d of the inner casing 3 is in a position corresponding to the position of the connector of the mobile phone 6 to be used, and has a size corresponding to the connector casing 50. At a rear part of the opening 19 is formed a tapered portion 55 which widens toward the back. At the front end of the connector casing 50 is also formed a tapered portion 56 which narrows toward the front.

With the above construction, the connector casing 50 is fitted into the opening 19 as the inner casing 3 is inserted into the outer casing 2. At this time, even if the position of the connector casing 50 is displaced with respect to the opening 19, for example, as shown by phantom line in FIG. 12, the connector casing 50 is guided to the opening 19 by the tapered portions 55, 56. In other words, the position of the connector casing 50 is automatically adjusted to the one in conformity with the opening 19 as shown by solid line in FIG. 12.

In order to secure the connection of the connectors 7, 8 while the mobile phone 6 is accommodated, a connector locking mechanism 60 for locking the holder connector 8 with the phone side connector 7 is provided. This connector locking mechanism 60 is constructed such that the state thereof is switched between a locking state and an unlocking state as the mobile phone 6 is inserted into and withdrawn from the holder main body 1.

Specifically, an engaging recess 7a is formed at a part of the phone side connector 7 of the mobile phone 6 and engaging grooves 61 are formed in the opposite side walls of the engaging recess 7a. On the other hand, an engaging projection 8a is provided at the leading end of the holder connector 8 provided in the holder main body 1 and locking pieces 62 are provided on the opposite sides of the engaging projection 8a. The respective locking pieces 62 are elastically pivotal inwardly and outwardly by having the rear ends thereof elastically held in the holder connector 8. An unlock button (operable portion) 63 is mounted in an intermediate position of each locking piece 62. These unlock buttons 63 are projectably and retractably provided with respect to the opposite side surfaces of the holder connector 8.

The above connector locking mechanism 60 is also adopted in conventional connectors. In this embodiment, in order to automatically unlock the connection of the connectors 7, 8 when the mobile phone is taken out, the holder connector 8 is made movable along forward and backward directions with respect to the connector casing 50 only within a specified range, and pushing portions (connector operating portions) 64 for pushing the unlock buttons 63 are projectingly provided at the front ends of the opposite side walls of the connector casing 50. When the holder connector 8 is located at a rear side of the movable range with respect to the connector casing 50, the pushing portions 64 and the unlock buttons 63 are displaced along forward and backward directions, with the result that the unlock buttons 63 project. When the holder connector 8 is moved to the front side of the movable range with respect to the connector casing 50, the pushing portions 64 push the unlock buttons 63, thereby retracting the unlock buttons 63 and the locking pieces 62 accordingly.

Spring mount portions 65 project from the upper and lower surfaces of the holder connector 8, and a coil spring (connector urger) 66 for urging the holder connector 8 forward is mounted between each spring mount portion 65 and the connector casing 50. The urging forces of the coil springs 66 are set larger than a coupling force of the connectors 7, 8. A wire connected with a controller or the like is connected with the holder connector 8. Identified by 67 is a wire extending from the connector.

Next, the action of this phone holder is described.

First, the outer casing 2 is fixed in a suitable position in a passenger compartment of an automotive vehicle. One inner casing 3 having the size corresponding to the size of the mobile phone 6 and the opening 19 in such a position in conformity with the position of the phone side connector 7 is selected from a plurality of types of inner casings 3, and is fitted into the outer casing 2. At this time, as described above, the connector casing 50 provided in advance in the outer casing 2 is fitted into the opening 19 formed at the rear end of the inner casing 3 by being guided by the tapered portions 55, 56, with the result that the position of the holder connector 8 in the connector casing 50 is automatically adjusted so as to correspond to the phone side connector 7. Further, the inner casing 3 is fixed to the outer casing 2 by the elastic lock portion 13. In this way, the phone holder corresponding to the mobile phone 6 to be used is constructed.

In order to accommodate the mobile phone 6 in the phone holder, the mobile phone 6 is inserted into the phone accommodating portion 4 inside the inner casing 3 from front. At this time, since the curved surface is formed at the front end of the upper plate 3e of the inner casing 3, the mobile phone 6 can be easily guided even if the position and angle of the mobile phone 6 with respect to the phone accommodating portion 4 are slightly displaced, and the position and angle of the mobile phone 6 are gradually corrected as the mobile phone 6 is inserted into the phone accommodating portion 4. When the mobile phone 6 approaches a specified accommodation position, the engaging grooves 17 in the opposite side surfaces of the mobile phone 6 engage the rails 16 provided on the inner casing 3, with the result that the mobile phone 6 can be properly positioned.

During the insertion of the mobile phone 6, the phone actuating roller 31 of the phone urger 30 provided in the holder main body 1 and the idle roller 32 come into contact with the opposite side surfaces of the mobile phone 6. As the mobile phone 6 is inserted, the phone actuating roller 31 is rotated in a direction opposite from the specified direction, twisting the windup spring 43 via the gears 41, 42, with the result that a force for urging the roller 31 in the specified rotation direction is stored. This force acts as a urging force for returning the mobile phone 6 in a direction opposite from the inserting direction (i.e., in a feeding direction).

Figure 7A:
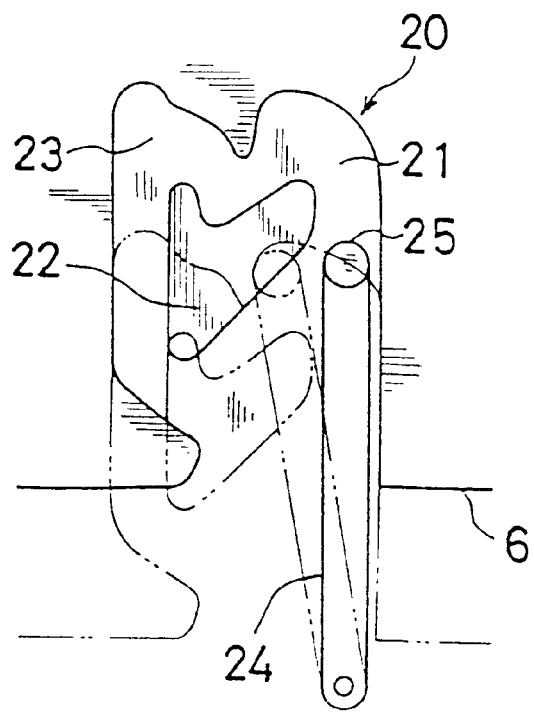
Figure 7B:
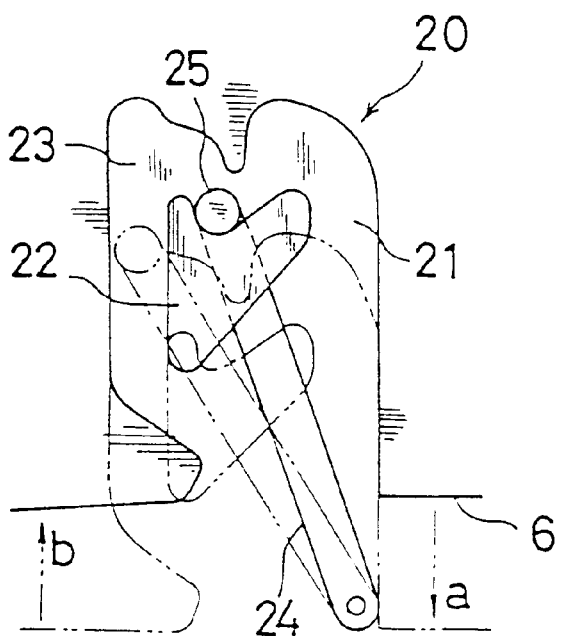
Figure 8:
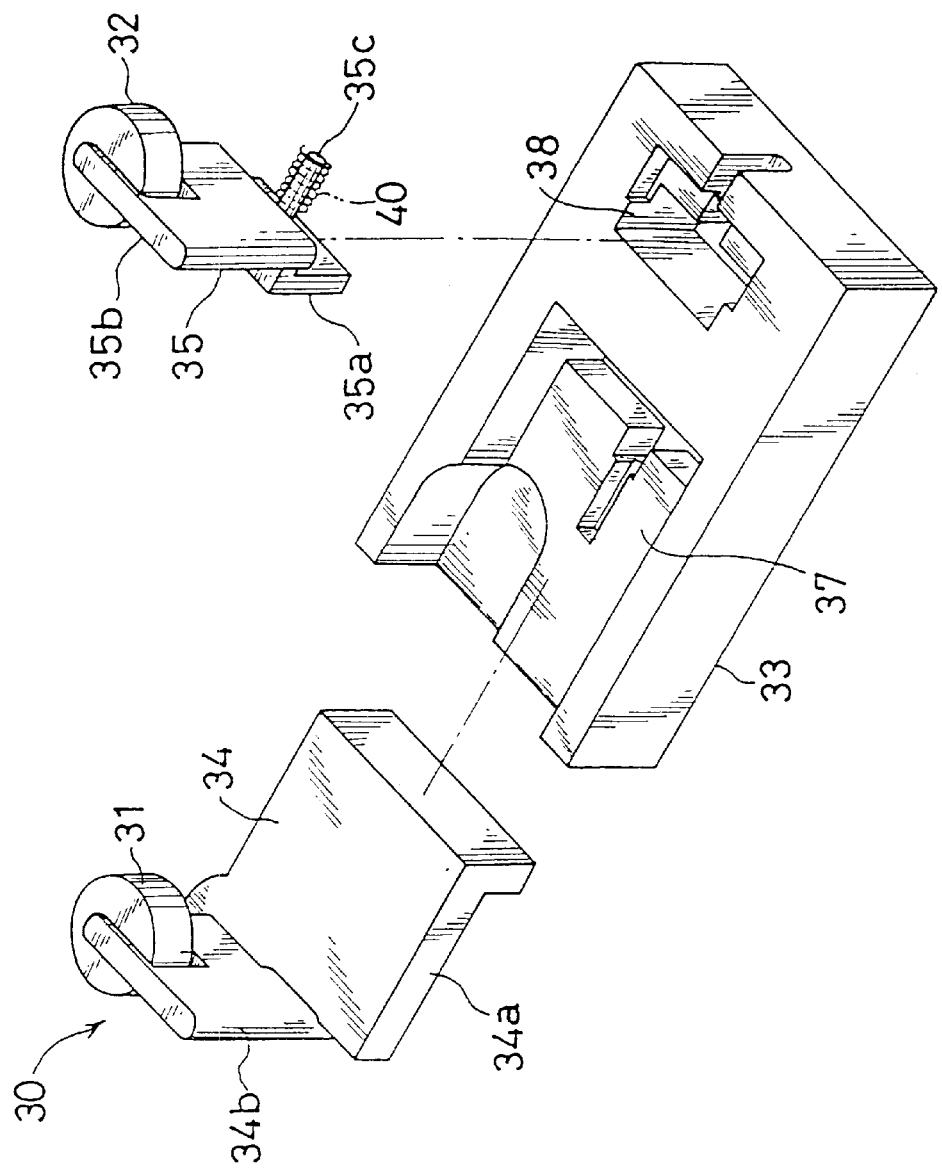
FIG. 8 is an exploded perspective view of one unit of the phone holder including a phone actuating roller and an idle roller.
Figure 9:
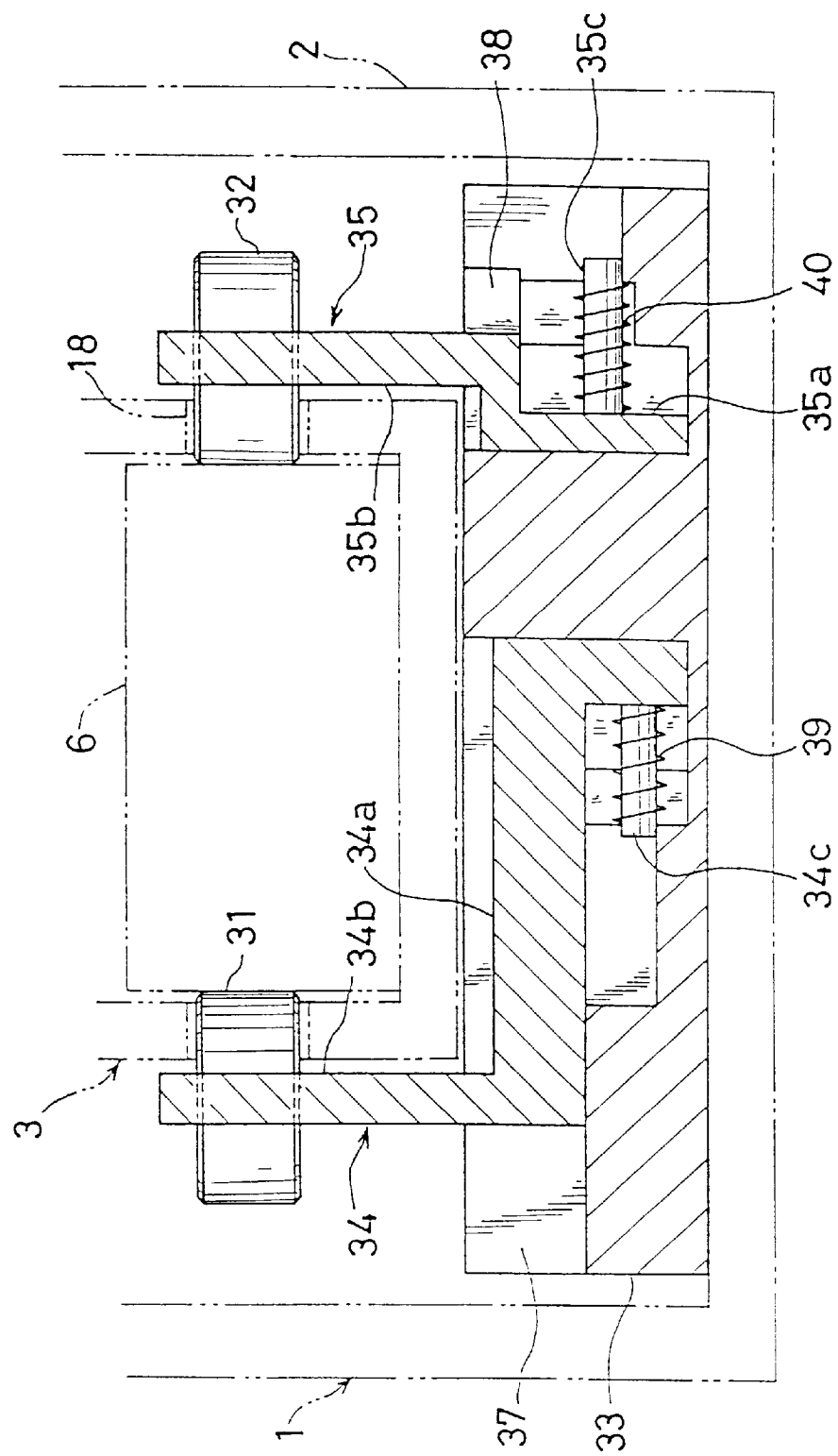
FIG. 9 is a section view of the unit shown in FIG. 8.

When the mobile phone 6 is inserted to the specified accommodation position, the phone lock device 20 is locked. Specifically, as shown in FIG. 7A, as the mobile phone 6 moves backward, the pin 25 at the leading end of the rod 24 provided on the inner casing 3 enters the guide groove 23 at the periphery of the substantially heart-shaped cam 22 provided on the battery 6b of the mobile phone 6 (state shown by solid line). The rod 24 pivots, thereby further moving the pin 25 along the guide groove 23 to be opposed to the cam 22 (state shown by phantom line). The mobile phone 6 is slightly pushed back by a urging force given from the phone urger 30, with the result that the pin 25 and the cam 22 are locked as shown in FIG. 7B and the mobile phone 6 is locked in the specified accommodation position against the urging force.

Figure 14:
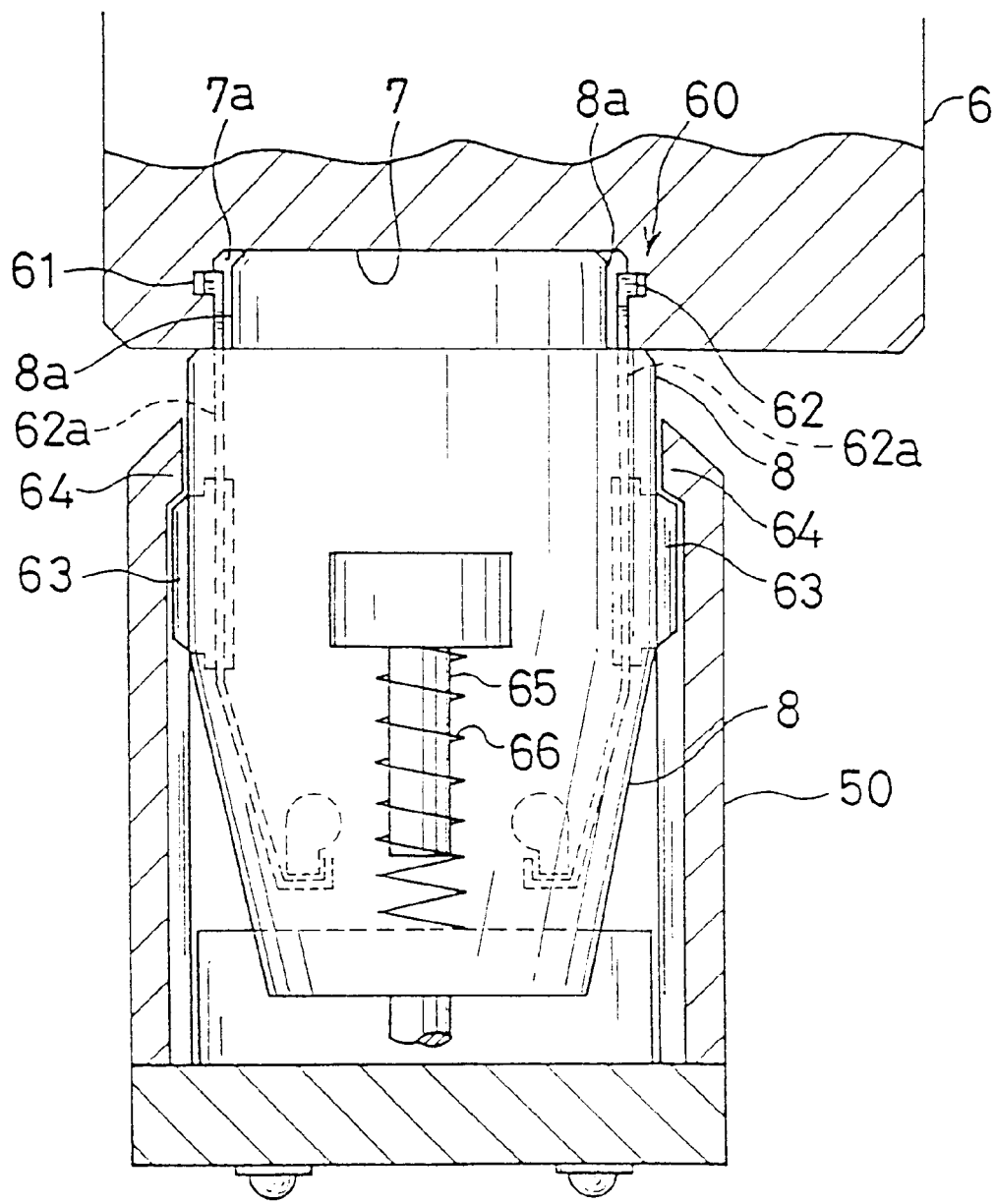
FIG. 14 is a partially sectional view showing the connection of a phone side connector provided at a rear end of the mobile phone and the holder connector and a lock state of a connector locking mechanism.
Figure 15:
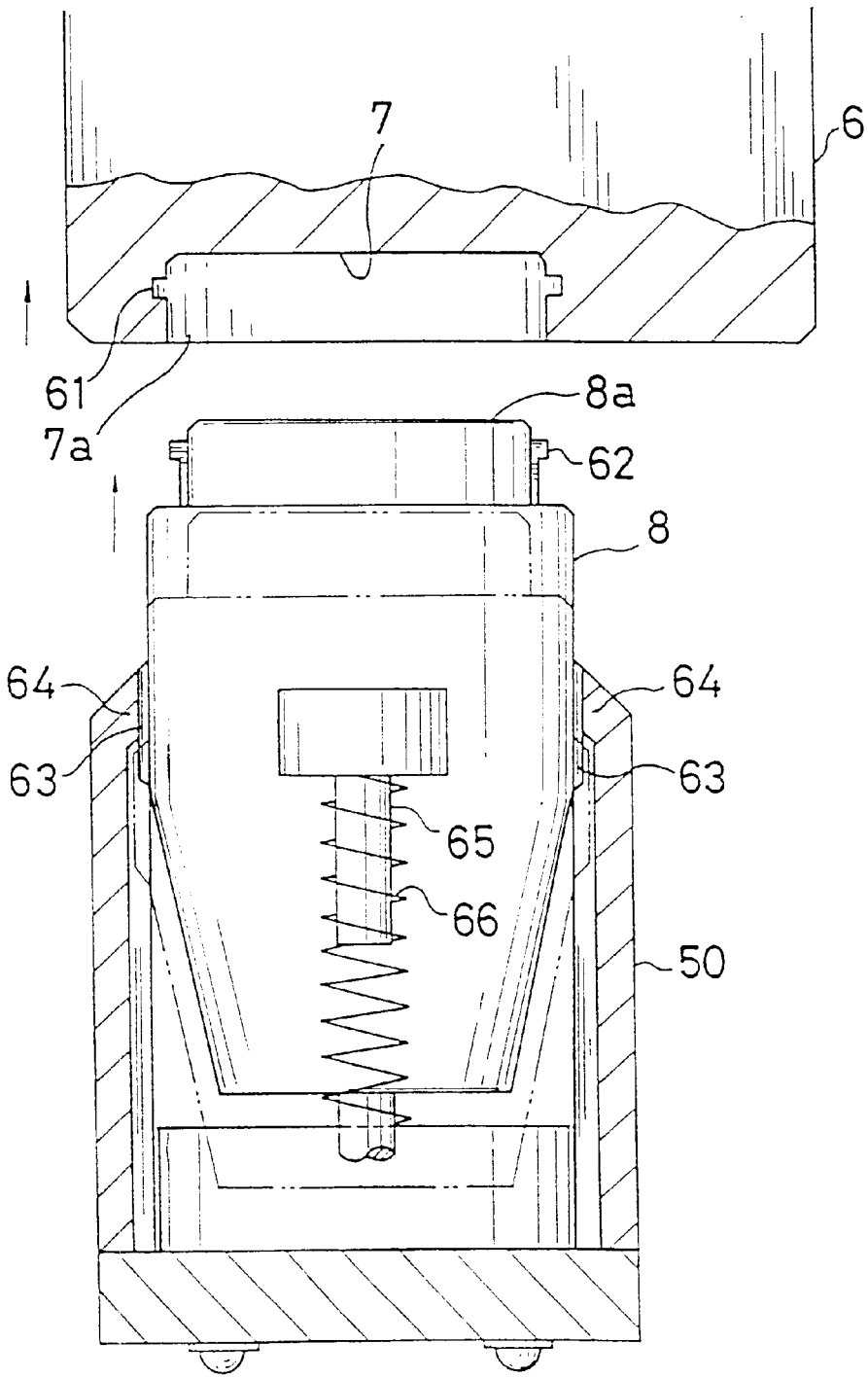
FIG. 15 is a partially sectional view showing the connectors separated by bringing the connector locking mechanism into its unlocking state.

Simultaneously, the phone side connector 7 at the rear end of the mobile phone 6 and the holder connector 8 are engaged as shown in FIG. 14, and are pushed back inside the connector casing 50. In this state, the locking pieces 62 of the connector locking mechanism 60 are engaged with the engaging grooves 61, thereby locking the connection of the connectors 7, 8 and stabilizing an electrical connection established therebetween.

As described above, only by inserting the mobile phone 6 into the holder main body 1, the mobile phone 6 is locked in the specified accommodation position and, at the same time, the connectors 7, 8 can be securely connected. In this state, an inadvertent and unexpected fall of the mobile phone 6 from the holder main body 1 is prevented and handsfree conversation and charging are enabled.

Next, when the mobile phone 6 is taken out of the phone accommodating portion 4, it is sufficient to release a pushing force after the mobile phone 6 is pushed in again from front. By doing this, in the phone lock device 20, the pin 25 is moved along the bent portion of the guide groove 23 as the mobile phone 6 is moved backward (arrow a) from the lock state shown by solid line in FIG. 7B. As a result, the rod 24 is pivoted sideways as shown by phantom line in FIG. 7B. Subsequently, as the pushing force is released, the mobile phone 6 advances (arrow b) upon being subjected to the urging force from the phone urger 30. As a result, the pin 25 of the rod 24 comes out of the guide groove 23 on the side of the cam 22, effecting unlocking.

As the mobile phone 6 is unlocked and moved in the direction (feeding direction) opposite from the inserting direction in this way, the holder connector 8 is moved to a position in front of the movable range and the unlock buttons 63 are pressed by pushing portions 64 at the front end of the connector casing 50. As a result, locking by the connector locking mechanism 60 is also automatically released (see FIG. 15).

In the phone urger 30, while the phone actuating roller 31 and the idle roller 32 are in contact with the opposite side surfaces of the mobile phone 6, the phone actuating roller 31 is rotated in the specified direction by the force of the windup spring 43 transmitted via the gears 41, 42. As a result, the mobile phone 6 advances to a position where it projects from the phone accommodating portion 4 by a specified length. At this time, a proper degree of resistance is given to the rotation of the shaft 36 of the phone actuating roller 31 by the damper 45, and the mobile phone 6 moderately advances to the specified position.

As described above, only by releasing the pressing force after pushing the mobile phone 6 into the phone accommodating portion 4, the mobile phone 6 and the connectors 7, 8 are automatically unlocked and the mobile phone 6 advances a specified distance so that it can be easily taken out by hand. Further, the suppressed feeding speed of the mobile phone 6 prevents the mobile phone 6 from jumping out of the phone holder and adds an exclusive value to the mobile phone 6.

In the first embodiment, the construction for positioning the mobile phone 6 when it is inserted up to a position in vicinity of the specified accommodation position is comprised of the rails 16 provided on the inner casing 3 and the engaging grooves 17 formed in the mobile phone 6. However, engaging grooves may be formed in the inner surfaces of the front parts of the opposite side walls of the inner casing 3 and elongated projections engageable with these engaging grooves may be provided on the front parts of the opposite side surfaces of the mobile phone 6.

Further, in the phone urger 30, the windup spring 43 for giving a urging force to the phone actuating roller 31 via the gears 41, 42 is provided as the urger for urging the roller 31 in the specified rotation direction according to the invention. However, a spring or the like may be directly mounted on the shaft of the roller 31.

The damper for giving a resistance to the shaft 36 of the phone actuating roller 31 is not only the fluid damper 45 shown in the first embodiment, but may be a friction damper.

A second embodiment of the invention is described with reference to FIGS. 16 to 34.

Figure 16:
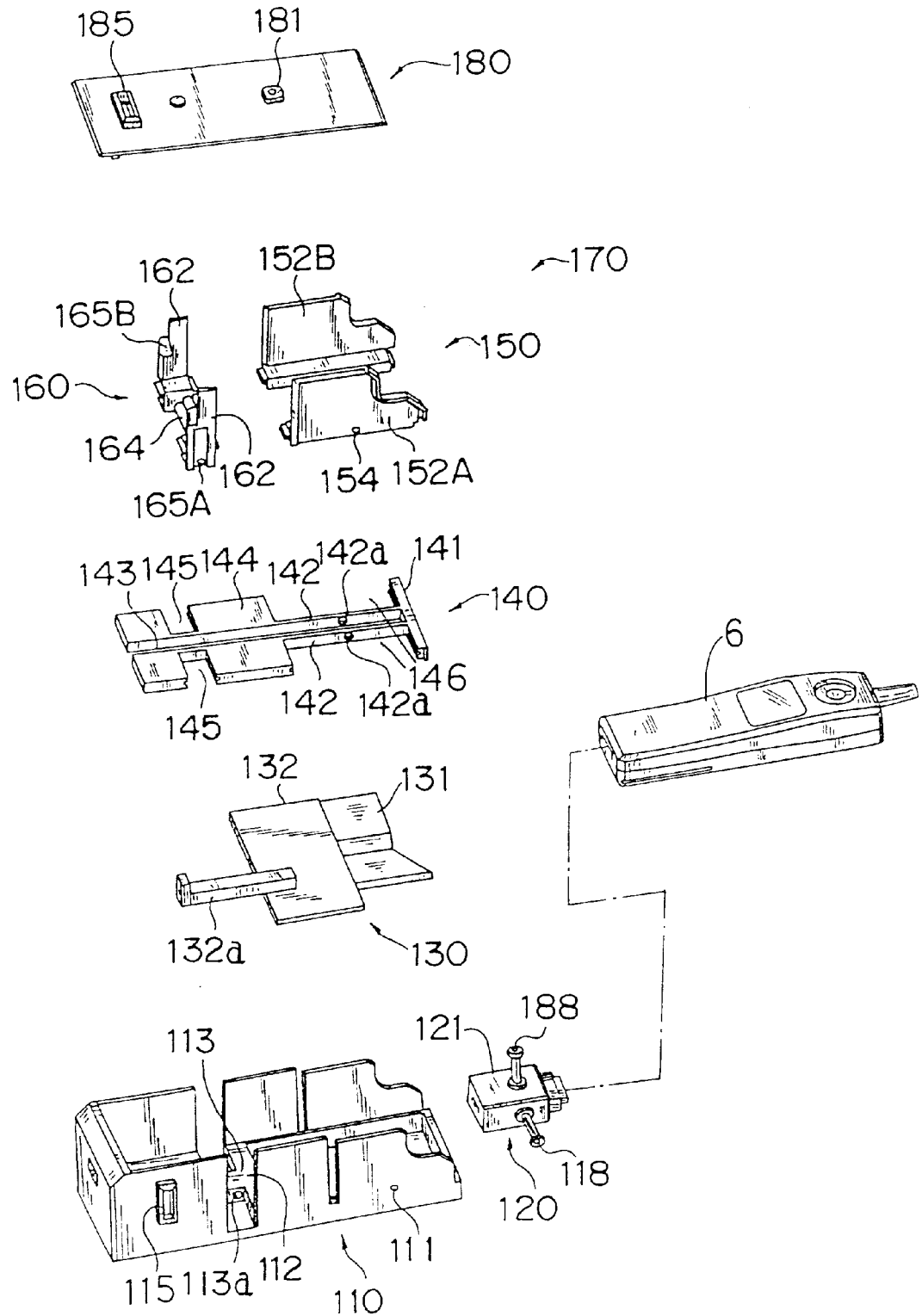
FIG. 16 is an exploded perspective view of the phone holder according to a second embodiment of the invention.
Figure 17:
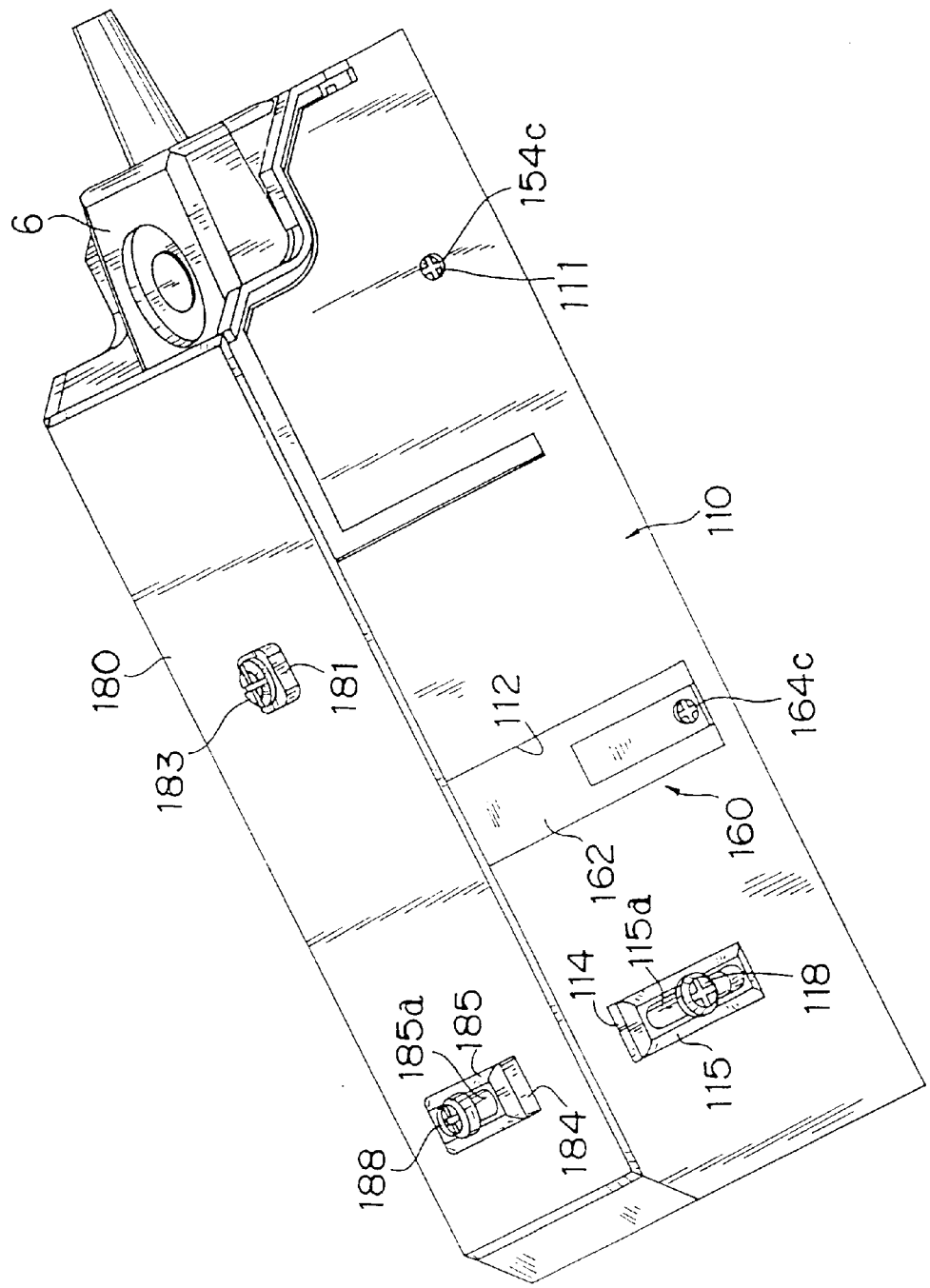
FIG. 17 is a perspective view of the phone holder of FIG. 16 in its assembled state.
Figure 18:
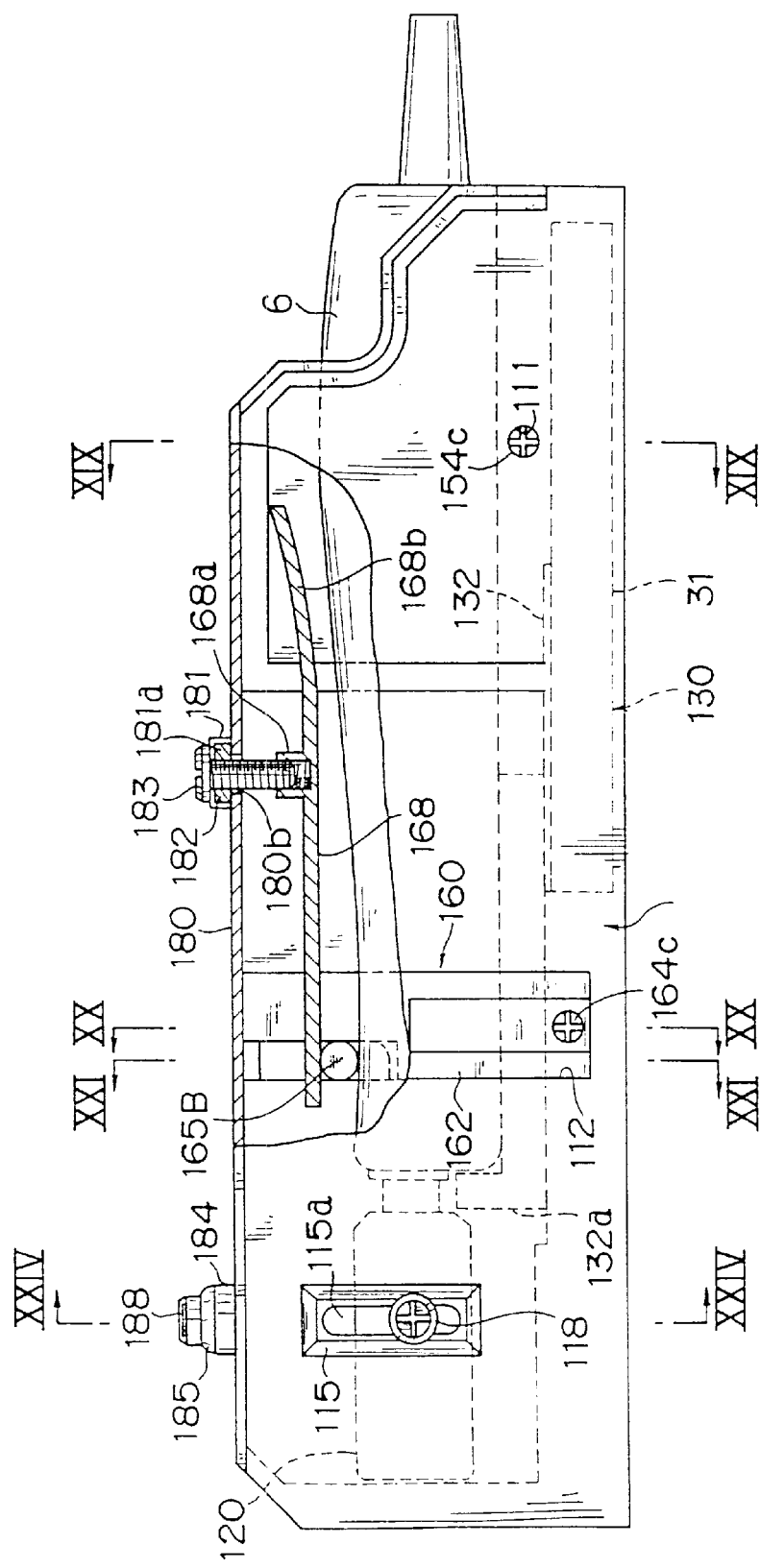
FIG. 18 is a side view partially in section of the phone holder of FIG. 16.
Figure 19:
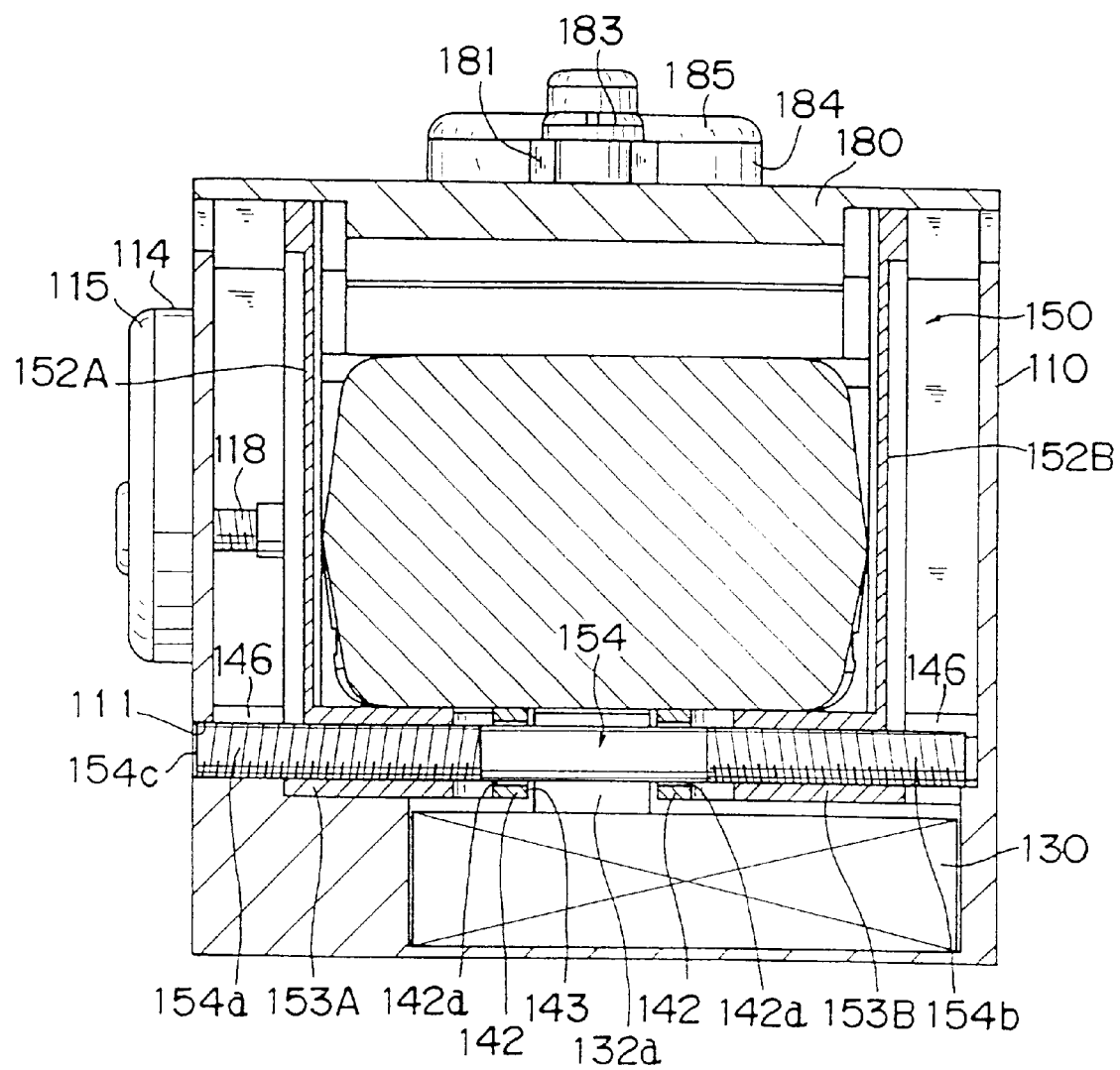
FIG. 19 is a sectional view taken along the line XIX—XIX in FIG. 18.
Figure 20:
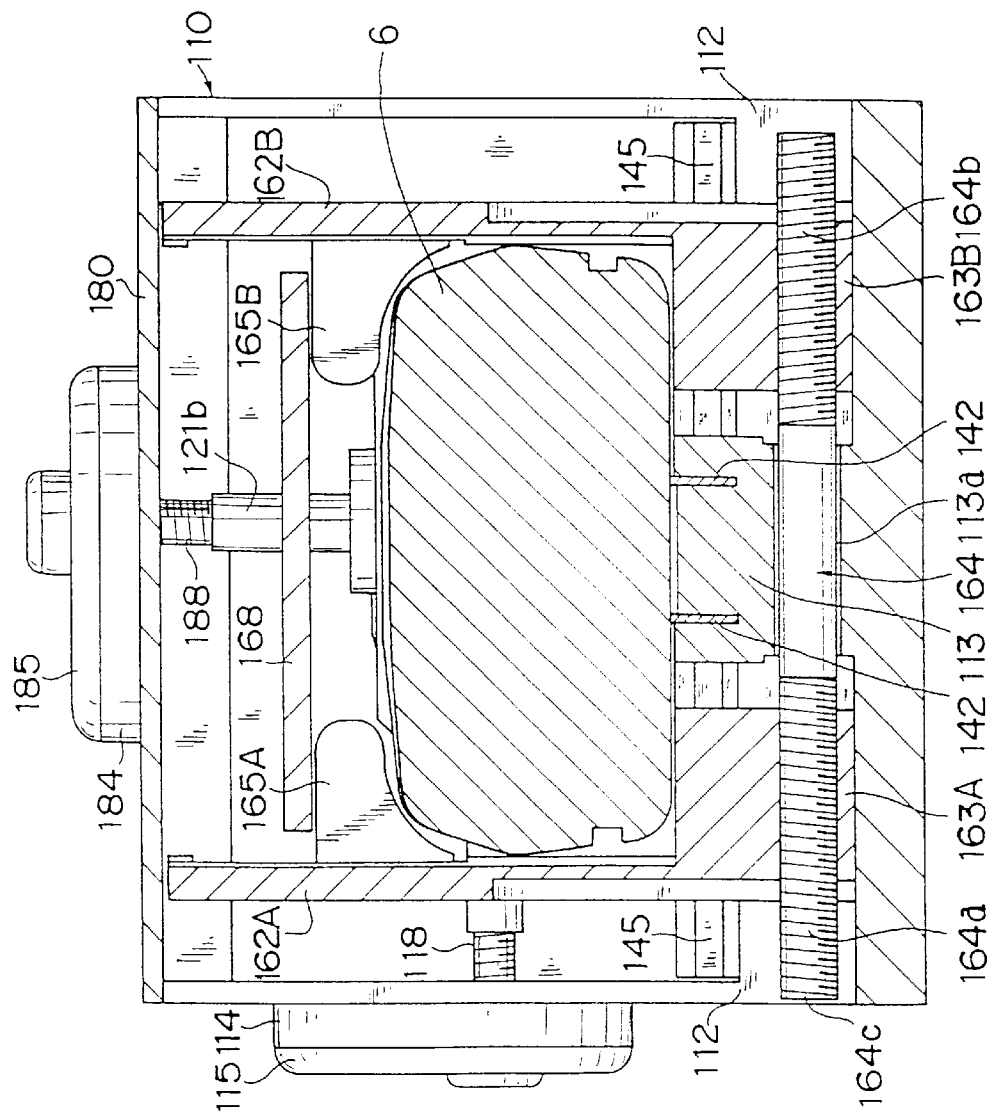
FIG. 20 is a sectional view taken along the line XX—XX in FIG. 18.

The phone holder according to this embodiment is, as shown in FIG. 16, comprised of an outer box 110, a connector module 120, a phone ejector module 130, an inner bottom frame 140, an adjustment module 170 including a pair of inner walls (movable portions) 150, 160, and a ceiling wall 180.

The outer box 110 has a hollow enclosure having opening at one end (right side in FIGS. 16 to 18: hereinafter, "phone entrance side") with its length and at its upper side as shown in FIGS. 17 to 22. By mounting the ceiling wall 180 on the outer box 110 so as to close the upper side opening thereof, a holder main body according to the invention is formed. This holder main body is fixed in a proper position of a passenger compartment of an automotive vehicle.

In each of the opposite side walls of the outer box 110 are formed a round through hole 111 and a notch 112 in this order from the phone entrance side. Each notch 112 is rectangular shaped and open upward and is formed in a position immediately before (right side in FIGS. 16 to 18) a position where the connector module 120 to be described later is arranged. Where the notches 112 are formed, an upward bulging projected portion 113 (see FIGS. 20, 21) is formed in a middle of the bottom wall of the outer box 110 with respect to widthwise direction. A through hole 113a is formed in this projected portion 113 so as to extend therethrough along widthwise direction (transverse direction in FIG. 20).

Figure 24:
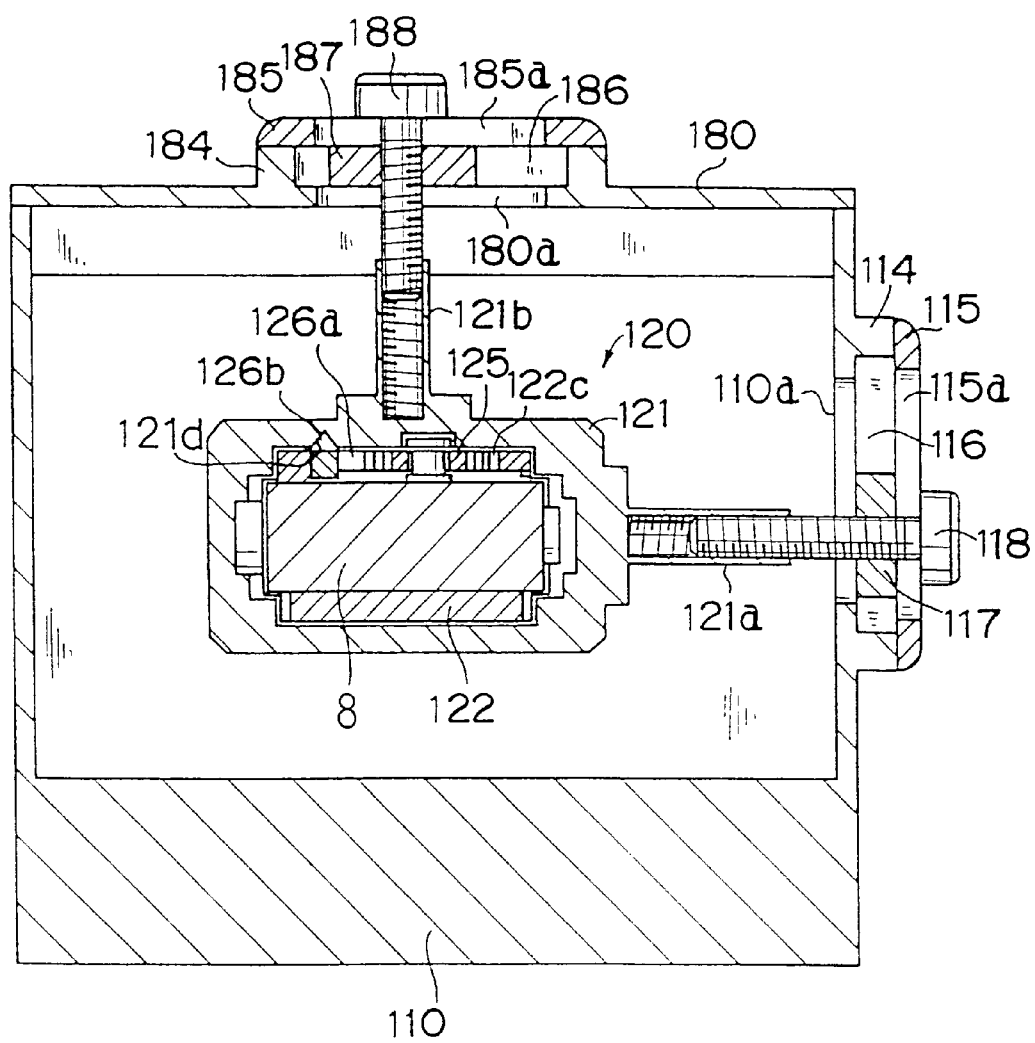
FIG. 24 is a sectional view taken along the line XXIV—XXIV in FIG. 18.

A vertically extending long through hole 110a as shown in FIG. 24 is formed at a rear part of one side wall of the outer box 110. This through hole 110a is formed in a position at the side of the arrangement position of the connector module 120. On the outer side surface of the side wall of the outer box 110 where this through hole 110a is formed is provided a frame 114 which is so shaped as to enclose the hole 110a from four sides. A cover 115 is mounted on the frame 114 to close it. A vertically extending long through hole 115a is also formed in the cover 115. A nut 117 of polygonal shape is accommodated in a space 116 defined by the frame 114 and the cover 115.

This nut 117 is held by the frame 114 from opposite sides along the length of the phone holder (depth direction of FIG. 24) and is held also by the outer surface of the side wall of the outer box 110 and the inner surface of the cover 115 from opposite sides along height direction of the frame 114 (transverse direction of FIG. 24). The nut 117 is unrotatably slidable only along vertical direction in the space 116 in a position where an internally threaded hole thereof is in conformity with the through holes 110a, 115a.

Similarly, a transversely extending long through hole 180a as shown in FIG. 24 is formed in the ceiling wall 180 above the arrangement position of the connector module 120. On the upper surface of the ceiling wall 180 is provided a frame 184 which is so shaped as to enclose the hole 180a from four sides. A cover 185 is mounted on the frame 184 to close it. A transversely extending long through hole 185a is also formed in the cover 185. A nut 187 of polygonal shape is accommodated in a space 186 defined by the frame 184 and the cover 185.

This nut 187 is held by the frame 184 from opposite sides along the length of the phone holder and is held also by the outer surface of the side wall of the outer box 110 and the inner surface of the cover 185 from opposite sides along vertical direction. The nut 187 is unrotatably slidable only along transverse direction of FIG. 24 in the space 186 in a position where an internally threaded hole thereof is in conformity with the through holes 180a, 185a.

A holder connector 8 is so constructed as to be engageable with a phone side connector 7 assembled at the rear end of the mobile phone 6, and retained in a retainer housing of the connector module 120. This retainer housing includes an outer housing 121 and an inner housing 122 and is fixed to the holder main body.

Figure 25:
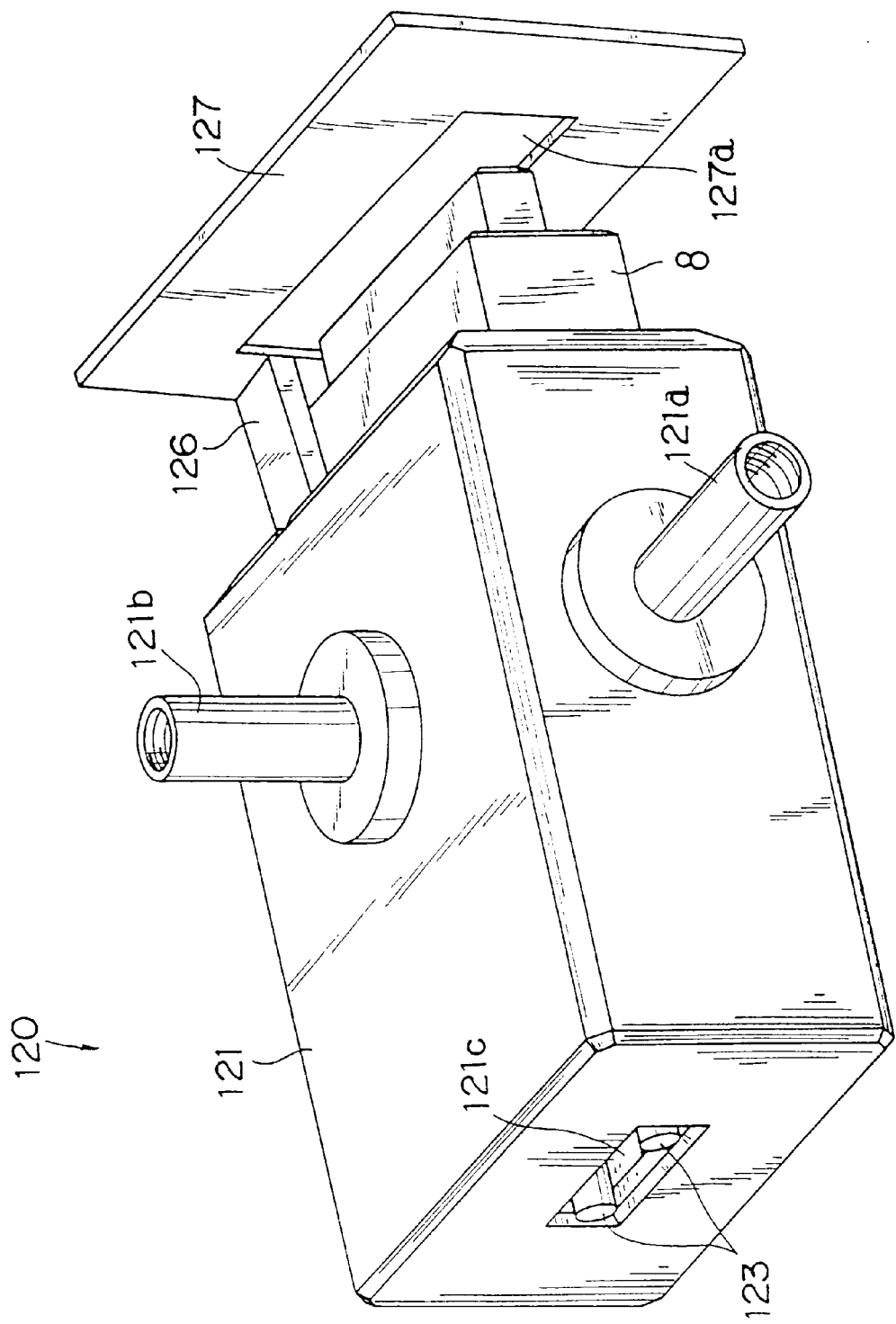
FIG. 25 is a perspective view of a connector module of the phone holder of FIG. 16.

As shown in FIGS. 24 and 25, a transversely extending cylindrical nut 121*a* is formed on one side surface of the outer housing 121. This nut 121*a* is open toward the through hole 110*a*, and a thread formed in the inner surface thereof is oriented in the same direction as the internally threaded hole of the nut 117. An end portion of a bolt 118 screwed to the nut 117 through the through hole 115*a* from the outside of the holder main body is screwed into the nut 121*a*. In other words, the outer housing 121 is coupled with one side wall of the outer box 110 via the transversely extending bolt 118.

Similarly, a vertically extending cylindrical nut 121*b* is formed on the upper surface of the outer housing 121. This nut 121*b* is open toward the through hole 180*a* formed in the ceiling wall 180. An end portion of a bolt 188 screwed to the nut 187 through the through hole 185*a* from the outside of the holder main body is screwed into the nut 121*b*. In other words, the outer housing 121 is coupled with the ceiling wall 180 via the vertically extending bolt 118.

As shown in FIGS. 24, 26 to 28, the inner housing 122 is open forward (upward in FIGS. 27 and 28) and has a middle portion of its ceiling wall along transverse direction opened upward. The holder connector 8 is slidably fittable into the inner housing 122 along forward and backward directions.

A pair of left and right pins 123 project backward from the rear end surface (bottom end surface in FIGS. 27 and 28) of the holder connector 8. The holder connector 8 is guided in inserting and ejecting directions of the mobile phone 6 by inserting these pins 123 into through holes 122*a* formed in a back wall 122*b* of the inner housing 122. Further, coil springs (connector urger) 124 are mounted on the respective pins 123, thereby urging the holder connector 8 forward (upward in FIGS. 27 and 28) by urging forces of the coil springs 124. Further, a through hole 121*c* is formed in the rear wall of the outer housing 121 in order to avoid interference with the pins 123.

On the housing of the holder connector 8 is mounted a pinion 125 rotatably about a vertically extending rotatable shaft 125*a*. On the other hand, a rack 122*c* meshable with the pinion 125 is formed at one inner periphery of the ceiling wall of the inner housing 122. Accordingly, as the pinion 125 is rotated, the connector holder 8 is slid along forward and backward directions with respect to the inner housing 122.

This connector module 120 is also provided with an operable member including an integral assembly of a coupling bar 126 and a contact plate 127. The coupling bar 126 extends along forward and backward directions and has a rack 126*a* and a guided portion 126*b* in the form of a triangular column at its rear half. While the rack 126*a* is in mesh with the pinion 125, the guided portion 126*b* is fitted in a V-shaped guide groove 121*d* (see FIG. 24) formed in the outer housing 121. Accordingly, the entire coupling bar 126 is slidably guided along forward and backward directions.

Figure 27:
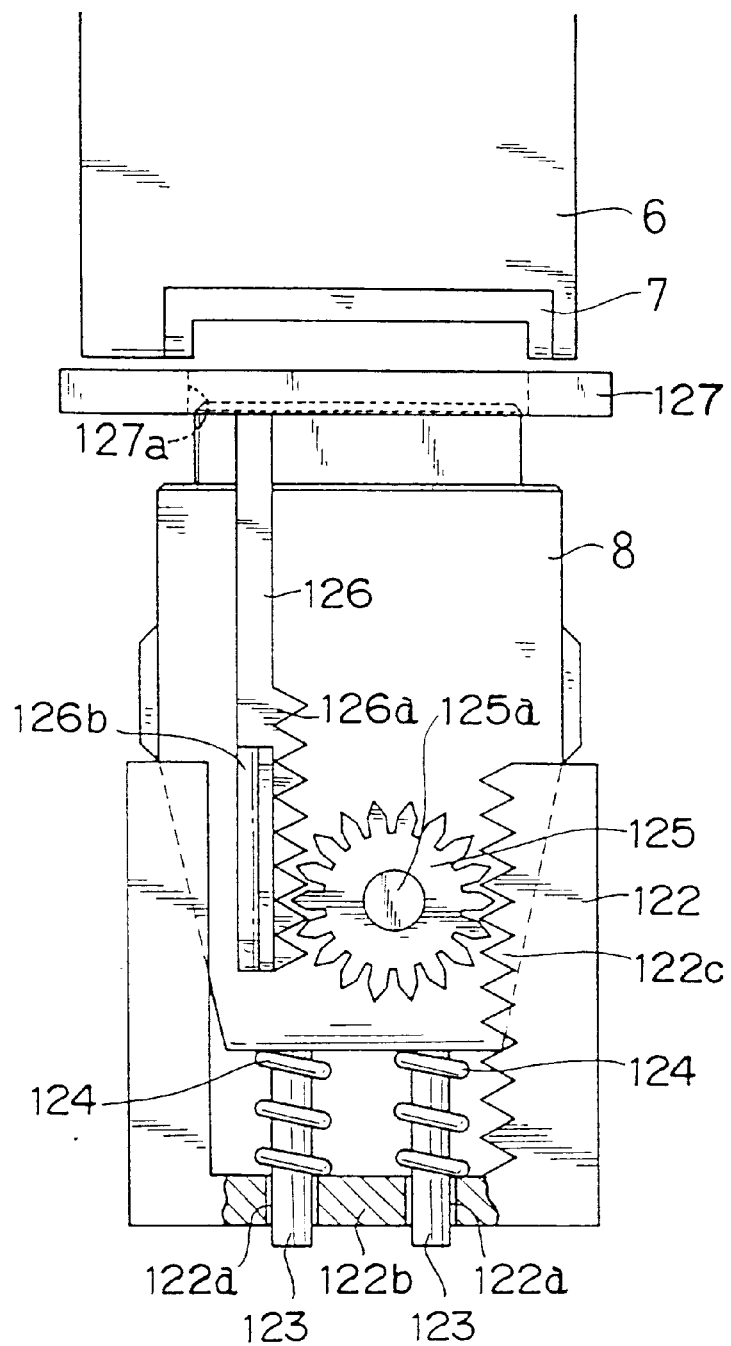
FIG. 27 is a plan view showing a state before a connector of the connector module is connected with a mobile phone.
Figure 28:
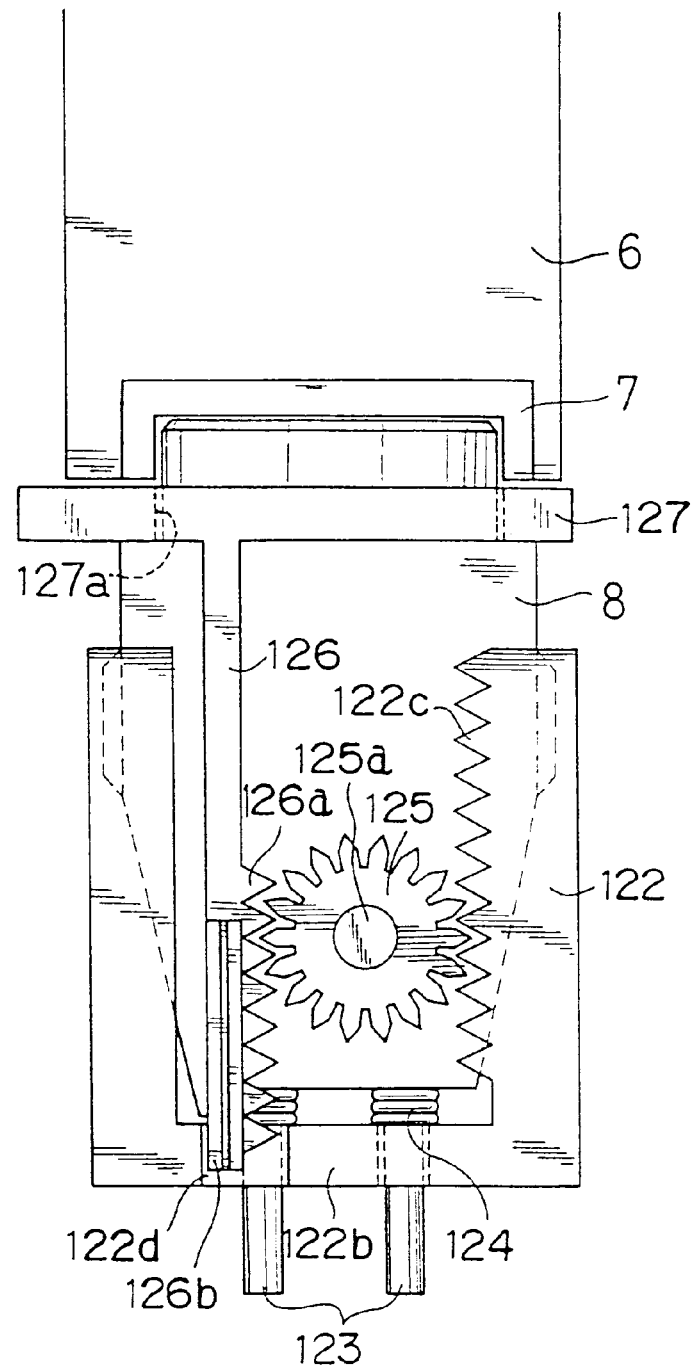
FIG. 28 is a plan view showing a state after the connector of the connector module is connected with the mobile phone.

The contact plate 127 extends in a direction normal to the phone inserting direction and is integrally connected with the front end of the coupling bar 126 so as to be brought into contact with the rear end of the mobile phone 6 inserted into the holder main body. A rectangular opening 127*a* which permits the passage of the holder connector 8 is formed in the middle of the contact plate 127. The slide stroke of the holder connector 8 is set such that the contact plate 127 is positioned more forward than the holder connector 8 in a state where the holder connector 8 is pushed to its foremost position by the urging forces of the coil springs 124 as shown in FIG. 27, and the connection of the holder connector 8 and the phone side connector 7 of the mobile phone 6 is completed through the opening 127*a* of the contact plate 127 in a position slightly before a rearmost position where the holder connector 8 is retracted against the urging forces of the coil springs 124 as shown in FIG. 28.

Figure 29:
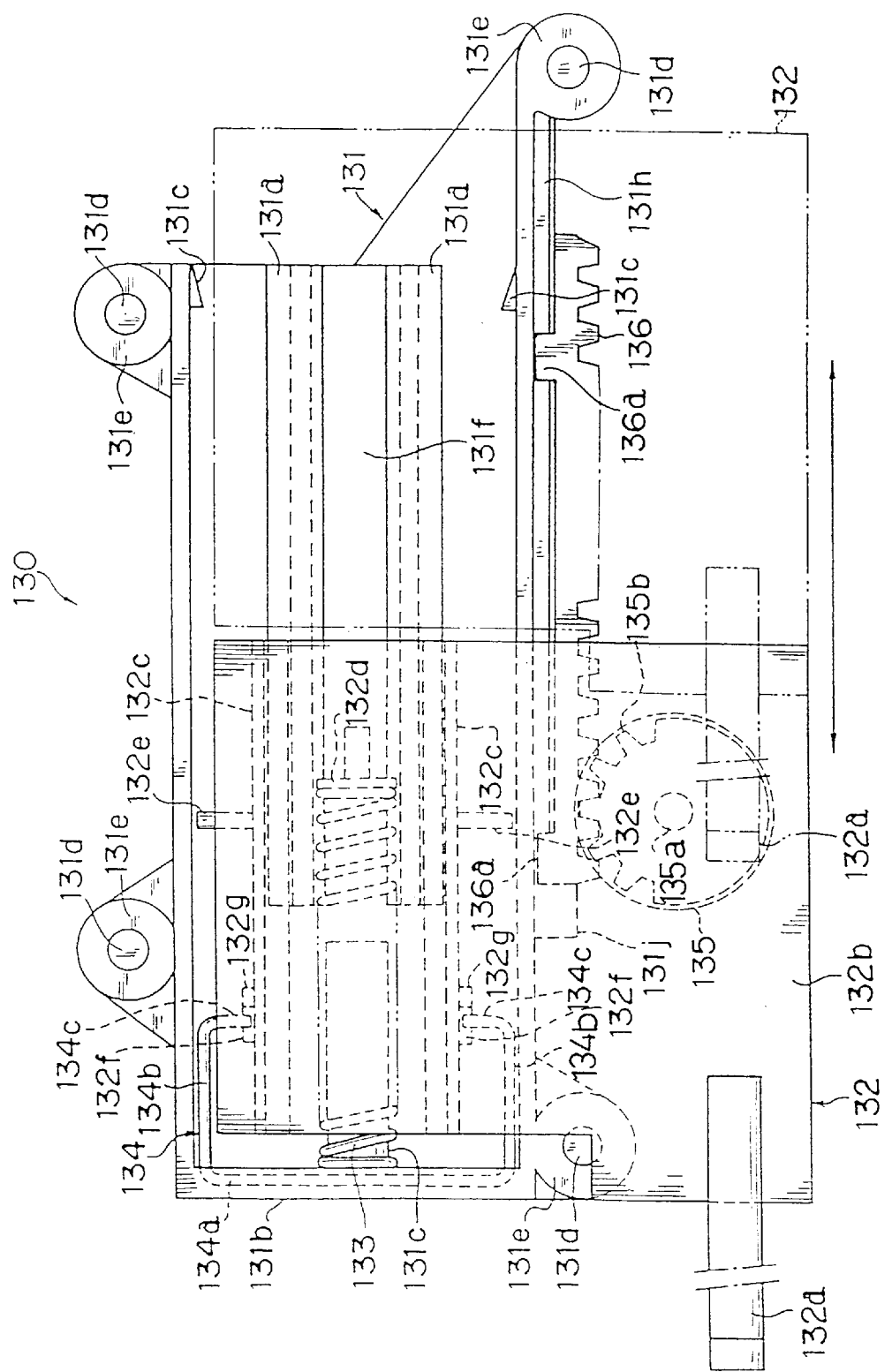
FIG. 29 is a plan view showing a state where a slider is retracted to a locking position in an ejector module of the phone holder of FIG. 16.
Figure 30:
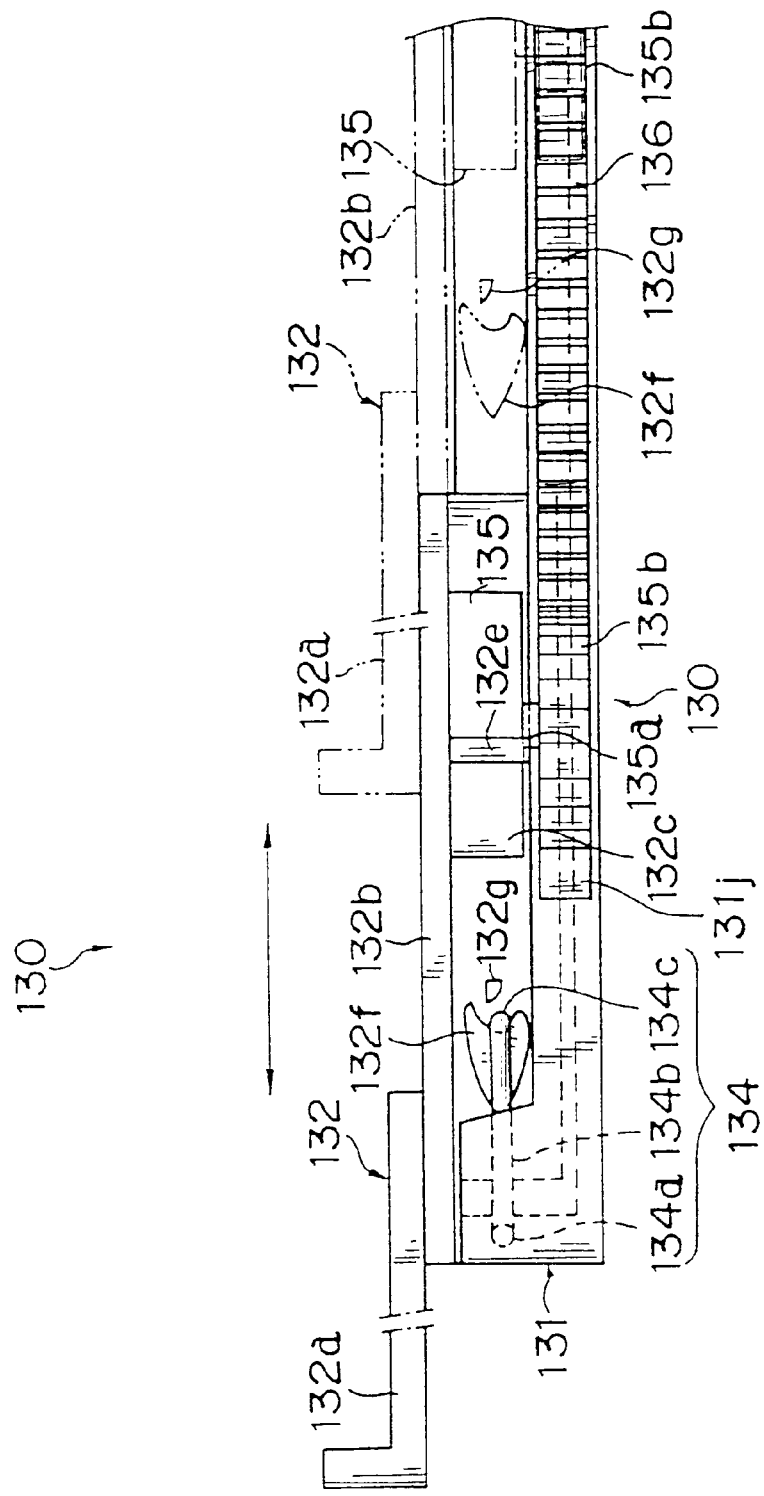
FIG. 30 is a side view of the ejector module.
Figure 31:
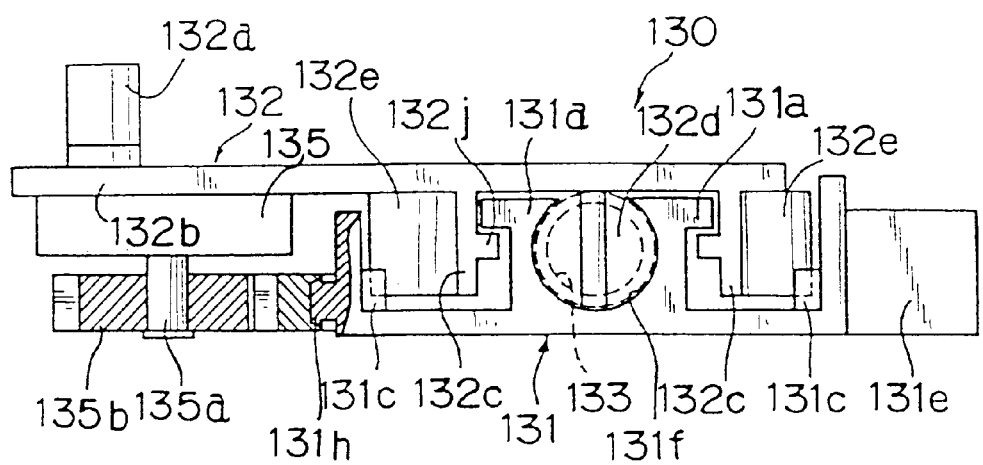
FIG. 31 is a front view of the ejector module.

The phone ejector module 130 is adapted to provide the mobile phone 6 with a pushing force (urging force) necessary to disengage the phone side connector 7 of the mobile phone 6 from the holder connector 8 when the mobile phone 6 is ejected from the phone holder, and includes a base member 131 and a slider (phone pushing member) 132 as shown in FIGS. 29 to 31.

Cylindrical mount portions 131*e* each having a vertically extending bolt insertion hole 131*d* are provided in specified positions of the base member 131. By inserting bolts into the respective bolt insertion holes 131*d* and screwing the bolts into unillustrated internally threaded holes formed in the bottom wall of the outer box 110, the base member 131 is fixed to a suitable bottom portion of the outer box 110.

A rail 131*a* extending in the phone inserting direction (transverse direction of FIG. 29) is provided on the upper surface of the base member 131. This rail 131*a* has a substantially T-shaped cross section when viewed from front as shown in FIG. 31, and a groove 131*f* having a substantially circular cross section is so formed as to open upward.

The slider 132 has a horizontal main plate 132*b*, and a pair of left and right vertical walls 132*c* projecting from the lower surface of the main plate 132*b*. Both vertical walls 132*c* extend in the phone inserting direction, and elongated projections 132*j* project inward from the inner side surfaces of the vertical walls 132*c*. The slider 132 is slidably supported on the bas e member 131 (along phone inserting direction) by engaging the vertical walls 132*c* and the elongated projections 132*j* with an upper end portion of the rail 131*a*. An arm 132*a* which has a substantially L-shaped cross section when viewed sideways and has a rear end projecting up ward is fixed to the upper surface of the main plate 132*b* of the slider 132, and the rear end surface of the mobile phone 6 can be brought into contact with the rear end of the arm 132*a*.

A rear wall 131*b* stands substantially upright at the rear end (left end in FIG. 29) of the base member 131, and a cylindrical support mount shaft 131*c* projects forward from a middle position of the rear wall 131*b*. A rear part of a coil spring (phone urger) 133 is mounted on this spring support shaft 131*c*, and a front part thereof is fitted into the groove 131*f* of the rail 131*a*. On the other hand, a spring support plate 132*d* is in contact with the lower surface of the slider 132 and is fitted in the groove 131*f*.

The coil spring 133 is held between the spring support plate 132*d* and the rear wall 131*b*, and the slider 132 is urged forward (to the right in FIGS. 29 and 30) by the elastic force of the coil spring 133. Further, stoppers 131*k* project at the opposite ends of the front part of the base member 131, whereas contact pieces 132*e* project outward from the vertical walls 132*c* of the slider 132. A position where the contact pieces 132 and the stoppers 131*c* are in contact with each other is a foremost end position (position shown by phantom line in FIG. 29) of the slider 132.

At a rear part of the base member 131 is provided a locking bar 134 (pivotal member) for locking the slider 132.

This locking bar 134 includes a base shaft 134a extending along the widthwise direction of the mobile phone 6 (vertical direction in FIG. 29), a pair of arms 134b extending forward from the opposite ends of the base shaft 134a, and locking portions 134c extending inward from the front ends of the respective arms 134b. The base shaft 134a is pivotally supported on the rear wall 131b. Further, a spacing between the leading ends of the locking portions 134c is set slightly larger than a spacing between the outer surfaces of the vertical walls 132c of the slider 132.

Figure 32:
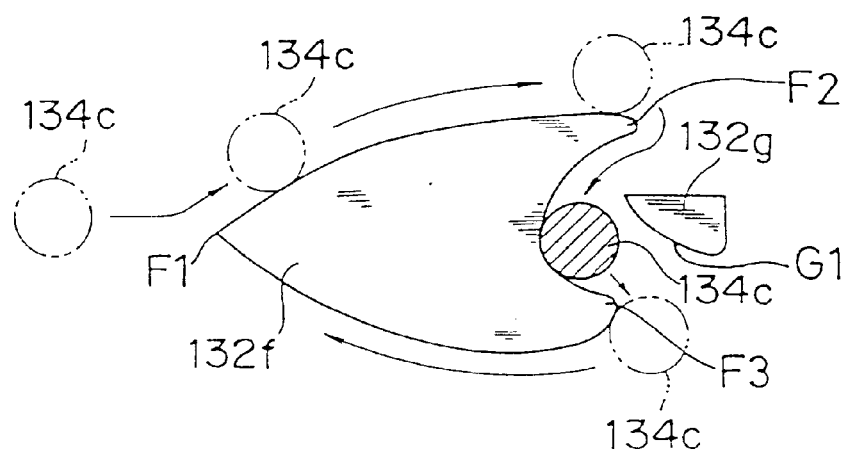
FIG. 32 is a side view of projections on the slider.

On the other hand, an engaging projection 132f and a guide projection 132g as shown in FIG. 32 are formed on the outer surface of a rear portion of each vertical wall 132c. Each engaging projection 132f has a single apex F1 substantially in the middle of its rear end (left end in FIG. 32) along vertical direction, and has two apices F2, F3 at the opposite ends of its front end along vertical direction. The outer surface between the apices F2 and F3 is dented so that the engaging projection 132f has a substantially heart shape as a whole. On the lower surface of the guide projection 132g is formed a guide surface G1 which is inclined downward toward the front (toward the right side in FIG. 32).

As the rear end of the arm 132a is pushed by the mobile phone 6 being inserted into the holder main body and the slider 132 is retracted against the elastic force of the coil spring 133, the locking portions 134c of the locking bar 134 move onto the upper surface of the engaging projections 132f of the slider 132 (see arrow of FIG. 32). When the locking portions 134c move beyond the rear apex F2 of the engaging projection 132f, the locking portions 134c enter the recesses between the apices F2 and F3 (position indicated by solid line in FIG. 32) by being subjected to the elastic force of the coil spring 133. As a result, the slider 132 is locked in its locking position indicated by solid line in FIGS. 29 and 30. Further, by pushing the slider from this position further to a rearmost end position, the locking portions 134c come downward out of the recesses (see arrow of FIG. 32) by being guided by the guide surfaces G1 of the guide projections 132g located before the recesses. As a result, the locking is released so that the slider 132 is pushed forward by the elastic force of the coil spring 133.

Here, the locked position of the slider 132 is set at a position where the connection of the mobile phone 6 in contact with the arm 132a of the slider 132 and the holder connector of the connector module 120 is completed. The rearmost end position of the slider 132 is set in such a position that the holder connector 8 connected with the mobile phone 6 is retracted to the rearmost end position shown in FIG. 28.

As a feature of this phone holder, the ejector module 130 is provided with a decelerator for decelerating an advancing speed of the slider 132 at an intermediate stage of the advancing movement.

First, a rack 136 extending along forward and backward directions is mounted on one side surface of the base member 131. Specifically, a rail 131h extending along forward and backward directions is formed on this one side surface of the base member 131, and a slider 136a engageable with this rail 131h is integrally formed with the rack 136. The rack 136 is slidable along the rail 131h.

At the rear end (left end in FIG. 29) of the rail 131h, a stopper 131j for restricting a rear end position of the rack 136 projects. A distance obtained by subtracting the entire length of the rack 136 from a distance between the stopper 131j and a mount portion 131e provided at a foremost end of the base member 131 (rightmost end in FIG. 29) is a slide stroke (slidable distance). This slide stroke is set substantially equal to a stroke (moving distance of the mobile phone 6) necessary for the complete disconnection of the phone side connector 7 of the mobile phone 6 and the holder connector 8.

On the other hand, a rotary damper 135 is secured to the lower surface of the slider 132. The rotary damper 135 is provided with a pinion 135b which is rotatable together with and about a vertical shaft 135a, and this pinion 135b is in mesh with the rack 136. A fluid such as oil is sealed in a main body of the rotary damper 135, and a resistance is given to the rotation of the vertical shaft 135a by this fluid.

The inner bottom frame 140 shown in FIG. 16 is to be placed on the bottom wall of the outer box 110, and includes a single front frame 141 extending along transverse direction and a pair of left and right main frames 142 extending backward from a middle portion of the front frame 141. Between the main frames 142 is defined a space for allowing the passage of a projected portion at the rear end of the arm 132a of the slider 132 (see FIG. 19). At front parts of the main frames 142 are formed through holes 142a extending along transverse direction. The positions of these through holes 142a are so set as to be aligned with the through hole 111 of the outer box 110. Support plates 144 bulge out from rear portions of the main frames 142; spaces 146 are defined between the support plates 144 and the front frame 141; and rectangular notches 145 open sideways are formed in intermediate positions of the support plates 144 along forward and backward directions. These notches 145 have the same width as the notches 112 of the outer box 110 and are formed in positions in conformity with the notches 112.

An inner wall pair 150 is comprised of right and left side plates 152A, 152B arranged upright, and nut portions 153A, 153B having internally threaded through holes extending along the widthwise direction of the mobile phone 6 are formed at the bottom ends of the respective side plates 152A, 152B. The threads formed in the respective through holes are oriented in opposite directions. A dimension of the respective nut portions 153A, 153B along forward and backward directions is set such that the nut portions 153A, 153B can be substantially closely fitted in the spaces 146 of the inner bottom frame 140. As a result of this fitting, the respective side plates 152A, 152B are movably accommodated in the outer box 110 along the widthwise direction of the mobile phone 6. Further, the internally threaded through holes are so positioned as to conform to the through holes 142a, 111.

The positions of the side plates 152A, 152B are adjusted by a screw shaft 154. A middle portion of the screw shaft 154 is insertable into the through hole 142a, and left and right portions thereof are formed into externally threaded portions 154A, 154B to be screwed into the respective nut portions 153A, 153B. An operable portion 154c which is rotated by a driver or like tool is formed at one end surface (end surface facing the through hole 111). By screwing the screw shaft 154, the side plates 152A, 152B are simultaneously moved toward and away from each other.

Similar to the inner wall pair 150, an inner wall pair 160 is comprised of right and left side plates 162A, 162B arranged upright, and nut portions 163A, 163B having internally threaded through holes extending along the widthwise direction of the mobile phone 6 are formed at the bottom ends of the respective side plates 162A, 162B. The threads formed in the respective through holes are oriented in opposite directions. A dimension of the respective nut portions 163A, 163B and a dimension of the side plates 162A, 162B along forward and backward directions are set such that the nut portions 163A, 163B and the side plates 162A, 162B can be substantially closely fitted in the notches 145 of the inner bottom frame 140 and the notches 112 of the outer box 110. As a result of this fitting, the respective side plates 162A, 162B are movably set in the outer box 110 along the widthwise direction of the mobile phone 6. Further, the internally threaded through holes are so positioned as to conform to the through hole 113a of the projected portion 113 of the outer box 110. Furthermore, the inner surface of the side plates 162A, 162B are formed into such tapered surfaces 162 which are more spaced from the mobile phone 6 along widthwise direction along their extensions toward the phone entrance side.

The positions of the side plates 162A, 162B are adjusted by a screw shaft 164 similar to the screw shaft 154. A middle portion of the screw shaft 164 is insertable into the through hole 113a, and left and right portions thereof are formed into externally threaded portions 164A, 164B to be screwed into the respective nut portions 163A, 163B. An operable portion 164c is formed at one end surface of the screw shaft 164.

Figure 21:
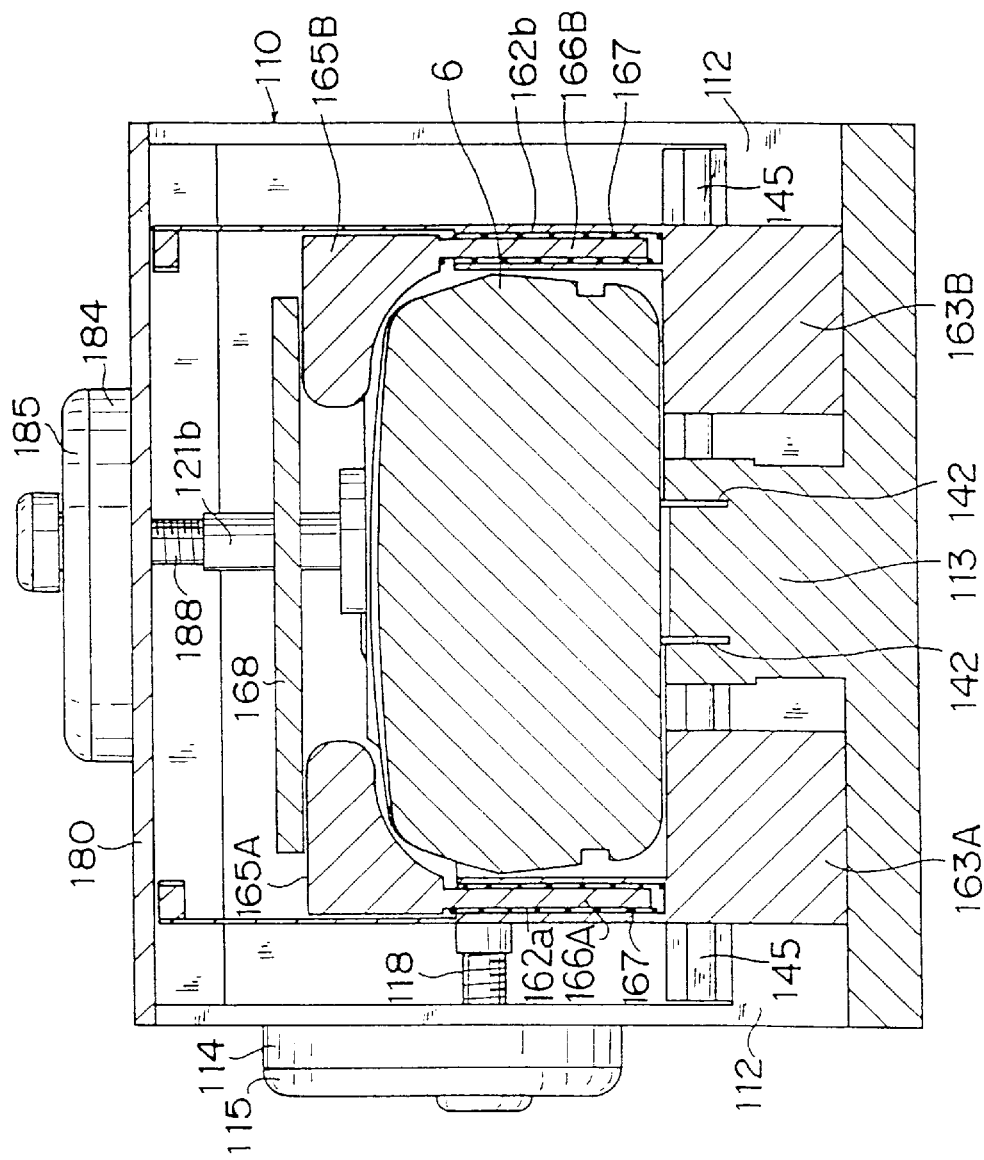
FIG. 21 is a sectional view taken along the line XXI—XXI in FIG. 18.
Figure 22:
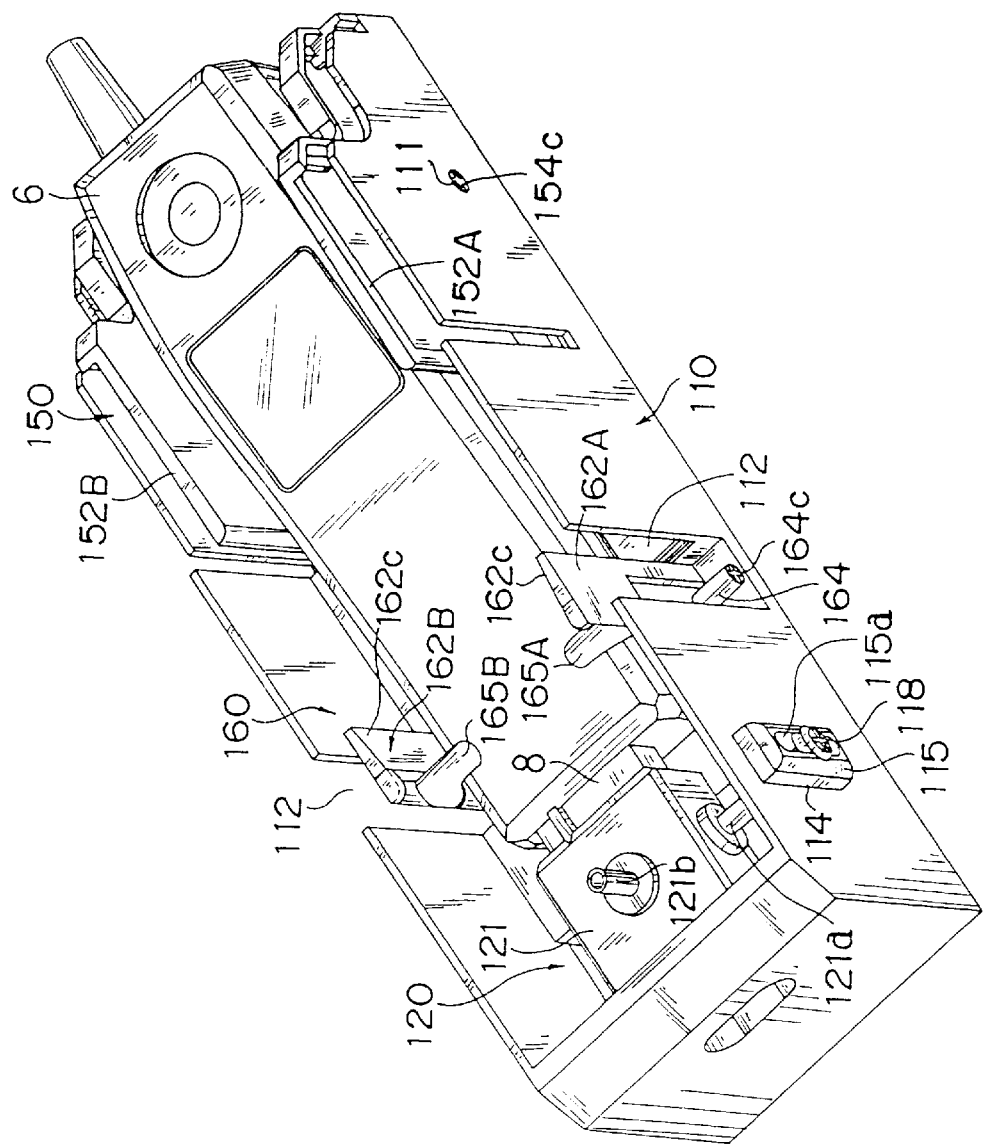
FIG. 22 is a perspective view of the phone holder of FIG. 16 with a ceiling wall detached.
Figure 23:
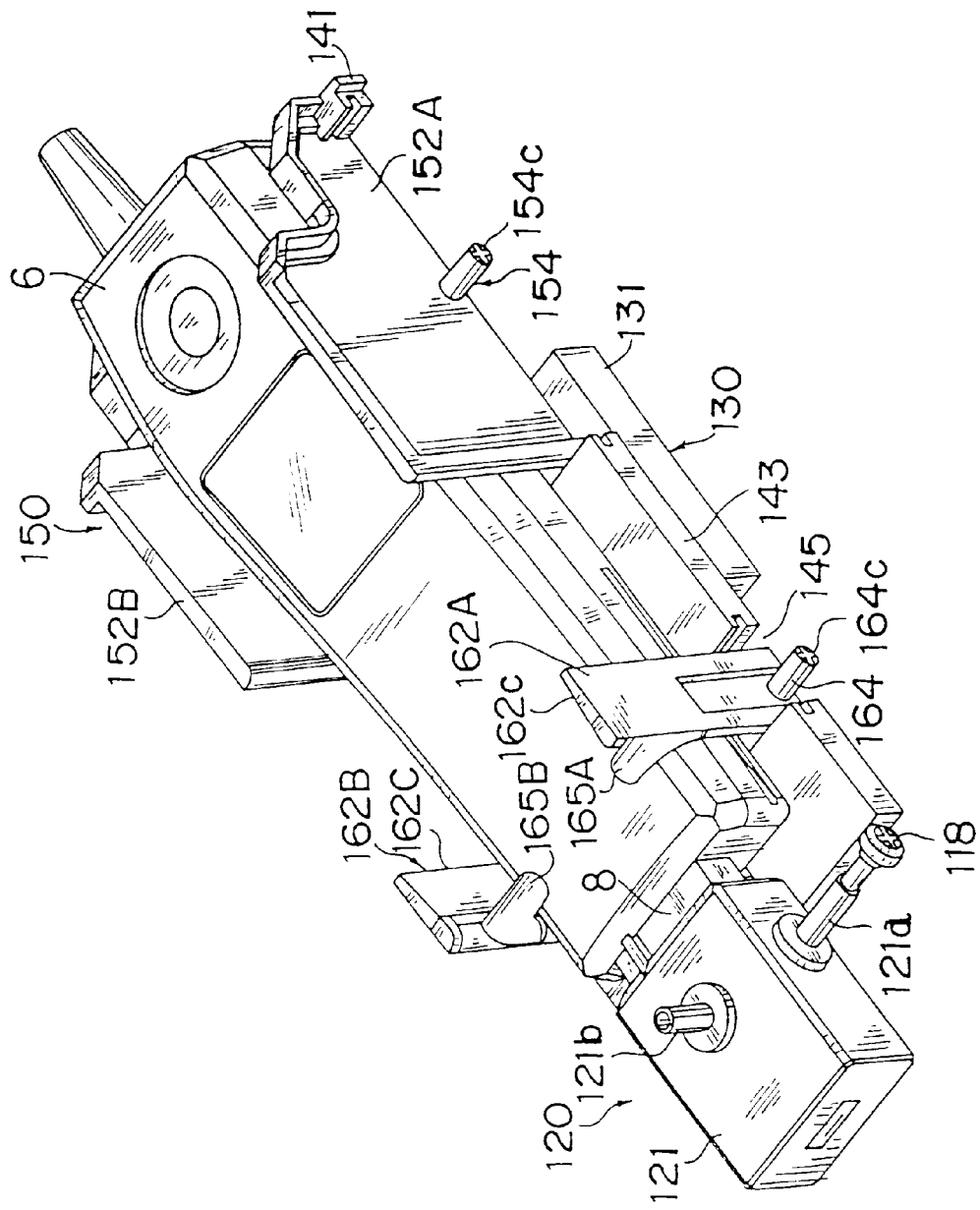
FIG. 23 is a perspective view of the phone holder of FIG. 16 with the ceiling wall and an outer box detached.

On the respective side plates 162A, 162B, restricting projections 165A, 165B for restricting the position of the mobile phone 6 from above are movably provided along vertical direction. Specifically, tubular portions 162a, 162b which are open upward as shown in FIG. 21 are formed at rear portions of the respective side plates 162A, 162B, whereas columns 166A, 166B project downward from the respective restricting projections 165A, 165B. These columns 166A, 166B are fitted into the tubular portions 166A, 166B. In the respective tubular portions 162a, 162b are accommodated coil springs 167 surrounding the columns 166A, 166B. The respective restricting projections 165A, 165B are urged upward by the urging force of the coil springs 167. The inner surfaces of the restricting projections 165A, 165B are continuous with the inner surfaces of the side plates 162A, 162B and are so curved as to be brought into contact with parts of the side surfaces and the upper surface of the mobile phone 6 (see FIGS. 20 and 21).

On the other hand, the ceiling wall 180 is coupled with an inner ceiling plate 168 for pressing the restricting projections 165A, 165B from above. This inner ceiling plate 168 extends along the phone inserting direction substantially in parallel with the ceiling wall 180 as shown also in FIG. 18, and a cylindrical nut 168a which is open upward is formed on its upper surface.

The ceiling wall 180 is formed with a round through hole 180b, and a frame 181 which is so shaped as to surround this through hole 180b is formed on the upper surface of the ceiling wall 180. A nut 182 is immovably accommodated in the frame 181, and an internally threaded hole of the nut 182 is in alignment with the through hole 180b and is exposed upward. A bolt 183 is screwed into the nut 182 and a bottom end portion thereof is screwed into the nut 168a, with the result that the ceiling wall 180 and the inner ceiling plate 168 are coupled one above the other by the bolt 183.

Next, the assembling of the phone holder, the adjustment of the respective parts and the action of the phone holder during the use after the adjustment are described.

1) The base member 131 of the ejector module 130 is secured to the bottom wall of the outer box 110 by bolts. The slider 132 is locked in the locking position shown by solid line in FIGS. 29 and 30. In other words, the locking portions 134c of the locking bar 134 of the base member 131 are engaged with the rear side recesses of the engaging projections 132f as shown by solid line in FIG. 32. Further, the rack 136 is retracted to the rear end position (position where the rear end of the rack 136 is in contact with the stopper 136a as shown by broken line in FIG. 29).

2) The screw shaft 154 is inserted into the through hole 142 of the inner bottom frame 140 for the centering. The internally threaded holes of the nuts 153A, 153B of the side plates 152A, 152B are screwed down the opposite externally threaded portions 154a, 154b of this screw shaft 154, and the side plates 152A, 152B are moved toward each other to a certain degree by turning the screw shaft 154 while the side plates 152A, 152B are oriented upright.

3) The inner bottom frame 140 is secured to the bottom wall of the outer box 110.

4) The screw shaft 164 is screwed into the through hole 113a formed in the projected portion 113 on the bottom wall of the outer box 110 for the centering. The internally threaded holes of the nuts 163A, 163B of the side plates 162A, 162B are screwed down the opposite externally threaded portions 164a, 164b of this screw shaft 164, and the side plates 162A, 162B are moved toward each other to a certain degree by turning the screw shaft 164 while the side plates 162A, 162B are oriented upright.

5) In the state shown in FIG. 27, the holder connector 8 and the mobile phone 6 are connected through the through hole 127a of the contact plate 127 while the contact plate 127 is pressed backward (downward in FIG. 27) at the rear end of the mobile phone 6. During this connecting operation, the coupling bar 126 continuous with the contact plate 127 is retracted with respect to the inner housing 122, thereby rotating the connector side pinion 125 in mesh with the rack 126a of the coupling bar 126. As the pinion 125 is rotated, the holder connector 8 enters the inner housing 122 at half the speed of the retracting speed of the contact plate (state of FIG. 27). In other words, the holder connector 8 and the mobile phone 6 are connected while the holder connector 8 is being retracted.

6) The mobile phone 6 is set in a specified position inside the outer box 110, i.e., a position where the rear end surface of the mobile phone 6 is in contact with the rear end of the arm 132a provided on the slider 132 of the ejector module 130.

7) The side plates 152A, 152B (162A, 162B) are moved further toward each other by tuning the screw shaft 154 (164), and stopped in positions where the inner surfaces of the side plates 152A, 152B (162A, 162B) come into contact with the opposite side surfaces of the mobile phone 6. In other words, final positioning of the respective side plates is performed.

8) The ceiling wall 180 is mounted on the outer box 110 with the bolt 183 screwed into the nut 182 of the ceiling wall 180 and the bottom end portion of the bolt 183 screwed into the nut 168a of the inner ceiling plate 168. The inner ceiling plate 168 is lowered to a position where the lower surface thereof presses the restricting projections 165A, 165B down to bring them into contact with the outer surface of the mobile phone 6, and the bolt 183 is screwed until the head thereof comes into contact with the upper surface of the frame 181 (state of FIG. 18).

9) The bolt 118 is screwed into the nut 117 located in the frame 114 and the cover 115, and the leading end thereof is screwed into the nut 121a of the connector module 120. The position of the connector module 120 is fixed along transverse direction by screwing the bolt 118 until the head thereof comes into contact with the outer surface of the cover 115 (position of FIG. 24). Likewise, the bolt 188 is screwed into the nut 187 located in the frame 184 and the cover 185, and the leading end thereof is screwed into the nut 121b of the connector module 120. The position of the connector module 120 is fixed along vertical direction by screwing the bolt 188 until the head thereof comes into contact with the outer surface of the cover 185 (position of FIG. 24).

After the above adjustment, the mobile phone 6 is further pushed in the inserting direction and the slider 132 having the arm 132a in contact with the mobile phone 6 is further slid to the back against the elastic force of the coil spring 132. Then, the locking portion 134c fitted in the recesses between the apices F2 and F3 of the engaging projections 132f come down out of the recesses by being guided by the guide projections 132g, thereby releasing the locking of the slider 132 by the locking portions 134c. As a result, the slider 132 advances by the elastic force of the coil spring 133 and the mobile phone 6 is pushed toward the entrance side by the arm 132a of the slider 132.

During this operation, the holder connector 8 connected with the mobile phone 6 is also pulled to advance in the inner housing 122. By the rotation of the pinion 125 provided on the holder connector 8 while being in mesh with the rack 122c, the coupling bar 126 having the rack 126a in mesh with the pinion 125, and the contact plate 127 continuous with the coupling bar 126 advances at twice the speed of the advancing speed of the holder connector 8. As a result, the mobile phone 6 is disconnected from the holder connector 8 by being pushed by the contact plate 127 (state of FIG. 27). In other words, the connectors 7, 8 are disconnected by a difference between the advancing speed of the contact plate 127 and that of the holder connector 8. The mobile phone 6 can be easily taken out of the phone holder after being disconnected as above.

At this time, the following action occurs in the ejector module 130. The pinion 135b of the rotary damper 135 provided on the slider 132 is in mesh with the rack 136 as described above. Since a resistance is given to the rotation of the pinion 135b by the fluid sealed in the rotary damper 135, the pinion 135b is not rotated at the beginning of the advancing movement of the slider 132 (i.e., at the beginning of the disconnection of the holder connector 8 and the mobile phone 6), and the rack 136 in mesh with the pinion 135b advances together with and in parallel with the pinion 135b. Accordingly, a special resistance force is not given to the slider 132 at this stage, so that the holder connector 8 and the mobile phone 6 can be disconnected with a sufficient force.

Figure 33:
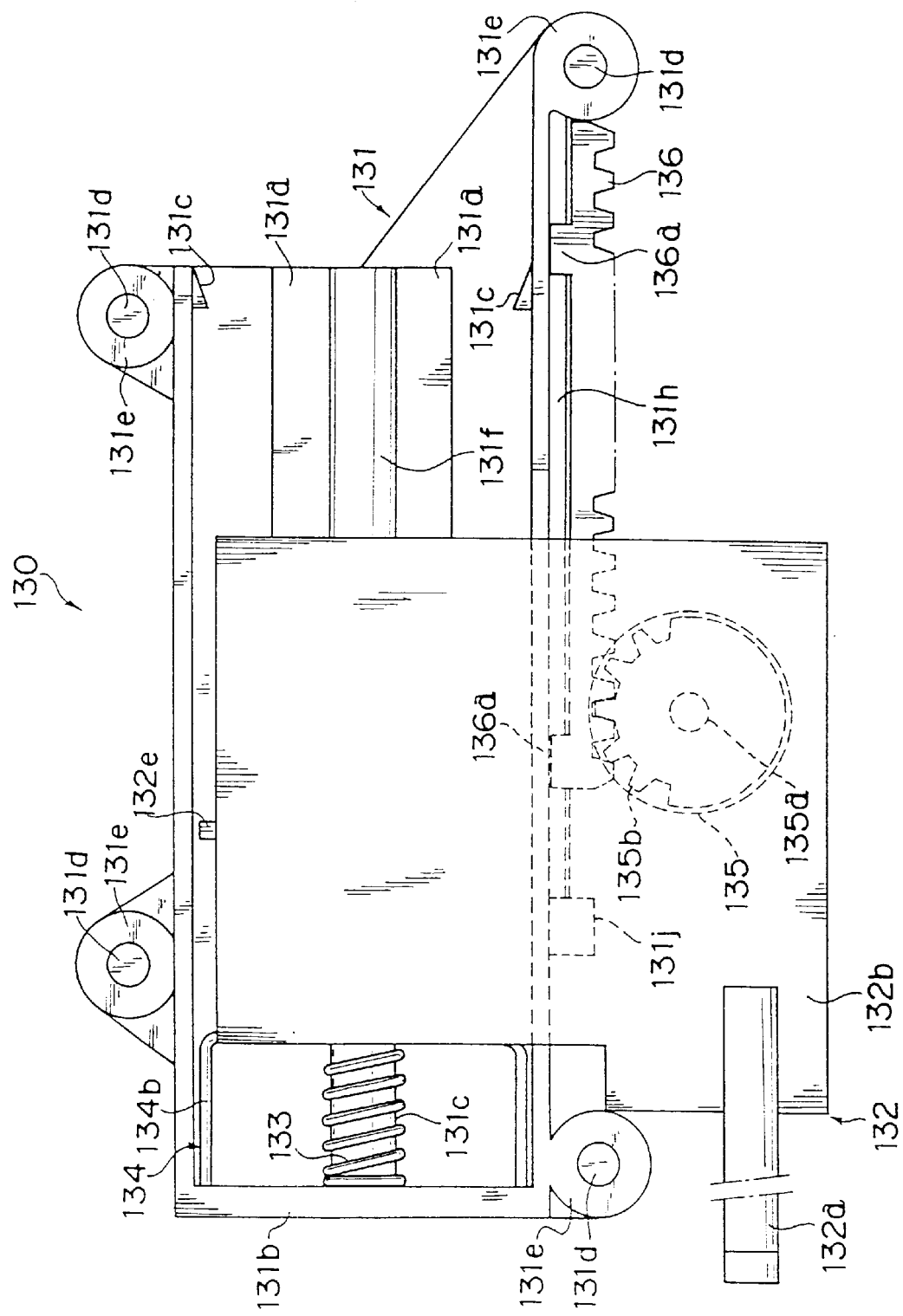
FIG. 33 is a plan view showing a state where the slider of the ejector module is located slightly forward from the locking position.
Figure 34:
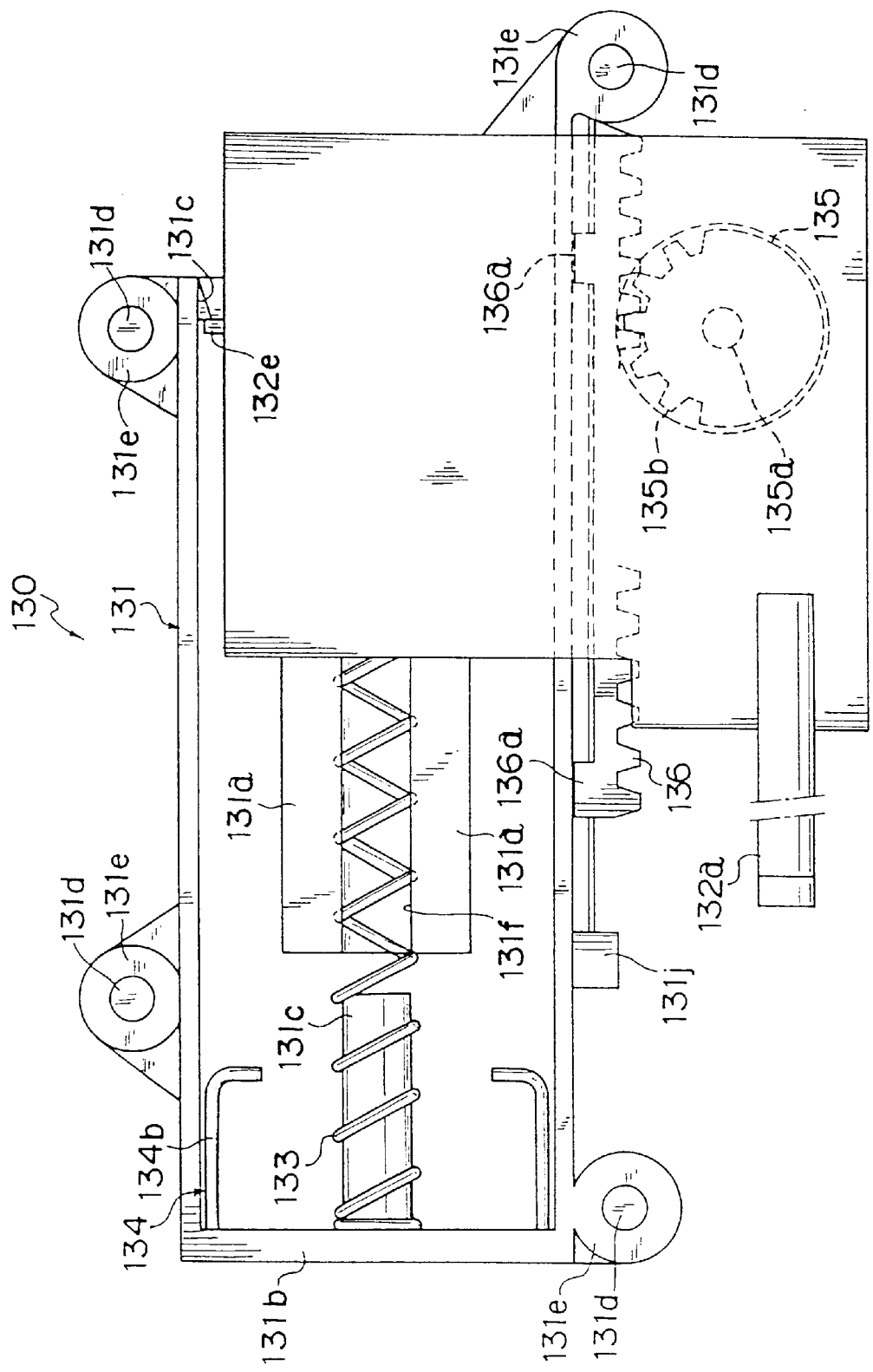
FIG. 34 is a plan view showing a state where the slider of the ejector module has advanced up to a foremost end position.

Thereafter, the front end of the rack 136 comes into contact with the mount portions 131e at the foremost end of the base member 131 substantially simultaneously with the completion of the disconnection of the mobile phone 6 and the holder connector 8 (state of FIG. 33). Since the rack 136 cannot make any further advancing movement after this moment, the pinion 135b in mesh with the rack 136 starts rotating as the slider 132 advances. At this time, since a resistance is given to the rotation of the pinion 135b and the center shaft 135a by the fluid in the rotary damper 135, a resistance is also given to the advancing movement of the slider 132, thereby lowering the advancing speed of the slider 132. Accordingly, the mobile phone 6 is slowly moved to a position of FIG. 34 at the insertion entrance side even after the completion of the disconnection from the holder connector, which prevents the mobile phone 6 from inadvertently jumping out of the holder main body.

In the case that the mobile phone 6 is desired to be set in the phone holder again, it may be inserted into the phone holder along the side plates 152A, 152B and further along the side plates 162A, 162B. By inserting the mobile phone 6, the arm 132a in contact with the rear end of the mobile phone 6 and the entire slider 132 are retracted on the base member 131 against the elastic force of the coil spring 133 and the locking portions 134c of the locking bar 134 of the base member 131 move over the rear side apices F2 of the engaging projections 132f and are fitted into the recesses located below the apices F2. As a result, the slider 132 is locked with the base member 131.

At this time, since a resistance is given to the rotation of the pinion 135b in the ejector module 130, the pinion 135 is not rotated at the beginning of the retracting movement of the slider 132 and the pinion 135b and the rack 136 are integrally slid backward. The pinion 135b starts rotating at a moment when the rear end of the rack 136 comes into contact with the stopper 131j. Thus, the ejector module 130 is returned to its original state (state shown by solid line in FIG. 29) after the mobile phone 6 is completely set in the phone holder.

On the other hand, in the connector module 120, the contact plate 127 is retracted by being pushed by the rear end of the mobile phone 6, and the connector holder 8 is connected with the phone side connector 7 while being retracted at half the speed of the retracting speed of the contact plate 127. In other words, the holder connector 8 and the mobile phone 6 are connected by a difference between the retracting speed of the contact plate 127 corresponding to the inserting speed of the mobile phone 6 and that of the holder connector 8 moved together therewith.

Specifically, while the mobile phone 6 is inserted and ejected, the holder connector 8 is moved in the same direction at half the speed of the insertion/ejecting speed of the mobile phone 6. Accordingly, a stroke necessary for the connection of the mobile phone 6 and the holder connector 8 (a moving distance of the mobile phone 6 from the start of the connection to the end thereof) is twice as long as the one required for a usual connecting operation. Conversely, a force necessary for the connection is half the force required for the usual connecting operation. Thus, a force required for the insertion and ejection of the mobile phone 6 can be reduced while the reliability of the electrical connection of the holder connector 8 and the phone side connector 7 is kept high by setting an engaging force of the connectors 7, 8 high. Therefore, the mobile phone 6 can be easily mounted and detached.

Particularly in this embodiment, an end portion of an operable member which is operated during the insertion of the mobile phone 6 is the contact plate 127 formed with the through hole 127a, and a stable surface contact is established between the contact plate 127 and the mobile phone 6. Thus, the operable member and the mobile phone 6 can be more securely moved together.

In this embodiment, the single pinion 125 is provided on the holder connector 8. Instead, a gear train comprised of a plurality of gears may be provided on the holder connector 8 and may be so constructed as to have a gear reduction ratio. Then, a ratio of the speed of the holder connector 8 to the inserting speed of the mobile phone 6 can be freely set and, therefore, a connection stroke and a force required for the connection can be freely set.

Beside the above gear mechanism, the mobile phone 6 and the holder connector 8 may be made movable together using an other force transmitting mechanism (e.g., link mechanism).

Next, a third embodiment of the invention is described with reference to FIGS. 35 to 47.

Figure 35:
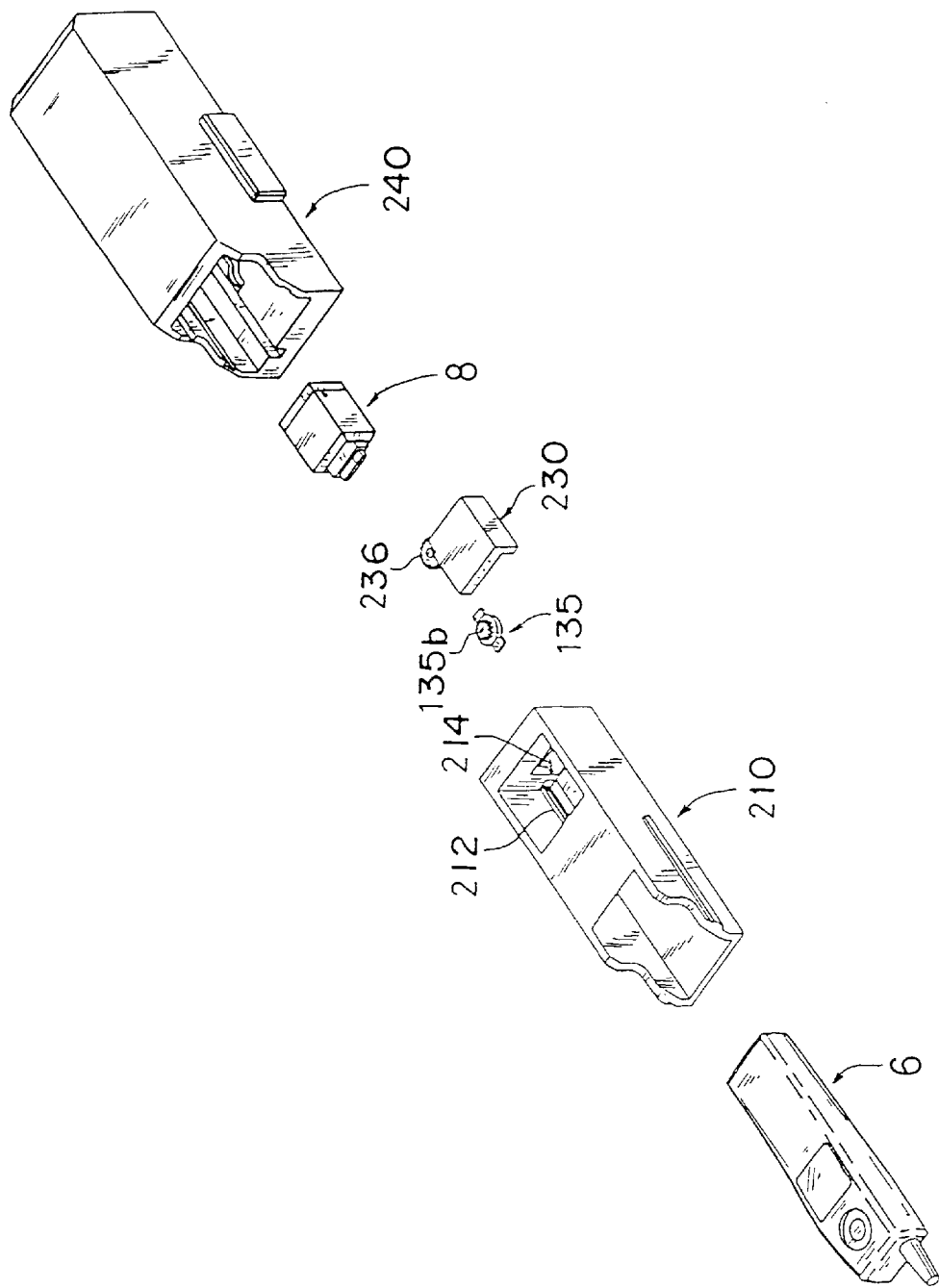
FIG. 35 is an exploded perspective view of the phone holder according to a third embodiment of the invention.
Figure 36:
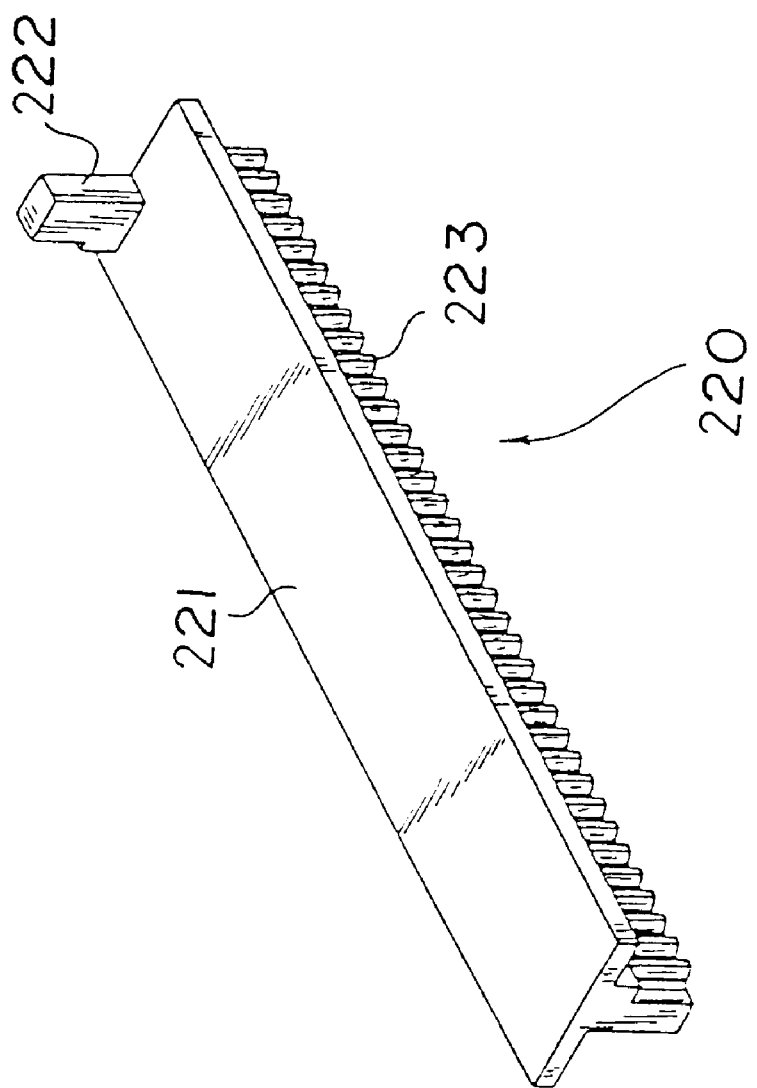
FIG. 36 is a perspective view of a phone pushing member provided in the phone holder of FIG. 35.
Figure 37:
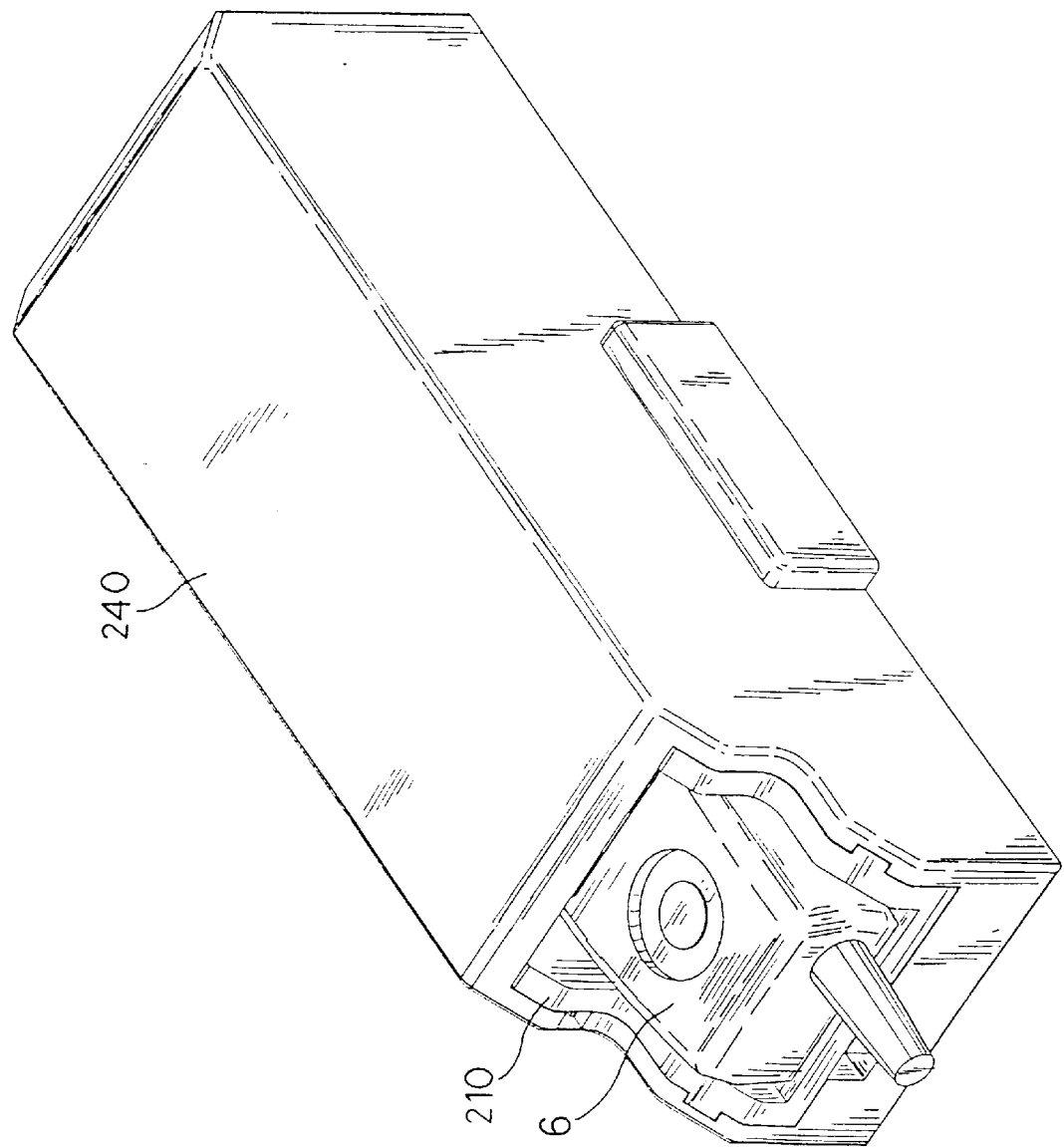
FIG. 37 is a perspective view of the phone holder of FIG. 35 in its assembled state.
Figure 38:
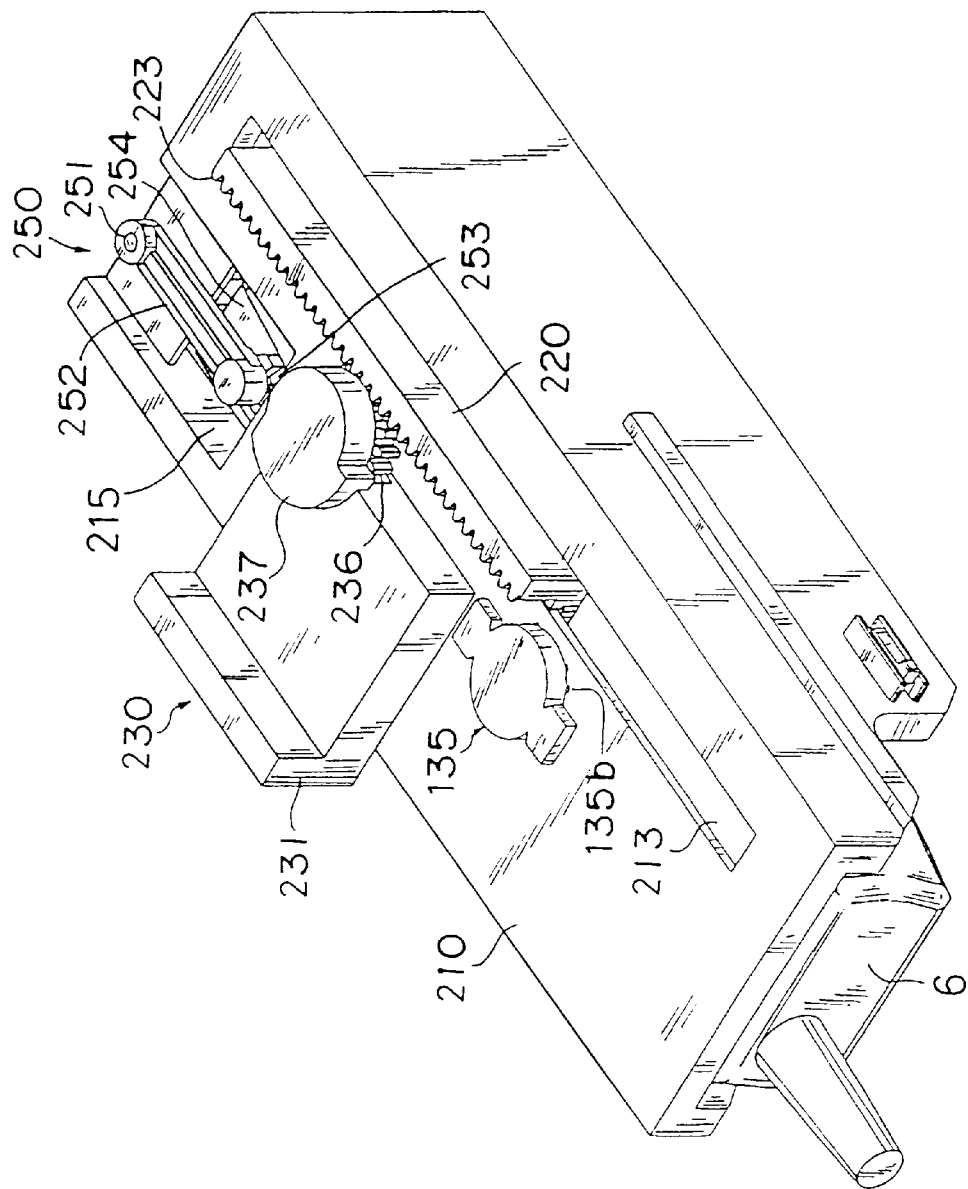
FIG. 38 is a perspective view showing a rear side of an inner casing when a mobile phone is completely mounted in the phone holder of FIG. 35.
Figure 39:
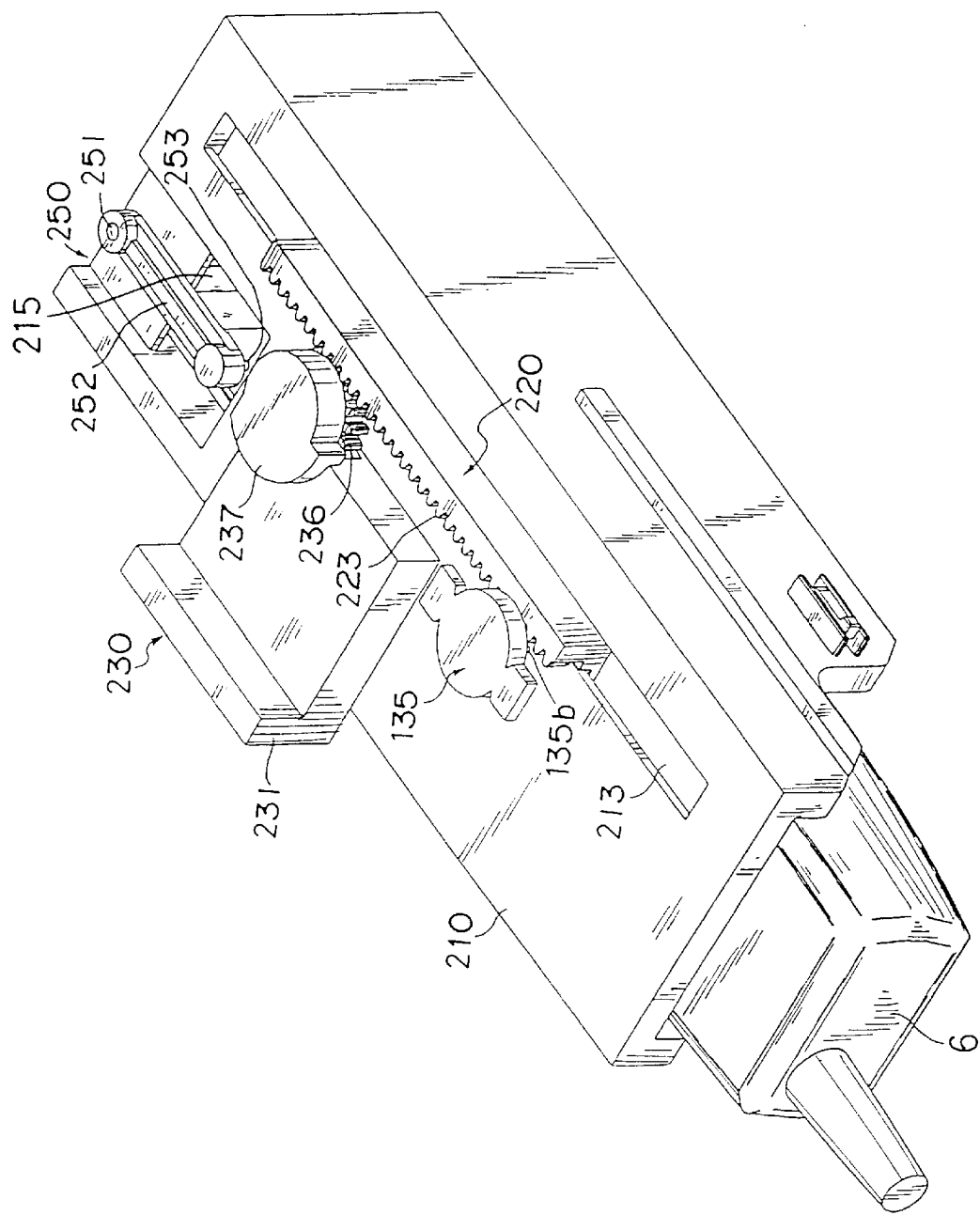
FIG. 39 is a perspective view showing the rear side of the inner casing when the mobile phone is pushed out of the phone holder of FIG. 35.
Figure 40:
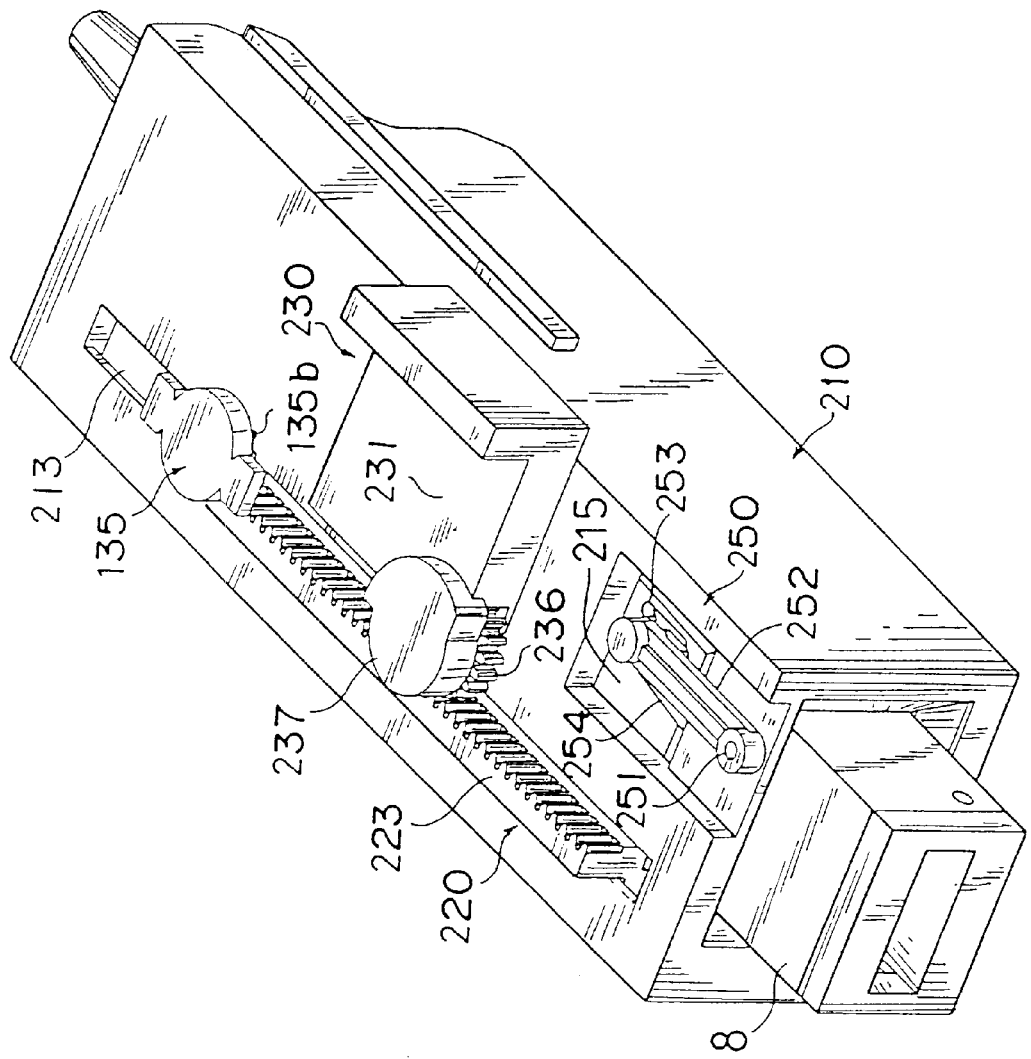
FIG. 40 is a perspective view showing the rear side of the inner casing when the phone holder of FIG. 35 is viewed from behind.

The phone holder according to this embodiment is provided with an inner casing 210 shown in FIG. 35, a rotary damper 135 also shown in the second embodiment, an ejector module 230, an outer casing 240 and a phone pushing member 220 shown in FIG. 36.

The inner casing 210 is opened forward as shown in FIGS. 37 to 40 (obliquely downward in FIG. 37), and the mobile phone 6 is insertable thereinto along its length, and is so shaped as to be insertable into the outer casing 240. The phone pushing member 220 for pushing the mobile phone 6 is mounted on the inner casing 210 slidably along phone inserting/ejecting directions.

As shown in FIG. 36, the phone pushing member 220 has a base plate 221 extending in phone inserting/ejecting directions. A pushing projection 222 projects from the upper surface of a rear end of the base plate 221, and a rack 223 is so formed on the lower surface of the base plate 221 as to extend along the length thereof.

Figure 41:
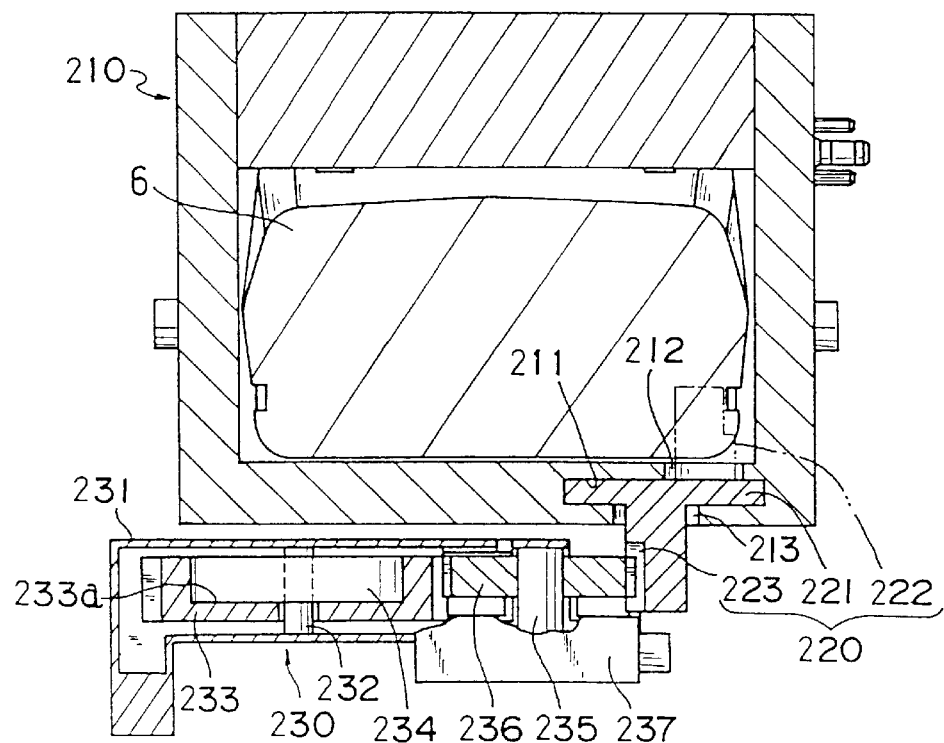
FIG. 41 is a front view in section of the phone holder of FIG. 35.

On the other hand, as shown in FIG. 41, the bottom wall of the inner casing 210 is formed with an engaging groove 211 into which the base plate 221 of the phone pushing member 220 is fitted along longitudinal direction. A window 212 as a passage of the pushing projection 222 is formed above the engaging groove 211, and an elongated through hole 213 as a passage of the rack 223 is formed below (above in FIGS. 38 and 40) the engaging groove 211. The pushing projection 222 projects into the inner casing 210 through the window 212, and the pushing projection 222 comes into contact with the rear end of the mobile phone 6 to be inserted into the inner casing 210.

The ejector module 230 is adapted to eject the mobile phone 6 toward the insertion entrance side by applying a force to the phone pushing member 220, and a main casing 231 thereof is secured to the outer casing 240.

Figure 42:
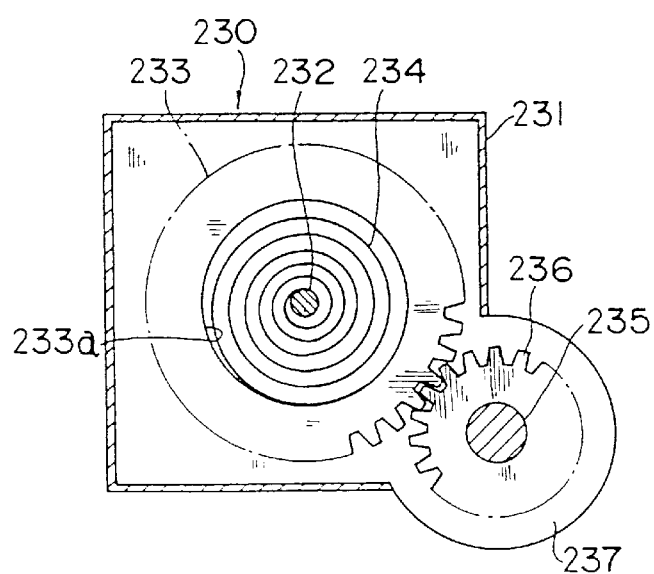
FIG. 42 is a plan view in section of an ejector module provided in the phone holder of FIG. 35.
Figure 43:
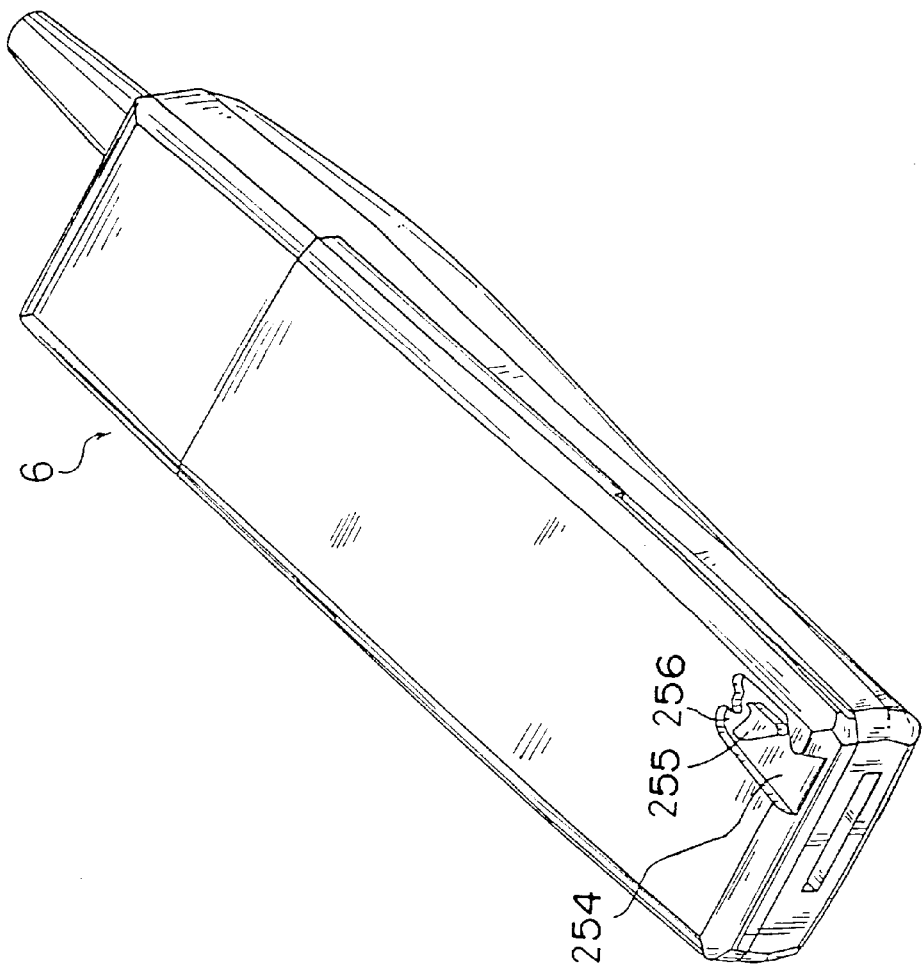
FIG. 43 is a perspective view showing a rear side of a mobile phone to be inserted into the phone holder of FIG. 35.

As shown in FIGS. 41 and 42, a vertically extending center shaft 232 is fixed in the main casing 231, and a gear 233 is so provided as to be rotatable about this center shaft 232. A circular recess 233a opening upward is formed in an upper center portion of the gear 233, and a spiral spring 234 is fitted in the recess 233a. This spiral spring 234 has its inner end fixed to the center shaft 232 and its outer end fixed to the inner surface of the recess 233a of the gear 233. The gear 233 is urged in clockwise direction of FIG. 42 by the spiral spring 234.

A rotary damper 237 is integrally formed with the main casing 231 in a position distanced from the center shaft 232. This rotary damper 237 includes a rotatable shaft 235 to which a rotational resistance is given similar to the rotary damper 135, and the gear 233 is in mesh with a pinion 236 fixed to the rotatable shaft 235. Accordingly, this pinion 236 is urged in counterclockwise direction of FIG. 42 (i.e., direction in which the mobile phone 6 is fed toward the insertion entrance side) by the spiral spring 234, and is subjected to a rotational resistance by the rotary damper 237.

On the other hand, the rack 223 of the phone pushing member 220 projects downward (upward in FIGS. 38 to 40) through the elongated through hole 213, and is in mesh with the pinion 236. Accordingly, the phone pushing member 220 is urged toward the insertion entrance side and has its sliding speed suppressed by a resistance force of the rotary damper 237.

In a rear portion of the inner casing 210 is provided a locking mechanism 250 for holding the mobile phone 6 in a mount position against the urging force of the ejector module 230.

Specifically, a pivotal arm 252 is so mounted on the bottom wall of the rear end portion of the inner casing 210 (upper wall in FIGS. 38 to 40) as to be pivotal about a shaft 251, and an upward (downward in FIGS. 38 to 40) projecting lock projection 253 is provided at the leading end of the pivotal arm 252. This lock projection 253 projects into the inner casing 210 through a window 215 formed in the bottom wall of the rear portion of the inner casing 210.

On the other hand, a recess 254 as shown in FIGS. 43 and 44A to 44C is formed in the underside of the rear end portion of the mobile phone 6. A projected portion 255 in the form of a substantially heart-shaped cam projects in the recess 254. A guide groove 256 as a passage of the lock projection 253 is defined between the outer surface of the projected portion 255 and the inner surface of the recess 254.

At a rear portion (lower portion in FIGS. 44A to 44C) of the projected portion 255 is formed a slanted surface 255a for guiding the lock projection 253 to the left. A dented portion 255c is formed in the middle of a front portion (upper portion in FIGS. 44A to 44C) of the projected portion 255, and a slanted surface 215b slanted toward the dented portion 255c is formed right at the left of the dented portion 255c. The inner surface of the recess 254 located right before (above in FIGS. 44A to 44C) the dented portion 255c is formed into a slanted surface 254a for guiding the lock projection 253 to the right. At the left side of an entrance portion (lower portion in FIGS. 44A to 44C) of the recess 254 is formed a slanted surface 254b for guiding the lock projection 253 to the right.

When the mobile phone 6 is inserted into the inner casing 210 while pushing the pushing projection 222 against the urging force of the ejector module 230, the lock projection 253 having entered the recess 254 from behind is guided to the left by the slanted surface 255a of the projected portion 255 (FIG. 44A), and is further guided by the guide surface 255b to enter the dented portion 255c. In this way, the mobile phone 6 is locked with the inner casing 210 against the urging force. When the mobile phone 6 is further pushed backward in this position, the lock projection 253 is guided to the right by the guide surface 254a and exits the recess 254 through a clearance at the right side of the projected portion 255 (i.e., the mobile phone 6 is unlocked).

Figure 44A:
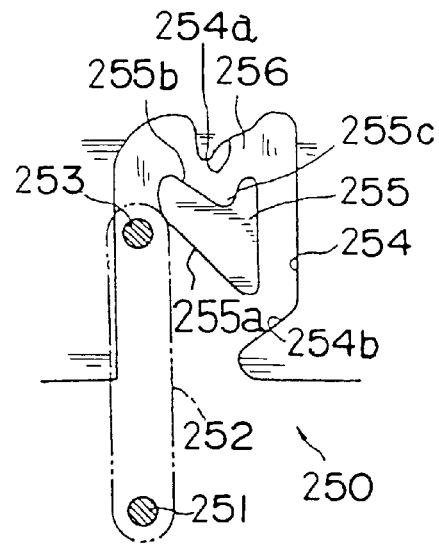
FIGS. 44A, 44B, 44C are front views showing a process of locking the mobile phone of FIG. 43 and a process of releasing the locked state.
Figure 44B:
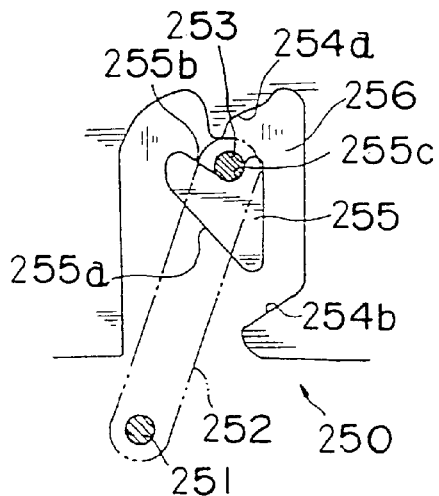

The lock position shown in FIG. 44B is set in a position where the connection of the holder connector 8 and the phone side connector 7 of the mobile phone 6 is completed. The holder connector 8 is so mounted on the inner casing 210 as to be only slightly displaceable along phone inserting/ejecting directions with respect to the inner casing 210 while being passed through a through hole 214 formed in the back wall of the inner casing 210, and is urged toward the insertion entrance side by an unillustrated spring provided on the outer casing 240 as in the second embodiment.

Figure 45:
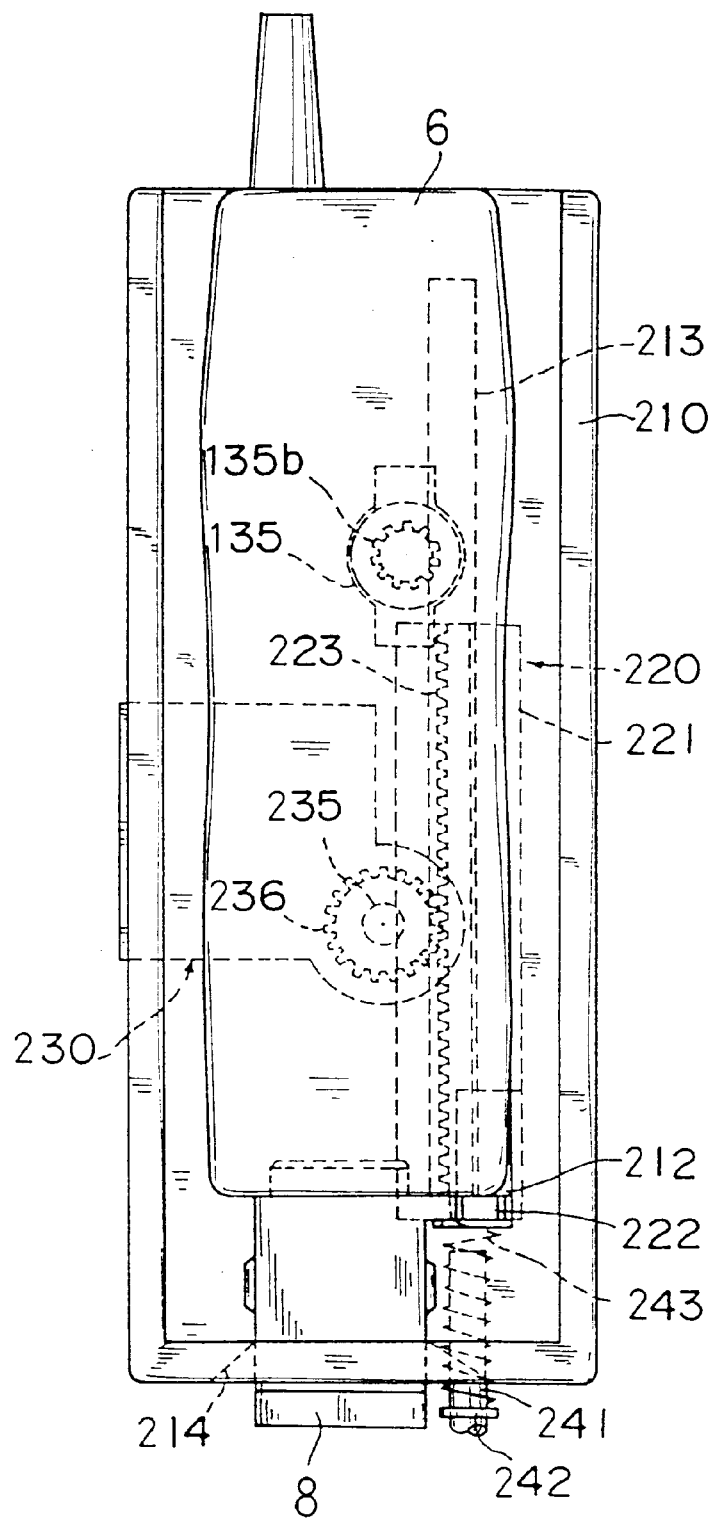
FIG. 45 is a front view showing an internal state of the inner casing when the mobile phone is completely mounted in the phone holder of FIG. 35.

The rotary damper 135 is secured to the inner surface of the outer casing 240 in this embodiment and is provided in such a position as to be meshable with the rack 223. Specifically, the rotary damper 135 is positioned as follows. With the mobile phone 6 completely inserted (the connection of the mobile phone 6 and the holder connector 8 completed) as shown in FIG. 45, the rotary damper 135 is distanced forward from the rack 223. The pinion 135b starts meshing with the rack 223 after the rack 223 advances to a position where the mobile phone 6 is disconnected from the holder connector 8 as shown in FIG. 46.

Figure 46:
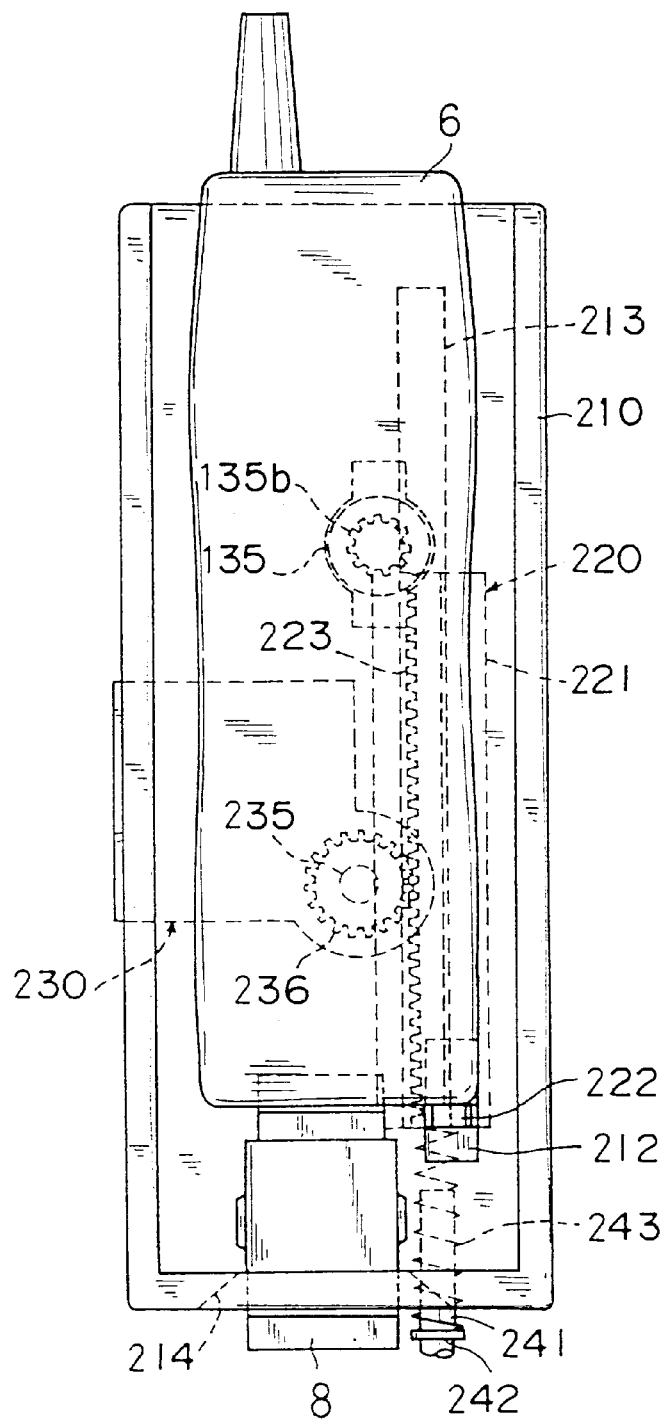
FIG. 46 is a front view showing an inner state of the inner casing at a moment when a connector provided in the phone holder of FIG. 35 is disconnected from the mobile phone.
Figure 47:
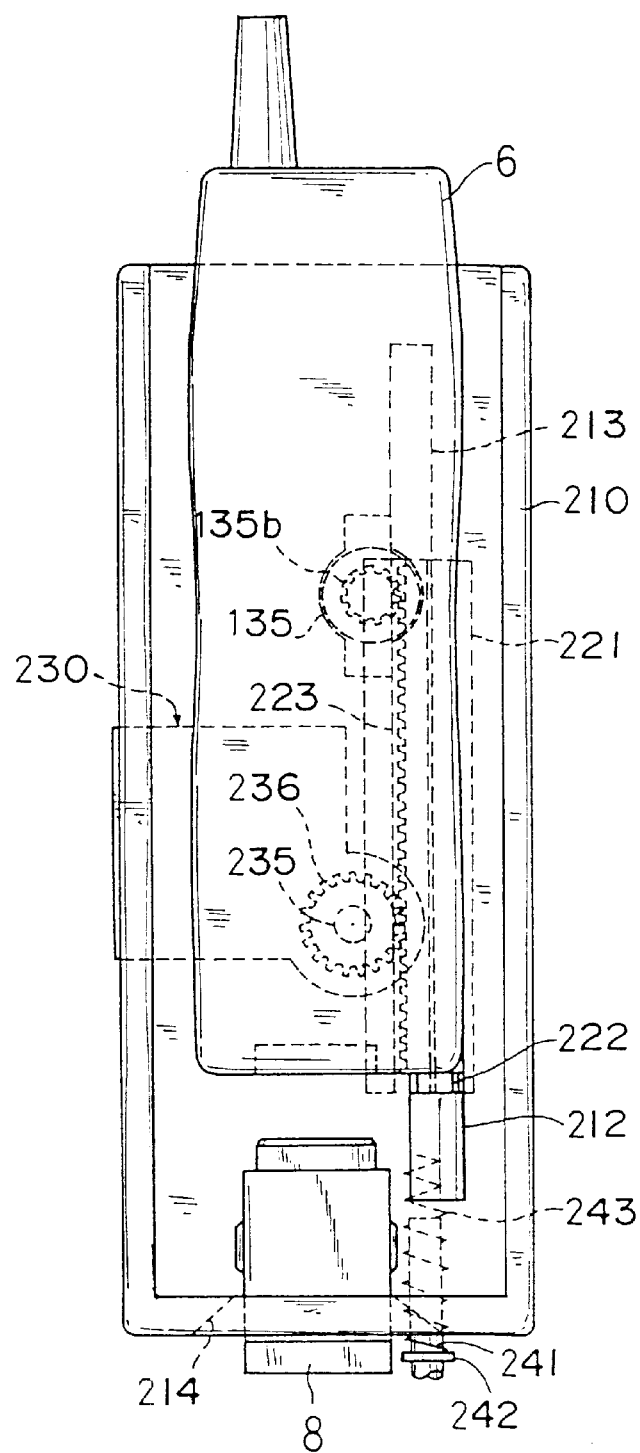
FIG. 47 is a front view showing an internal state of the inner casing when the mobile phone is pushed out of the phone holder of FIG. 35.

Further, in this embodiment, a shaft 241 as shown in FIGS. 45 to 47 projects forward from the back wall of the outer casing 240. An auxiliary urging spring 243 is so mounted as to surround the shaft 241. The rear end (bottom end in FIGS. 45 to 47) of the spring 243 is in contact with a jaw portion 242 provided on the shaft 241, and the front end thereof can come into contact with the rear end of the phone pushing member 220. The entire length of the spring 243 is set such that the front end thereof comes into contact with the rear end of the mobile phone 6 without being compressed while the mobile phone 6 and the holder connector 8 are disconnected from each other (i.e., when the connection of the mobile phone 6 and the holder connector 8 is to be started) as shown in FIG. 46.

Next, the action of this phone holder is described.

In an initial state where the mobile phone 6 is not yet inserted, the phone pushing member 220 is held in its foremost position i.e., a position of FIG. 47 by the urging force of the spiral spring 234 of the ejector module 230.

When the mobile phone 6 is inserted into the inner casing 210 of the phone holder, the rear end of the mobile phone 6 comes into contact with the pushing projection 222 of the phone pushing member 220 and, from this moment on, the phone pushing member 220 starts retracting as the mobile phone 6 is further inserted. Substantially simultaneously with the connection of the holder connector 8 and the mobile phone 6, the lock projection 253 at the leading end of the lever 252 enters the recess 255c of the projected portion 255 (FIG. 44B), and the phone pushing member 220 is locked in a specified lock position (state of FIG. 45). In this way, the mounting of the mobile phone 6 into the holder is completed. In this mounted state, the leading end of the auxiliary urging spring 243 is pushed by the rear end of the mobile phone 6, with the result that the spring 243 undergoes a compressive deformation.

Figure 44C:
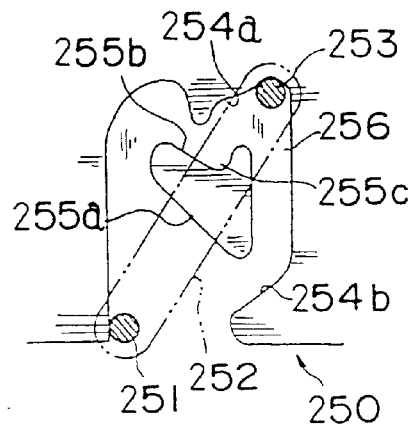

Next, when the mobile phone 6 is further pushed to the back by a very small amount (a displaceable distance of the holder connector 8 with respect to the inner casing 210) in this mounted state, the lock projection 253 is disengaged from the dented portion 255c as shown in FIG. 44C, thereby releasing the locking of the mobile phone 6 by this lock projection 253. Thereafter, by moving a hand from the mobile phone 6 (i.e., by releasing a pressing force), the phone pushing member 220 and the mobile phone 6 are pushed by a sufficient large force which is a sum of the elastic force of the spiral spring 234 and the urging force of the auxiliary urging spring 243, thereby securing the separation of the mobile phone 6 and the holder connector 8 (FIG. 46).

Substantially simultaneously with the completion of the above separation, a compressively deformed amount of the auxiliary urging spring 243 becomes zero and only the elastic force of the spiral spring 234 is given to the phone pushing member 220. Further, since the rack 223 of the phone pushing member 220 starts meshing with the pinion 135b of the rotary damper 135 at this moment, the advancing speed of the phone pushing member 220 is further slowed by the rotational resistance of the pinion 135b. As a result, the mobile phone 6 is slowly pushed toward the insertion entrance side. This securely prevents the mobile phone 6 from jumping out of the phone holder and provides the phone holder with high quality.

Although the rotary damper 237 gives a resistance to the rotation of the pinion 236 for providing an ejecting force to the phone pushing member 220 in this embodiment, this rotary damper 237 can be deleted from the construction. Even if either the auxiliary urging spring 243 or the rotary damper 135 is deleted, it is possible to reduce the feeding speed of the mobile phone 6 after the separation from the holder connector 8 while ensuring a force necessary for the separation of the mobile phone and the holder connector 8.

However, a better effect can be obtained by combining the spring 243 and the rotary damper 135.

In the case of a relatively weak connecting force of the connectors 7, 8, the feeding speed of the mobile phone 6 may be suppressed by a damper or the like from the beginning to the end as in the first embodiment.

The present invention may be embodied, for example, in the following manners.

(1) Although the slider 132 (second embodiment) movable with the mobile phone 6 and the phone pushing member 220 (third embodiment) are provided with the racks in the foregoing embodiments, racks may be directly provided on the mobile phone 6. However, in this case, the mobile phone 6 needs to be considerably processed. If the racks or the like are provided on the movable members as in the foregoing embodiments, the mobile phone 6 needs no or a little processing, advantageously making the mobile phone 6 more widely usable.

(2) Although the feeding speed of the mobile phone 6 is reduced by the rotary damper 135 in the foregoing embodiments, a friction pad may be provided, for example, at an entrance portion of the inner surface of the holder casing so that the mobile phone or the movable member moving therewith comes into contact with the friction pad immediately after the disconnection of the connector and the mobile phone. Then, a force for feeding the mobile phone can be reduced by a frictional resistance by the above contact.

(3) In the foregoing embodiments, the engaging portion is directly provided on the mobile phone 6 (first and second embodiments) or on the slider 32 as the phone pushing member (second embodiment). However, in the case that the holder connector 8 is movable in the same direction as the mobile phone 6 being inserted or ejected as in the first and second embodiments, it may be locked by providing an engaging portion such as a substantially heart-shaped cam thereon.

(4) The application of the phone holder according to the invention is not specified. For example, the invention is applicable in the case that the mobile phone is connected with a loudspeaker or the like in a passenger compartment of an automotive vehicle and in the case that the mobile phone is connected with an electronic equipment such as a personal computer for the radio communication.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A phone holder comprising:
   a holder main body having a phone accommodating portion into which a mobile phone is insertable;
   a phone urger which urges the mobile phone being inserted into the phone accommodating portion in a direction opposite from an inserting direction of the mobile phone; and
   a phone lock device which is switchable between a locking state where the mobile phone is locked in a specified accommodation position in the phone accommodating portion against a urging force of the phone urger and an unlocking state where the locking is released, the phone lock device being switched to the locking state as the mobile phone is inserted into the phone accommodating portion, and the locking being released by moving the mobile phone in its locked state in the inserting direction.

2. A phone holder according to claim 1, wherein the phone lock device includes an engaging portion provided on the mobile phone, and a locking member provided on the holder main body for detachably locking the engaging portion.

3. A phone holder according to claim 2, wherein the engaging portion includes a guide groove surrounding a substantially heart-shaped cam, and the locking member includes a pivotal member which is pivotally provided on the holder main body and locks the mobile phone by the engagement of a pivotal end thereof fitted in the guide groove with a dented portion of the cam.

4. A phone holder according to claim 2, wherein the engaging portion is directly provided on the mobile phone.

5. A phone holder according to claim 4, wherein the mobile phone includes a phone main body and a charging unit having a battery casing, and the engaging portion is provided on the battery casing.

6. A phone holder according to claim 2, further comprising a phone pushing member which is movably provided on the holder main body in the inserting direction of the mobile phone and comes into contact with the mobile phone being inserted into the phone accommodating portion from the back side with respect to the inserting direction, wherein the phone urger is so constructed as to urge the phone pushing member in a direction opposite from the inserting direction of the mobile phone and the engaging portion is provided on the phone pushing member.

7. A phone holder according to claim 1, wherein the phone urger includes a phone actuating roller which is so provided on the holder main body as to be brought into contact with a side surface of the mobile phone and is rotated as the mobile phone is moved, and a roller urger for urging the phone actuating roller in the same direction as the phone actuating roller when the mobile phone is moved in a direction opposite from its inserting direction.

8. A phone holder according to claim 7, wherein the roller urger includes a gear provided on a shaft of the phone actuating roller, a urging gear meshable with the gear, and a turnup spring coupled with the urging gear.

9. A phone holder according to claim 1, further comprising a phone pushing member which is movably provided on the holder main body in the inserting direction of the mobile phone and comes into contact with the mobile phone being inserted into the phone accommodating portion from the back side with respect to the inserting direction, wherein the phone urger is so constructed as to urge the phone pushing member in a direction opposite from the inserting direction of the mobile phone.

10. A phone holder according to claim 1, further comprising a decelerator which gives a resistance to the mobile phone moving in a direction opposite from the inserting direction thereof by the urging force of the phone urger when the locking by the phone lock device is released, thereby decelerating a moving speed of the mobile phone.

11. A phone holder according to claim 10, wherein the phone urger includes a phone actuating roller which is so provided on the holder main body as to be brought into contact with a side surface of the mobile phone and is rotated as the mobile phone is moved, and a roller urger for urging the phone actuating roller in the same direction as the phone actuating roller when the mobile phone is moved in a direction opposite from its inserting direction and the decelerator is so constructed as to give a resistance by fluid to a shaft of the phone actuating roller.

12. A phone holder according to claim 11, wherein the phone actuating roller and an idle roller are so arranged as to be in contact with the opposite side surfaces of the mobile phone in the phone accommodating portion.

13. A phone holder according to claim 12, wherein the holder main body includes an outer casing, and an inner casing which is detachably fittable into the outer casing and has the phone accommodating portion of such a shape in conformity with the mobile phone to be accommodated, and the phone actuating roller and the idle roller are provided on the outer casing, and notches are formed in the opposite side walls of the inner casing so that the phone actuating roller and the idle roller face the phone accommodating portion.

14. A phone holder according to claim 12, wherein the phone actuating roller and the idle roller are movable in directions toward and away from each other, and a position adjustment urger is provided to urge these rollers inwardly, respectively.

15. A phone holder according to claim 1, wherein a holder connector is provided at the back of the phone accommodating portion of the holder main body with respect to the inserting direction of the mobile phone, and is connected with a phone side connector provided in the mobile phone when the mobile phone is inserted to the specified accommodation position.

16. A phone holder according to claim 15, further comprising a connector lock device which is switchable between a locking state where the phone side connector and the holder connector are lockingly connected and an unlocking state where the locking of the connectors is released, wherein the connector lock device is so constructed as to be brought into its locked state during the insertion of the mobile phone into the phone accommodating portion and to be switched to its unlocked state during the ejection of the mobile phone.

17. A phone holder according to claim 16, wherein the holder connector is a connector provided with a locking function which has a locking portion for locking the connection with a mating connector and an operable portion subjected to an external pressing operation and in which the locking portion is switched between a lock position and an unlock position; the holder connector is movably provided in the same direction as a connecting direction with the phone side connector; a connector urger is provided to urge the holder connector toward the phone side connector; and a connector operating portion is provided on the holder main body to bring the locking portion to the unlock position when the holder connector is pushed toward the phone side connector by a urging force of the connector urger and to operate the operable portion of the holder connector so as to switch the locking portion to the lock position when the holder connector is pushed into a connector casing against the urging force of the connector urger.

18. A phone holder according to claim 17, wherein the connector casing for movably holding the holder connector in the connecting direction with the phone side connector is assembled into the holder main body and is provided with the connector urger and the connector operating portion.

19. A phone holder according to claim 18, wherein the urging force of the connector urger is larger than a connecting force of the phone side connector and the holder connector.

20. A phone holder according to claim 15, further comprising a decelerator for reducing a feeding speed of the mobile phone by giving a resistance thereto at a moment later than the disconnection of the phone side connector and the holder connector when the locking of the mobile phone by the phone lock device is released.

21. A phone holder according to claim 20, further comprising a phone pushing member which is movably provided on the holder main body in the inserting direction of the mobile phone and comes into contact with the mobile phone being inserted into the phone accommodating portion from the back side with respect to the inserting direction, wherein the phone urger is so constructed as to urge the phone pushing member in a direction opposite from the inserting direction of the mobile phone and the decelerator is so constructed as to give a resistance to the phone pushing member.

22. A phone holder according to claim 20, further comprising a rack extending along the inserting direction of the mobile phone which is provided on either one of the holder main body and the mobile phone, a pinion meshable with the rack and rotatably provided on the other of the holder main body and the mobile phone; a rotational resistance member for giving a rotational resistance to the pinion, wherein the pinion is so constructed as to start rotating at a moment later than the disconnection of the connectors.

23. A phone holder according to claim 22, wherein the pinion and the rack are positioned with respect to each other such that the pinion starts meshing with the rack at the moment later than the disconnection of the connectors.

24. A phone holder according to claim 22, wherein the rack and the pinion are mounted on the holder main body or the mobile phone so as to move in parallel by a specified stroke while being held in mesh with each other, and the stroke is set such that the rotation of the pinion is started by restricting the parallel movement of the pinion and the rack at the moment later than the disconnection of the connectors.

25. A phone holder according to claim 15, further comprising an auxiliary urger which gives a urging force to the mobile phone in the feeding direction of the mobile phone separately from the phone urger only during a time up to the substantially same moment as the disconnection of the phone side connector and the holder connector when the locking of the mobile phone by the phone lock device is released.

26. A phone holder according to claim 25, further comprising an auxiliary urging spring which is provided at the back of the holder main body to urge the mobile phone in the direction opposite from the inserting direction by an elastic force thereof by being compressed during the insertion of the mobile phone, wherein the entire length of the auxiliary urging spring is set such that the auxiliary urging spring undergoes no compressive deformation substantially simultaneously with the disconnection the connectors.

27. A phone holder according to claim 25, further comprising a decelerator for reducing a feeding speed of the mobile phone by giving a resistance thereto at a moment later than the disconnection of the connectors.

28. A phone holder according to claim 15, further comprising a connector urger which urges the holder connector toward the phone side connector and an interactant for interacting with the mobile phone during the connection and disconnection of the phone side connector and the holder connector to move the holder connector in the same direction as the moving direction of the mobile phone and at a speed slower than a moving speed of the mobile phone, wherein the holder connector is movably provided on the holder main body in the same direction as a connecting direction with the phone side connector, and the connectors are connected and disconnected by a difference between the moving speed of the mobile phone and that of the holder connector.

29. A phone holder according to claim 28, further comprising an operating member for moving together with the mobile phone by coming into contact with the mobile phone during the connection and disconnection of the mobile phone and the holder connector, wherein the interactant is so constructed as to cause the operating member and the holder connector to interact with each other.

30. A phone holder according to claim 29, wherein a fixed rack extending in the moving direction of the mobile phone is provided on the holder main body; a movable rack extending in the moving direction of the mobile phone is provided on the operating member; and a pinion between the fixed and movable racks is rotatably mounted on the holder connector.

31. A phone holder according to claim 29, wherein a contact surface operable to come into surface contact with the mobile phone is provided at an end of the operating member toward the mobile phone, and is formed with a through hole for allowing the passage of the holder connector so that the holder connector and the mobile phone are connected through the through hole.

* * * * *